US006906118B2

(12) United States Patent
Goodbrand et al.

(10) Patent No.: US 6,906,118 B2
(45) Date of Patent: Jun. 14, 2005

(54) PHASE CHANGE INK COMPOSITIONS

(75) Inventors: H. Bruce Goodbrand, Hamilton (CA); Thomas W. Smith, Penfield, NY (US); Daniel A. Foucher, Toronto (CA); Kathleen M. McGrane, Webster, NY (US); Dina Popovic, Mississauga (CA)

(73) Assignee: Xerox Corporation, Stamford, CT (US)

(*) Notice: Subject to any disclaimer, the term of this patent is extended or adjusted under 35 U.S.C. 154(b) by 257 days.

(21) Appl. No.: 09/948,958

(22) Filed: Sep. 7, 2001

(65) Prior Publication Data

US 2003/0105185 A1 Jun. 5, 2003

(51) Int. Cl.$^7$ .................. C09D 11/00; C09D 11/02; C09D 11/10

(52) U.S. Cl. .......... 523/160; 106/31.29; 106/31.61

(58) Field of Search .................. 523/160, 161; 106/31.29, 31.61; 347/60, 68, 88, 99, 50

(56) References Cited

U.S. PATENT DOCUMENTS

| | | | |
|---|---|---|---|
| 4,745,419 A | 5/1988 | Quate et al. ............ 346/140 R |
| 5,006,170 A | 4/1991 | Schwarz et al. ............ 106/20 |
| 5,122,187 A | 6/1992 | Schwarz et al. ............ 106/25 |
| 5,180,425 A | 1/1993 | Matrick et al. ........... 106/22 R |
| 5,294,277 A | * 3/1994 | Obata ........................ 156/235 |
| 5,354,368 A | * 10/1994 | Larson, Jr. ................. 106/31.3 |
| 5,538,550 A | * 7/1996 | Yaegashi et al. ......... 106/31.29 |
| 5,541,627 A | 7/1996 | Quate ......................... 347/10 |
| 5,593,486 A | * 1/1997 | Oliver et al. ................. 524/96 |
| 5,669,965 A | * 9/1997 | Sawada et al. .......... 106/31.29 |
| 6,106,599 A | * 8/2000 | Breton et al. ............. 106/31.29 |
| 6,176,909 B1 | * 1/2001 | Malhotra et al. ........ 106/31.29 |
| 6,320,018 B1 | 11/2001 | Sijbesma et al. ........... 528/310 |
| 6,390,617 B1 | * 5/2002 | Iwao ........................ 347/102 |
| 6,398,857 B1 | * 6/2002 | Malhotra et al. ........ 106/31.29 |
| 6,471,758 B1 | 10/2002 | Kelderman et al. ...... 106/31.29 |

FOREIGN PATENT DOCUMENTS

EP       1067157       5/2004

OTHER PUBLICATIONS

R.P. Sijbesma et al., "Reversible Polymers Formed from Self–Complementary Monomers Using Quadruple Hydrogen Bonding," *Science*, vol. 278, (1977), p. 1601.

R. Dagani, "Supramolecular Polymers," *Chemical and Engineering News*, (Dec. 1997), p. 4.

J.H.K. KY Hirschberg et al., "Supramolecular Polymers from Linear Telechelic Siloxanes with Quadruple–Hydrogen–Bonded Units," *Macromolecules*, vol. 32, (1999), p. 2696.

A.C. Griffin et al., "Design and Synthesis of 'Smart' Supramoleclar Liquid Crystalline Polymers via Hydrogen–Bond Associations," *PMSE Proceedings*, vol. 72, (1995), p. 172.

Andrew J. Carr et al., "The Design of Organic Gelators: Solution and Solid State Properties of a Family of Bis–Ureas," *Tetrahedron Letters*, vol. 39, (1998), p. 7447.

Ronald F.M. Lange et al., "Hydrogen–Bonded Supramolecular Polymer Networks, " *Journal of Polymer Science, Part A: Polymer Chemistry*, vol. 37, (1999), p. 3657.

Arno Kraft et al., "Combining Self–Assembly and Self–Association—Towards Columnar Supramolecular Structures in Solution and in Liquid–Crystalline Mesophase," *Polym. Mater. Sci. Eng.*, vol. 80, (1999), p. 18.

Y. Yuasa et al., "Facile Synthesis of β–Keto Esters from Methyl Acetoacetate and Acid Chloride The Barium Oxide/Methanol System," *Organic Process Research and Development*, vol. 2, (1998), p. 412.

F. Hoogesteger et al., "Self Complementary Hydrogen Bonding of 1,1'–Bicyclohexylidene–4,4'–dione Dioxime. Formation of a Non–Covalent Polymer," *Tetrahedron*, vol. 52, (1996), p. 1773.

X. Wang et al., "Molecular Tectonics. Three–Dimensional Organic Networks with Zeolite Properties," *J. Am. Chem. Soc.*, vol. 116, (1994), p. 12119.

J.H.K. KY Hirschberg et al., "Helical Self–Assembled Polymers from Cooperative Stacking of Hydrogen–Bonded Pairs," *Nature*, vol. 407, (2000), p. 167.

Abdullah Zafar et al., "New Supramolecular Arrays based on Interactions between Carboxylate and Urea Groups: Solid–State and Solution Behavior," *New J. Chem.* 1998, p. 137–141.

Marion Lescanne et al., "Flow–Induced Alignment of Fiber-like Supramolecular Self–Assemblies During Organogel Formation with Various Low Molecular Mass Organogelator—Solvent Systems," *Am. Chem. Soc.*, vol. 18, (2002), pp. 7151–7153.

G.M. Clavier et al., "Organogelators for Making Porous Sol–Gel Derived Silica at Two Different Length Scales," *J. Mater. Chem.*, (2000), 10, pp. 1725–1730.

(Continued)

*Primary Examiner*—Callie Shosho
(74) *Attorney, Agent, or Firm*—Judith L. Byorick

(57) ABSTRACT

Disclosed is a phase change ink composition comprising a colorant and an ink vehicle, the ink being a solid at temperatures less than about 50° C. and exhibiting a viscosity of no more than about 20 centipoise at a jetting temperature of no more than about 160° C., wherein at a first temperature hydrogen bonds of sufficient strength exist between the ink vehicle molecules so that the ink vehicle forms hydrogen-bonded dimers, oligomers, or polymers, and wherein at a second temperature which is higher than the first temperature the hydrogen bonds between the ink vehicle molecules are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

78 Claims, No Drawings

OTHER PUBLICATIONS

Saleh A. Ahmed et al., "Multiaddressable Self-Assembling Organogelators Based on 2H-Chromene and N-Acyl-1, ω-amino Acid Units," *Am. Chem. Soc.*, (2002), 18, pp. 7096–7101.

Franz Alfred Neugebauer et al., "Tetrakis[4–3(3–tert–butyl–5–phenylverdazyl–1–yl)phenyl]methan, in Tetraradikal," *Chem. Ber.*, (1976) 109, pp. 2389–2394 (not translated).

English abstract by SciFinder for Franz Alfred Neugebauer et al., "Tetrakis[4–(3–tert–butyl–5–phenylverdazyl–1–yl)-phenyl]methan, in Tetraradikal," *Chem. Ber.*, (1976), 109 (7), pp. 2389–2394.

English translation of 221. R. Nietzki and Gustav Hasterlik: The Influence of Dioxyquinone on Orthodiamines (Received Apr. 28), date–N/A.

\* cited by examiner

PHASE CHANGE INK COMPOSITIONS

Copending Application U.S. Ser. No. 09/949,315, filed concurrently herewith, entitled "Aqueous Ink Compositions," with the named inventors Thomas W. Smith, David J. Luca, and Kathleen M. McGrane, the disclosure of which is totally incorporated herein by reference, discloses an aqueous ink composition comprising an aqueous liquid vehicle, a colorant, and an additive wherein, when the ink has been applied to a recording substrate in an image pattern and a substantial amount of the aqueous liquid vehicle has either evaporated from the ink image, hydrogen bonds of sufficient strength exist between the additive molecules so that the additive forms hydrogen-bonded oligomers or polymers.

BACKGROUND OF THE INVENTION

The present invention is directed to phase change (hot melt) ink compositions. More specifically, the present invention is directed to phase change ink compositions suitable for use in ink jet printing processes, including piezoelectric ink jet printing processes, acoustic ink jet printing processes, and the like. One embodiment of the present invention is directed to a phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises (1) a material selected from (a) those of the formula $$W\text{—}C$$

(b) those of the formula

$$C_1\text{—}X\text{—}C_2$$

(c) those of the formula

(d) those of the formula

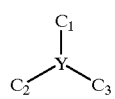

or (e) mixtures of two or more of (a), (b), (c), and/or (d); or (2) a material selected from mixtures of (a) at least one member selected from (i) those of the formula

$$W_1\text{—}A$$

(ii) those of the formula

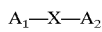
$$A_1\text{—}X\text{—}A_2$$

(iii) those of the formula

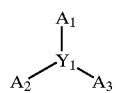

(iv) those of the formula

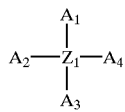

(v) those of the formula $$A_1\text{—}X\text{—}B_1$$

(vi) those of the formula

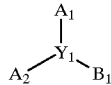

(vii) those of the formula

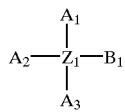

(viii) those of the formula

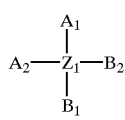

or (ix) mixtures of two or more of (i), (ii), (iii), (iv), (v), (vi), (vii), and/or (viii), and (b) at least one member selected from (i) those of the formula $$W_2\text{—}B$$

(ii) those of the formula $$B_1\text{—}X_2\text{—}B_2$$

(iii) those of the formula

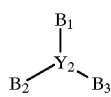

(iv) those of the formula

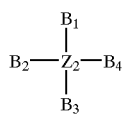

(v) those of the formula $$A_2\text{—}X_2\text{—}B_2$$

(vi) those of the formula

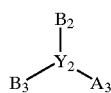

(vii) those of the formula

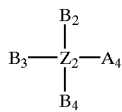

(viii) those of the formula

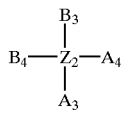

or (ix) mixtures of two or more of (i), (ii), (iii), (iv), (v), (vi), (vii), and/or (viii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist either between the "A" groups and the "B" groups or between the "C" groups so that the ink vehicle forms hydrogen-bonded dimers, oligomers, or polymers, and wherein at a second temperature which is higher than the first temperature the hydrogen bonds either between the "A" groups and the "B" groups or between the "C" groups are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate.

The use of phase change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also must be attracted by an electric field.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides, sulfonamindes; phosphites; phosphonates; phosphates; alkyl sulfines; alkyl acetates, and sulfur dioxide. Also disclosed are hot melt ink compositions suitable for ink jet printing which comprise a colorant, a propellant, and a binder selected from the group consisting of rosin esters; polyamides; dimer acid amides, fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

"Reversible Polymers Formed from Self-Complementary Monomers Using Quadruple Hydrogen Bonding," R. P. Sijbesma et al., *Science*, Vol. 278, p. 1601 (1997), the disclosure of which is totally incorporated herein by reference, discloses the use of units of 2-ureido-4-pyrimidone that dimerize strongly in a self-complementary array of four cooperative hydrogen bonds as the associating end group in reversible self-assembling polymer systems. The unidirectional design of the binding sites prevented uncontrolled multidirectional association or gelation. Linear polymers and reversible networks were formed from monomers with two and three binding sites, respectively. The thermal and environmental control over lifetime and bond strength made many properties, such as viscosity, chain length, and composition, tunable in a way not accessible to traditional polymers. Hence, polymer networks with thermodynamically controlled architectures could be formed for use in, for example, coatings and hot melts, where a reversible, strongly temperature-dependent rheology is highly advantageous.

"Supramolecular Polymers," R. Dagani, *Chemical and Engineering News*, p. 4 (December 1997), the disclosure of which is totally incorporated herein by reference, discloses self-assembling polymers containing the 2-ureido-4-pyrimidone group.

"Supramolecular Polymers from Linear Telechelic Siloxanes with Quadruple-Hydrogen-Bonded Units," J. H. K. Hirschberg et al., *Macromolecules,* Vol. 32, p. 2696 (1999), the disclosure of which is totally incorporated herein by reference, discloses the preparation of telechelic oligo- and poly(dimethylsiloxanes) with two ureidopyrimidone functional groups by a hydrosilylation reaction. The compounds were characterized in solution by $^1$H NMR and viscometry and in the solid state by $^1$H NMR and $^{13}$C NMR, FTIR, and rheology measurements. The measurements showed that the ureidopyrimidone groups were associated via quadruple hydrogen bonds in a donor-donor-acceptor-acceptor array. In many aspects, the materials behaved like entangled, high molecular weight polymers.

"Design and Synthesis of 'Smart' Supramolecular Liquid Crystalline Polymers via Hydrogen-Bond Associations," A. C. Griffin et al., *PMSE Proceedings,* Vol. 72, p. 172 (1995), the disclosure of which is totally incorporated herein by reference, discloses the creation of novel liquid crystalline materials by associating two complementary components through hydrogen bonding.

"The Design of Organic Gelators: Solution and Solid State Properties of a Family of Bis-Ureas," Andrew J. Carr et al., *Tetrahedron Letters,* Vol. 39, p. 7447 (1998), the disclosure of which is totally incorporated herein by reference, discloses the synthesis of a family of bis-ureas that were shown to function as effective gelators in certain organic solvents. The X-ray structure of one bis-urea showed a cylindrical hydrogen bonding network with extensive interdigitation of the alkyl esters which project from the central rod.

"Hydrogen-Bonded Supramolecular Polymer Networks," Ronald F. M. Lange et al., *Journal of Polymer Science, Part A: Polymer Chemistry,* Vol. 37, p. 3657 (1999), the disclosure of which is totally incorporated herein by reference, discloses reversible polymer networks obtained by the strong dimerizing, quadruple hydrogen-bonding ureidopyrimidone unit. A new synthetic route from commercially available starting materials is also described. The hydrogen-bonding ureido-pyrimidone network is prepared using 3(4)-isocyanatomethyl-1-methylcyclohexyl-isocyanate (IMCI) in the regioselective coupling reaction of multi-hydroxy functionalized polymers with isocytosines. $^1$H- and $^{13}$C-NMR, IR, MS, and ES-MS analysis, performed on a model reaction using butanol, demonstrated the formation of the hydrogen-bonding ureido-pyrimidone unit in a yield of more than 95 percent. The well-defined, strong hydrogen-bonding ureido-pyrimidone network was compared with a traditional covalently bonded polymer network, a multi-directional hydrogen-bonded polymer network based on urea units, and a reference compound. The advantage of the reversible, hydrogen-bonded polymer networks was the formation of the thermodynamically most favorable products, which showed a higher "virtual" molecular weight and shear modulus, compared to the irreversible, covalently bonded polymer network. The properties of the ureido-pyrimidone network were unique; the well-defined and strong dimerization of the ureido-pyrimidone unit did not require any additional stabilization such as crystallization or other kinds of phase separation, and displayed a well-defined viscoelastic transition. The ureido-pyrimidone dimerization was strong enough to construct supramolecular materials possessing acceptable mechanical properties.

"Combining Self-Assembly and Self-Association—Towards Columnar Supramolecular Structures in Solution and in Liquid-Crystalline Mesophase," Arno Kraft et al., *Polym. Mater. Sci. Eng.,* Vol. 80, p. 18 (1999), the disclosure of which is totally incorporated herein by reference, discloses the investigation of acid-base complexes that associate through hydrogen-bonding.

"Facile Synthesis of β-Keto Esters from Methyl Acetoacetate and Acid Chloride: The Barium Oxide/Methanol System," Y. Yuasa et al., *Organic Process Research and Development,* Vol. 2, p. 412 (1998), the disclosure of which is totally incorporated herein by reference, discloses the synthesis of β-keto esters in good yield by reacting methyl acetoacetate with barium oxide, acylating the resulting barium complex with acid chloride, and then cleaving the α-acyl β-keto ester with methanol at a mild temperature. Using this procedure, various β-keto esters were prepared, such as methyl 4-phenyl-3-oxobutanoate, methyl 3-phenyl-3-oxopropionate, methyl 4-cyclohexyl-3-oxobutanoate, and methyl 3-oxooctadecanoate.

"Self-Complementary Hydrogen Bonding of 1,1'-Bicyclohexylidene-4,4'-dione Dioxime. Formation of a Non-Covalent Polymer," F. Hoogesteger et al., *Tetrahedron,* Vol. 52, No. 5, p. 1773 (1996), the disclosure of which is totally incorporated herein by reference, discloses that 1,1'-bicyclohexylidene-4,4'-dione dioxime self-assembles into a non-covalent polymer structure in the solid state due to intermolecular directional hydrogen bonding between the oxime functionalities.

"Molecular Tectonics. Three-Dimensional Organic Networks with Zeolite Properties," X. Wang et al., *J. Am. Chem. Soc.,* Vol. 116, p. 12119 (1994), the disclosure of which is totally incorporated herein by reference, discloses molecules whose interactions are dominated by specific attractive forces that induce the assembly of aggregates with controlled geometries.

"Helical Self-Assembled Polymers from Cooperative Stacking of Hydrogen-Bonded Pairs," J. H. K. Ky Hirschberg et al., *Nature,* Vol. 407, p. 167 (2000), the disclosure of which is totally incorporated herein by reference, discloses a general strategy for the design of functionalized monomer units and their association in either water or alkanes into non-covalently linked polymeric structures with controlled helicity and chain length. The monomers consist of bifunctionalized ureidotriazine units connected by a spacer and carrying solubilizing chains at the periphery. This design allows for dimerization through self-complementary quadruple hydrogen bonding between the units and solvophobically induced stacking of the dimers into columnar polymeric architectures, whose structure and helicity can be adjusted by tuning the nature of the solubilizing side chains.

"New Supramolecular Arrays based on Interactions between Carboxylate and Urea Groups: Solid-State and Solution Behavior," Abdullah Zafar et al., *New J. Chem.,* 1998, 137–141, the disclosure of which is totally incorporated herein by reference, discloses interaction between urea and carboxylate groups which can give extended hydrogen bonded aggregates.

U.S. Pat. No. 5,180,425 (Matrick et al.), the disclosure of which is totally incorporated herein by reference, discloses an ink for ink jet printers which comprises an aqueous carrier medium, pigment dispersion or dye, and a polyol/alkylene oxide condensate cosolvent which eliminates film formation on thermal ink jet resistor surfaces thereby eliminating non-uniformity in optical density. The cosolvent present at least 5 percent has a solubility in water of at least 4.5 parts in 100 parts of water at 25° C. and a general formula:

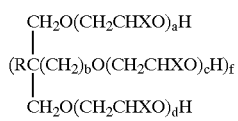

wherein X=—H or —CH$_3$, R=—H, —CH$_3$, —C$_2$H$_5$, —C$_3$H$_7$, —C$_4$H$_9$, or —CH$_2$O(CH$_2$CH$_2$O)$_e$H, b=0 or 1, a+d+f(c+e)=2 to 100; and f=1 to 6, the cosolvent being present in the amount of at least 4.5 percent based on the total weight of the ink jet ink composition. These inks exhibit freedom from thermal resistor film formation, have excellent decap performance, are storage stable and give images having excellent print quality.

While known compositions and processes are suitable for their intended purposes, a need remains for phase change inks that are suitable for hot melt ink jet printing processes, such as hot melt piezoelectric ink jet printing processes and the like. In addition, a need remains for phase change inks that are suitable for hot melt acoustic ink jet printing processes. Further, a need remains for phase change inks that generate images with reduction in waxy texture and feel. Additionally, a need remains for phase change inks that generate images with improved rub resistance. There is also a need for phase change inks that generate images with improved smear resistance. In addition, there is a need for phase change inks with desirably low viscosity values at the jetting temperature of a hot melt ink jet printer. Further, there is a need for nonaqueous phase change inks wherein water-soluble dyes can be selected as colorants.

SUMMARY OF THE INVENTION

The present invention is directed to a phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises (1) a material selected from (a) those of the formula

W—C (b) those of the formula

(c) those of the formula

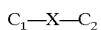

(d) those of the formula

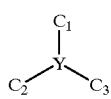

or (e) mixtures of two or more of (a), (b), (c), and/or (d); or (2) a material selected from mixtures of (a) at least one member selected from (i) those of the formula

W$_1$—A (ii) those of the formula

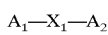

(iii) those of the formula

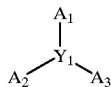

(iv) those of the formula

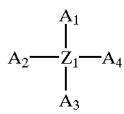

(v) those of the formula

A$_1$—X$_1$—B$_1$ (vi) those of the formula

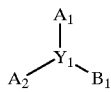

(vii) those of the formula

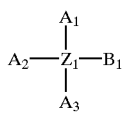

(viii) those of the formula

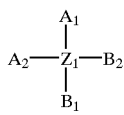

or (ix) mixtures of two or more of (i), (ii), (iii), (iv), (v), (vi), (vii), and/or (viii), and (b) at least one member selected from (i) those of the formula

W$_2$—B (ii) those of the formula

B$_1$—X$_2$—B$_2$ (iii) those of the formula

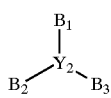

(iv) those of the formula

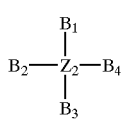

(v) those of the formula

A$_2$—X$_2$—B$_2$ (vi) those of the formula

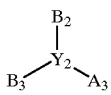

(vii) those of the formula

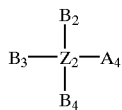

(viii) those of the formula

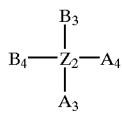

or (ix) mixtures of two or more of (i), (ii), (iii), (iv), (v), (vi), (vii), and/or (viii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist either between the "A" groups and the "B" groups or between the "C" groups so that the ink vehicle forms hydrogen-bonded dimers, oligomers, or polymers, and wherein at a second temperature which is higher than the first temperature the hydrogen bonds either between the "A" groups and the "B" groups or between the "C" groups are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

DETAILED DESCRIPTION OF THE INVENTION

The present invention is directed to a phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises (1) a material selected from (a) those of the formula

W—C (b) those of the formula $C_1$—X—$C_2$ (c) those of the formula

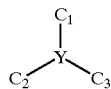

(d) those of the formula

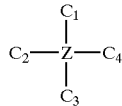

or (e) mixtures of two or more of (a), (b), (c), and/or (d); or (2) a material selected from mixtures of (a) at least one member selected from (i) those of the formula $W_1$—A (ii) those of the formula $A_1$—$X_1$—$A_2$ (iii) those of the formula

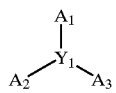

(iv) those of the formula

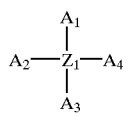

(v) those of the formula $A_1$—$X_1$—$B_1$ (vi) those of the formula

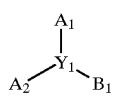

(vii) those of the formula

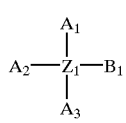

(viii) those of the formula

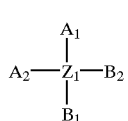

or (ix) mixtures of two or more of (i), (ii), (iii), (iv), (v), (vi), (vii), and/or (viii), and (b) at least one member selected from (i) those of the formula $W_2$—B (ii) those of the formula

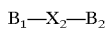
$B_1$—$X_2$—$B_2$ (iii) those of the formula

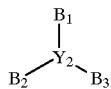

(iv) those of the formula

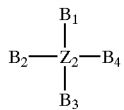

(v) those of the formula

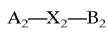
$A_2$—$X_2$—$B_2$ (vi) those of the formula

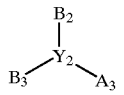

(vii) those of the formula

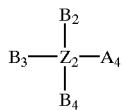

(viii) those of the formula

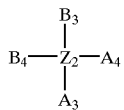

or (ix) mixtures of two or more of (i), (ii), (iii), (iv), (v), (vi), (vii), and/or (viii), wherein each "A" is an acidic moiety and each "B" is a basic moiety, wherein each "A" is capable of forming at least one hydrogen bond with at least one "B" and each "B" is capable of forming at least one hydrogen bond with at least one "A", each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist either between the "A" groups and the "B" groups or between the "C" groups so that the ink vehicle forms hydrogen-bonded dimers, oligomers, or polymers, and wherein at a second temperature which is higher than the first temperature the hydrogen bonds either between the "A" groups and the "B" groups or between the "C" groups are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

In a specific embodiment, "A" is a moiety containing a carboxylic acid group, "B" is either (i) a moiety containing a pyridine group, (ii) a moiety containing a urea group, (iii) a moiety containing an imidazole group, or (iv) combinations or mixtures thereof, and "C" is either (i) a moiety containing a carboxylic acid group, (ii) a moiety containing a urea group, (iii) a moiety containing a pyridone group, (iv) a moiety containing a ureido-pyrimidone group, (v) a moiety containing an imidazole group, (vi) a moiety containing an oxime group, or (vii) combinations or mixtures thereof.

Examples of suitable "A" groups include carboxylic acids, including those of the general formulae

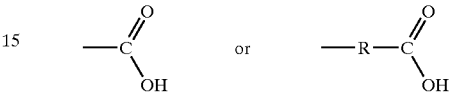

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Specific examples of suitable "A" groups include

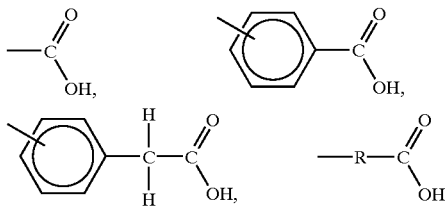

wherein R is an alkyl group typically with from 1 to about 12 carbon atoms,

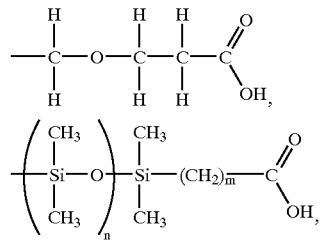

wherein n is an integer typically of from 1 to about 12 and m is an integer typically of from about 3 to about 12,

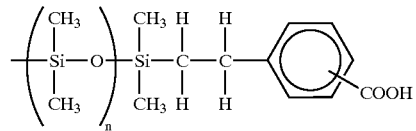

wherein n is an integer typically of from 1 to about 12,

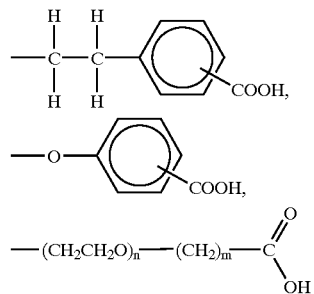

wherein n is an integer typically of from 1 to about 20 and m is an integer typically of from about 3 to about 12,

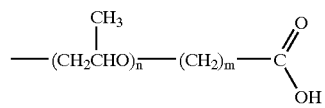

wherein n is an integer typically of from 1 to about 20 and m is an integer typically of from about 3 to about 12,

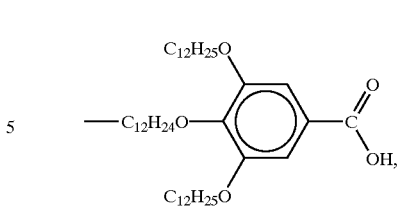

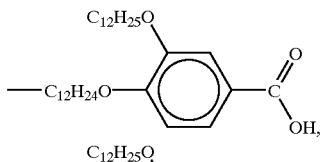

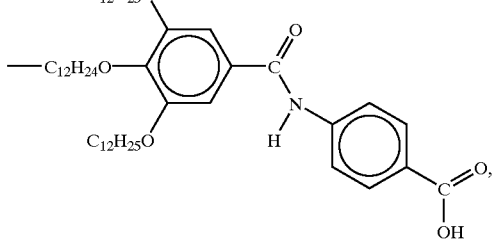

and the like.

Examples of suitable "B" groups include pyridine groups, of the general formulae

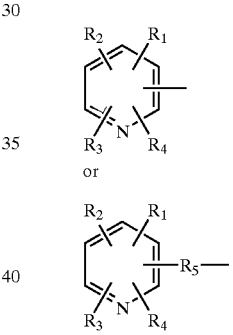

wherein $R_1$, $R_2$, $R_3$, and $R_4$ each, independently of the others, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_5$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like, and, in the instance wherein the "B" group is a pyridine group, it should be noted that the "X" central moiety can be a direct bond, resulting in a compound of the formula

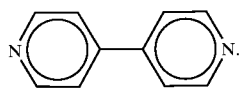

Within the class of pyridines, acylaminopyridines are particularly suitable "B" groups, including those of the general formula

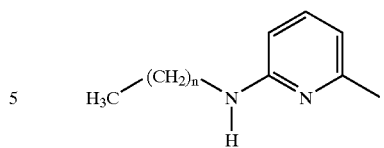

wherein n is an integer representing the number of repeat —CH$_2$— groups, and typically being from 0 to about 3, although the value of n can be outside of this range.

Also suitable as "B" groups are urea groups, including those of the general formulae

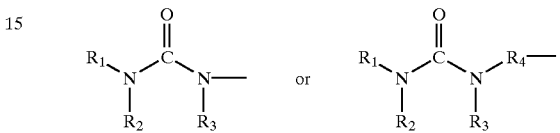

wherein, provided that at least one of R$_1$, R$_2$, and R$_3$ is a hydrogen atom, R$_1$, R$_2$ and R$_3$ each can be a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an aryl group (including substituted aryl groups), typically with about 6 carbon atoms, and R$_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "B" groups are imidazole groups, including those of the general formulae

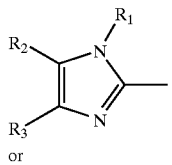

or

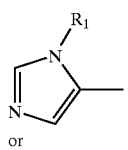

or

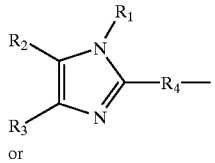

or

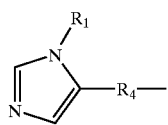

wherein $R_1$ is a hydrogen atom or an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 4 carbon atoms, although the number of carbon atoms can be outside of this range, $R_2$ and $R_3$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Specific examples of suitable "B" groups include

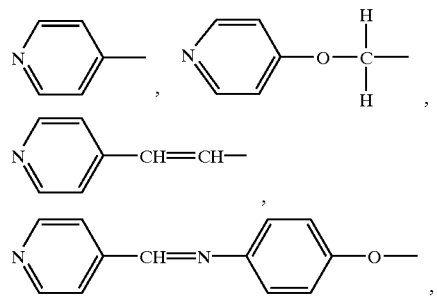

-continued

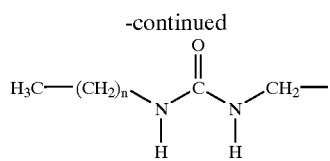

wherein n is an integer typically of from 0 to about 12,

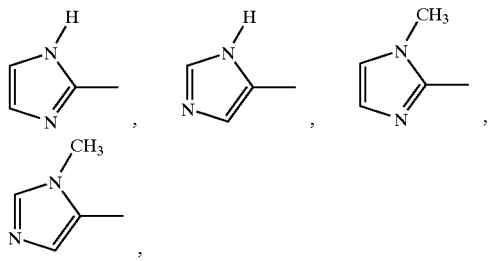

and the like.

Examples of suitable "C" groups include carboxylic acid groups, including those of the general formulae

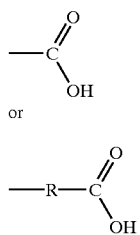

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are urea groups, including those of the general formulae

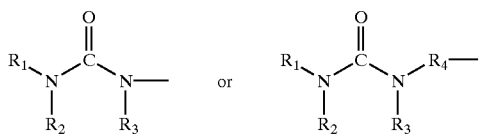

wherein, provided that at least one of $R_1$, $R_2$, and $R_3$ is a hydrogen atom, $R_1$, $R_2$, and $R_3$ each can be a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an aryl group (including substituted aryl groups), typically with about 6 carbon atoms, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are pyridone groups, including those of the general formulae

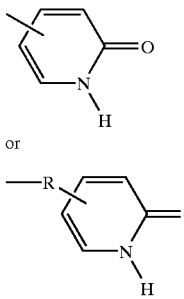

or

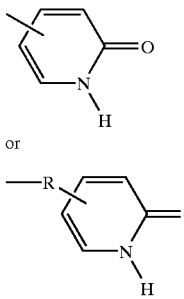

wherein R is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkylene, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are ureidopyrimidone groups, including those of the general formulae

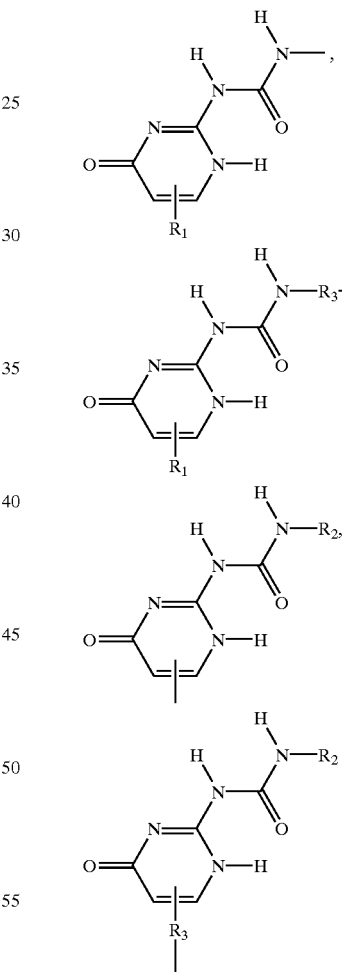

wherein $R_1$ and $R_2$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 6 carbon atoms and preferably with from 1 to about 4 carbon atoms, although the number of carbon atoms can be outside of these ranges, an aryl group (including substituted aryl groups), typically with from 6 to about 10 carbon atoms, although the number of carbon atoms can be outside of this range, and $R_3$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, aryl, arylene, alkylarylene, arylalkylene, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are oxime groups, including those of the general formulae

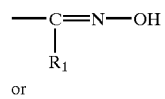

or

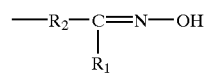

wherein $R_1$ is an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 12 carbon atoms and preferably with from 1 to about 6 carbon atoms, although the number of carbon atoms can be outside of these ranges, an aryl group (including substituted aryl groups), typically with from 6 to about 10 carbon atoms, although the number of carbon atoms can be outside of this range, an arylalkyl group (including substituted arylalkyl groups), typically with from 7 to about 12 carbon atoms and preferably with from 7 to about 9 carbon atoms, although the number of carbon atoms can be outside of these ranges, or an alkylaryl group (including substituted alkylaryl groups), typically with from 7 to about 12 carbon atoms and preferably with from 7 to about 9 carbon atoms, although the number of carbon atoms can be outside of these ranges, and $R_2$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, and wherein the substituents on the substituted alkyl, alkylene, aryl, arylene, alkylaryl, alkylarylene, arylalkyl, and arylalkylene groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Also suitable as "C" groups are imidazole groups, including those of the general formulae

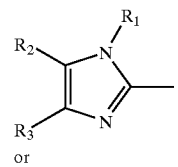

or

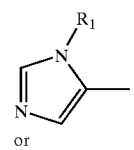

or

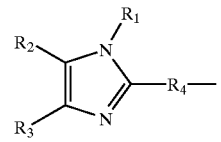

or

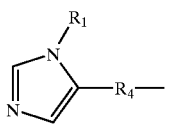

wherein $R_1$ is a hydrogen atom or an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 4 carbon atoms, although the number of carbon atoms can be outside of this range, $R_2$ and $R_3$ each, independently of the other, is a hydrogen atom, an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkylene group), typically with from 1 to about 2 carbon atoms, although the number of carbon atoms can be outside of this range, an alkoxy group (including substituted alkoxy groups), typically with from 1 to about 2 carbon atoms, although the number of carbon atoms can be outside of this range, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, or an azide group, and $R_4$ is an alkylene group (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 12 carbon atoms and preferably with from 1 to about 6 carbon atoms, although the number of carbon atoms can be outside of these ranges, an arylene group (including substituted arylene groups), typically with from 6 to about 10 carbon atoms, although the number of carbon atoms can be outside of this range, an arylalkylene group (including substituted arylalkylene groups), typically with from 7 to about 12 carbon atoms and preferably with from 7 to about 9 carbon atoms, although the number of carbon atoms can be outside of these ranges, an alkylarylene group (including substituted alkylarylene groups), typically with from 7 to about 12 carbon atoms and preferably with from 7 to about 9 carbon atoms, although the number of carbon atoms can be outside of these ranges, an alkyleneoxy group (including substituted alkyleneoxy groups), typically with from 1 to about 12 carbon atoms and preferably with from 1 to about 6 carbon atoms, although the number of carbon atoms can be outside of these ranges, a polyalkyleneoxy group (including substituted polyalkyleneoxy groups), typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a heterocyclic group (including substituted heterocyclic groups), typically with from 0 to about 10 carbon atoms, and typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, a silylene group (including substituted silylene groups), a siloxane group (including substituted siloxane groups), a polysiloxane group (including substituted polysiloxane groups) typically with from 2 to about 12 repeat siloxane units, although the number of repeat siloxane units can be outside of this range, and wherein the substituents on the substituted alkyl, alkylene, arylene, alkylarylene, arylalkylene, alkoxy, alkyleneoxy, polyalkyleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring, and the like.

Specific examples of suitable "C" groups include

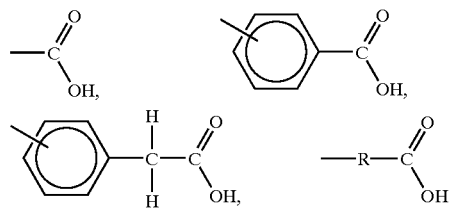

wherein R is an alkyl group typically with from 1 to about 12 carbon atoms,

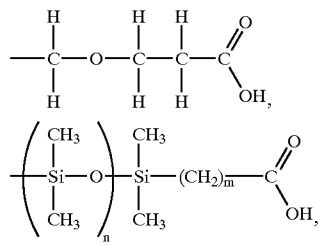

wherein n is an integer typically of from 1 to about 12 and m is an integer typically of from about 3 to about 12,

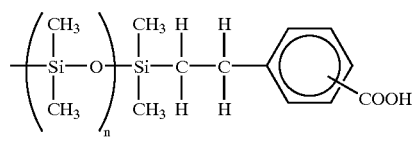

wherein n is an integer typically of from 1 to about 12,

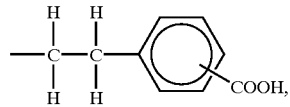

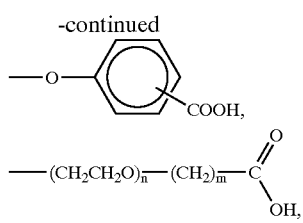
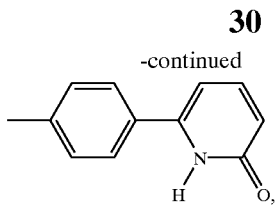
wherein n is an integer typically of from 1 to about 20 and m is an integer typically of from about 3 to about 12,
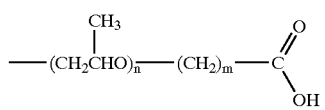
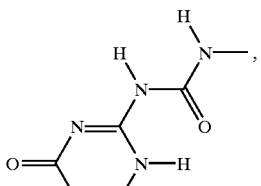
wherein n is an integer typically of from 1 to about 20 and m is an integer typically of from about 3 to about 12,
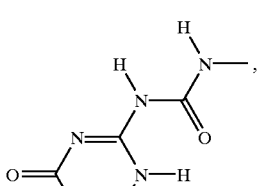
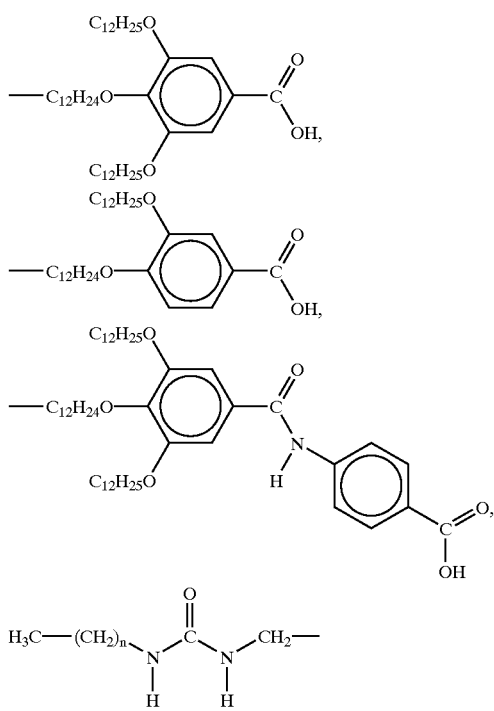
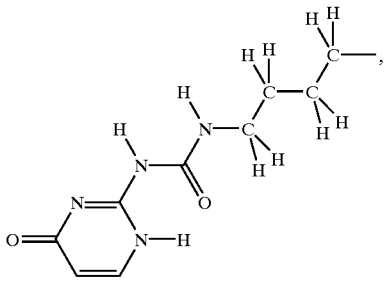
wherein n is an integer typically of from 0 to about 3,
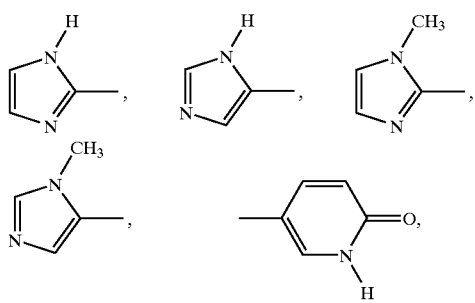
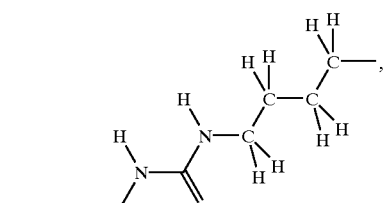
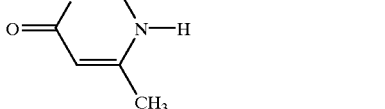
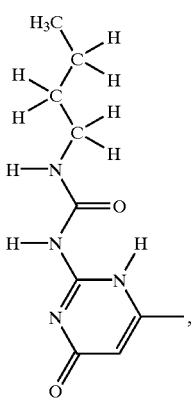

-continued

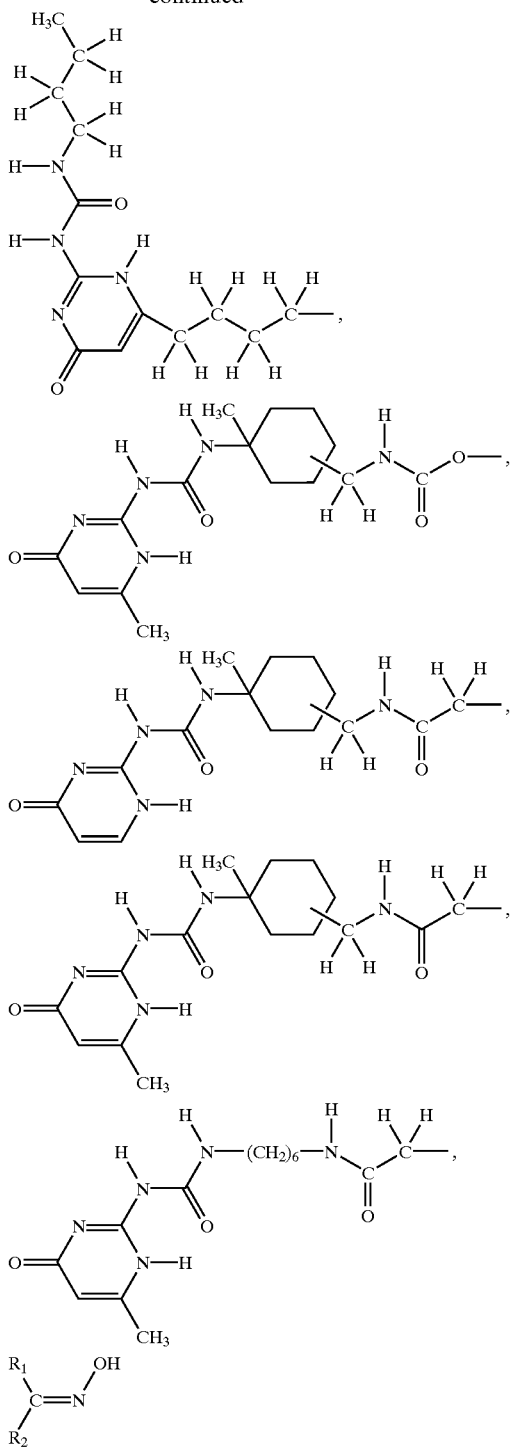

wherein R₁ and R₂ are alkyl groups, typically with from 1 to about 10 carbon atoms, although the number of carbon atoms can be outside of this range, and wherein R₁ and R₂ can be joined together to form a ring,

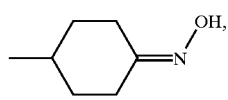

-continued

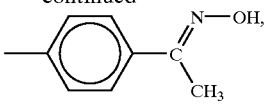

and the like.

The "W", "X", "Y", and "Z" groups are central moieties to which the "A", "B", and "C" groups are attached. Any desired or effective monovalent moiety can be selected as "W". Any desired or effective divalent moiety can be selected as "X". Any desired or effective trivalent moiety can be selected as "Y". Any desired or effective tetravalent moiety can be selected as "Z".

Examples of suitable "W" moieties include (but are not limited to) hydrogen atoms, hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, alkyl groups (including linear, branched cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 16 carbon atoms, and preferably with from 1 to about 10 carbon atoms, although the number of carbon atoms can be outside of these ranges, aryl groups (including substituted aryl groups), typically with from 6 to about 16 carbon atoms, and preferably with from 6 to about 10 carbon atoms, although the number of carbon atoms can be outside of these ranges, arylalkyl groups (including substituted arylalkyl groups), typically with from 7 to about 17 carbon atoms, and preferably with from 7 to about 12 carbon atoms, although the number of carbon atoms can be outside of these ranges, alkylaryl groups (including substituted alkylaryl groups), typically with from 7 to about 17 carbon atoms, and preferably with from 7 to about 12 carbon atoms, although the number of carbon atoms can be outside of these ranges, alkyleneoxy groups (including substituted alkyleneoxy groups), typically with from 1 to about 16 carbon atoms and preferably with from 1 to about 10 carbon atoms, although the number of carbon atoms can be outside of these ranges, polyalkyleneoxy groups (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, aryleneoxy groups (including substituted aryleneoxy groups), typically with from 6 to about 22 carbon atoms and preferably with from 6 to about 12 carbon atoms, although the number of carbon atoms can be outside of these ranges, arylalkyleneoxy groups (including substituted arylalkyleneoxy groups), typically with from 7 to about 22 carbon atoms and preferably with from 7 to about 14 carbon atoms, although the number of carbon atoms can be outside of these ranges, alkylaryleneoxy groups (including substituted alkylaryleneoxy groups), typically with from 7 to about 22 carbon atoms and preferably with from 7 to about 14 carbon atoms, although the number of carbon atoms can be outside of these ranges, heterocyclic groups (including substituted heterocyclic groups), typically with from 0 to about 10 carbon atoms, typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, silyl groups (including substituted silyl groups), siloxane groups (including substituted siloxane groups), or polysiloxane groups (including substituted polysiloxane groups), typically with from 2 to about 16 repeat siloxane units, although the number of repeat siloxane units can be outside of this range, wherein the substituents on the substituted alkyl, aryl, arylalkyl, alkylaryl, alkyleneoxy, polyalkyleneoxy, aryleneoxy, arylalkyleneoxy, alkylaryleneoxy, heterocyclic, silyl, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring. The "W" moieties can also be combinations of two or more of these groups. For example, a "W" group can be an aryl group having attached thereto one or more alkyleneoxy groups, to which the "A", "B", or "C" group is attached, an alkyl group having attached thereto one or more siloxane groups, to which the "A", "B", or "C" group is attached, or the like.

Examples of suitable "X", "Y", and "Z" moieties include (but are not limited to) alkylene groups (including linear, branched cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 16 carbon atoms, and preferably with from 1 to about 10 carbon atoms, although the number of carbon atoms can be outside of these ranges, arylene groups (including substituted arylene groups), typically with from 6 to about 16 carbon atoms, and preferably with from 6 to about 10 carbon atoms, although the number of carbon atoms can be outside of these ranges, arylalkylene groups (including substituted arylalkylene groups), typically with from 7 to about 17 carbon atoms, and preferably with from 7 to about 12 carbon atoms, although the number of carbon atoms can be outside of these ranges, alkylarylene groups (including substituted alkylarylene groups), typically with from 7 to about 17 carbon atoms, and preferably with from 7 to about 12 carbon atoms, although the number of carbon atoms can be outside of these ranges, alkyleneoxy groups (including substituted alkyleneoxy groups), typically with from 1 to about 16 carbon atoms and preferably with from 1 to about 10 carbon atoms, although the number of carbon atoms can be outside of these ranges, polyalkyleneoxy groups (including substituted polyalkyleneoxy groups), (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, aryleneoxy groups (including substituted aryleneoxy groups), typically with from 6 to about 22 carbon atoms and preferably with from 6 to about 12 carbon atoms, although the number of carbon atoms can be outside of these ranges, arylalkyleneoxy groups (including substituted arylalkyleneoxy groups), typically with from 7 to about 22 carbon atoms and preferably with from 7 to about 14 carbon atoms, although the number of carbon atoms can be outside of these ranges, alkylaryleneoxy groups (including substituted alkylaryleneoxy groups), typically with from 7 to about 22 carbon atoms and preferably with from 7 to about 14 carbon atoms, although the number of carbon atoms can be outside of these ranges, heterocyclic groups (including substituted heterocyclic groups), typically with from 0 to about 10 carbon atoms, typically with from about 5 to about 10 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, silylene groups (including substituted silylene groups), siloxane groups (including substituted siloxane groups), polysiloxane groups (including substituted polysiloxane groups), typically with from 2 to about 16 repeat siloxane units, although the number of repeat siloxane units can be outside of this range, hetero atoms, such as nitrogen, oxygen, sulfur, and silicon, or direct bonds, wherein the substituents on the substituted alkylene, arylene, arylalkylene, alkylarylene, alkyleneoxy, polyalkyleneoxy, aryleneoxy, arylalkyleneoxy, alkylaryleneoxy, heterocyclic, silylene, siloxane, and polysiloxane groups can be (but are not limited to) hydroxy groups, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfonate groups, sulfoxide groups, nitrile groups, sulfone groups, acyl groups, acid anhydride groups, azide groups, mixtures thereof, and the like, wherein two or more substituents can be joined together to form a ring. The "X", "Y", and "Z" moieties can also be combinations of two or more of these groups. For example, an "X", "Y", or "Z" group can be an aryl or arylene group having attached thereto one or more alkyleneoxy groups, to which the "A", "B", and/or "C" groups are attached, an alkyl or alkylene group having attached thereto one or more siloxane groups, to which the "A", "B", and/or "C" groups are attached, or the like.

Specific examples of suitable "W", "X", "Y", and "Z" groups include (but are not limited to) hetero atoms, such as

and the like, direct bonds, such as

—,
=,
≡ and the like, alkylene groups, including those of the general formulae

and the like; those of the general formulae

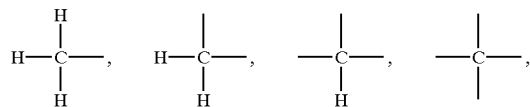

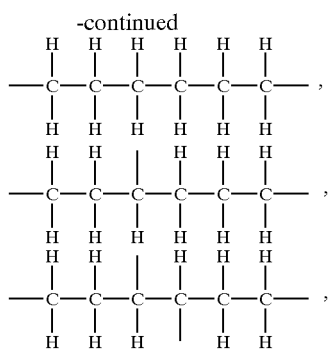
and the like; those of the general formulae
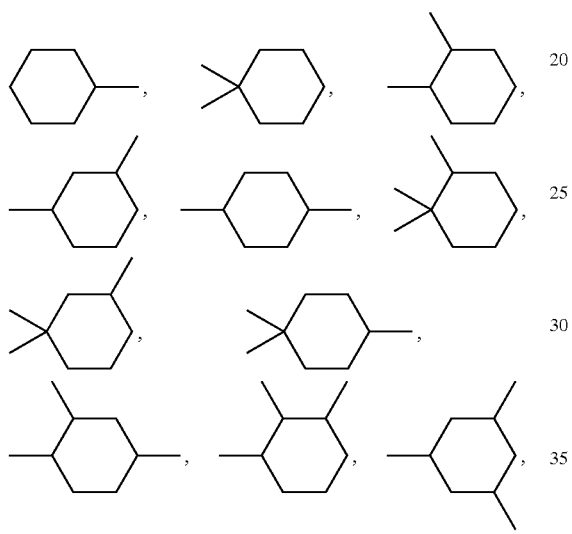
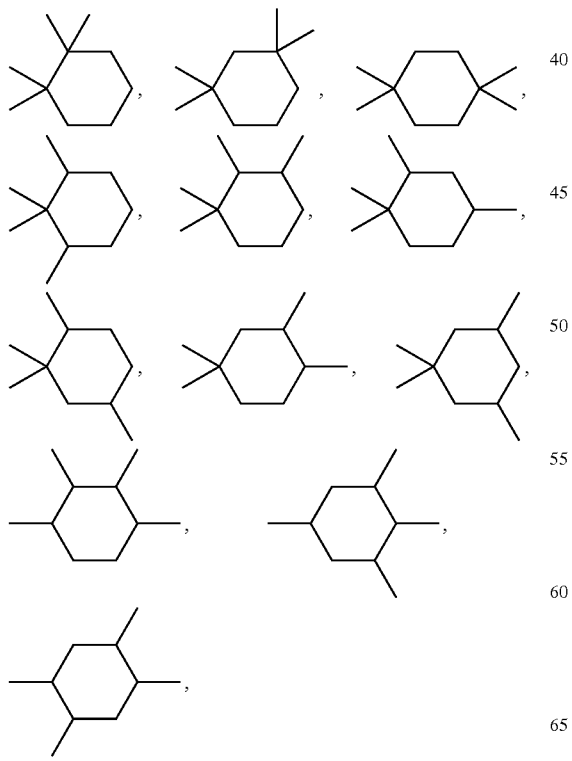
those of the general formulae
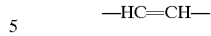
and the like; arylene groups, including those of the general formulae
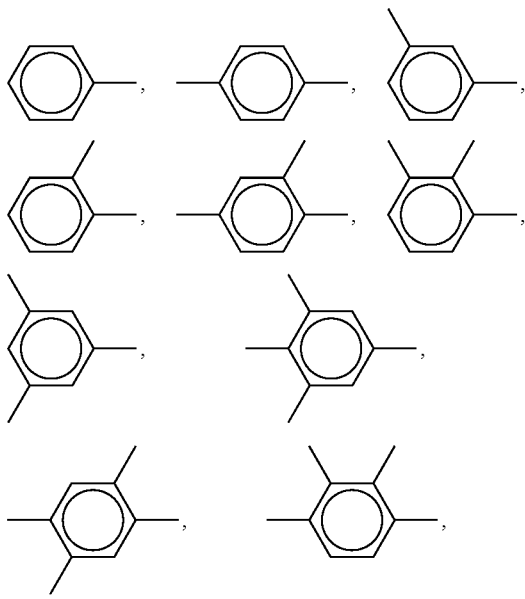
and the like; arylalkylene groups, including those of the general formulae
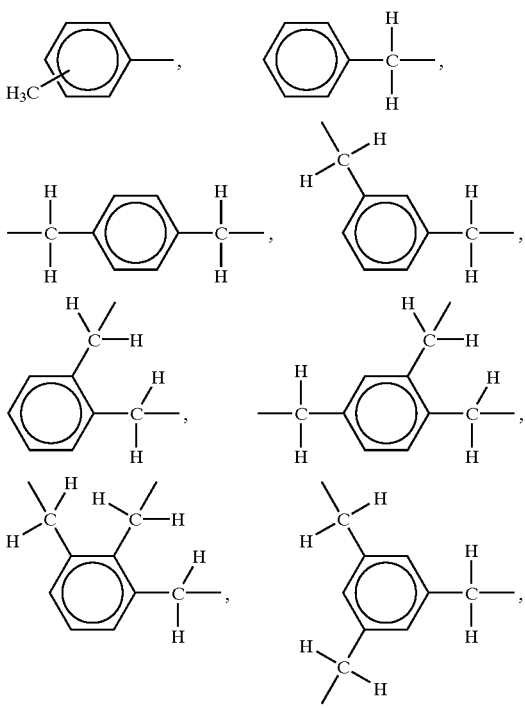

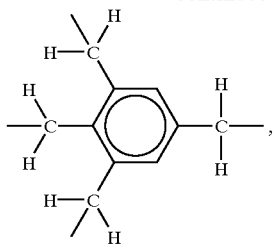

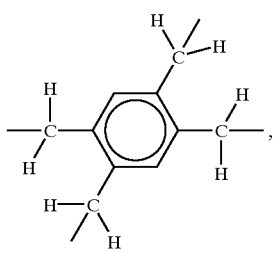

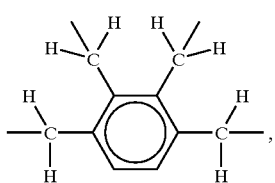

and the like; alkyleneoxy and polyalkyleneoxy groups, including those of the general formulae

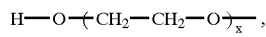

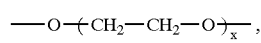

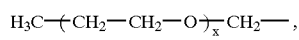

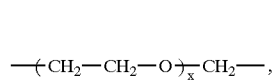

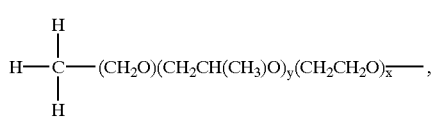

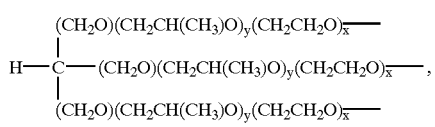

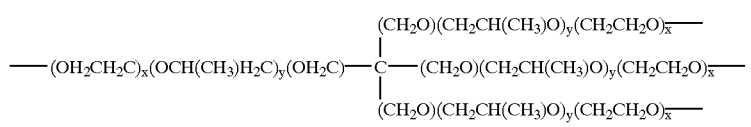

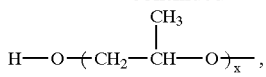

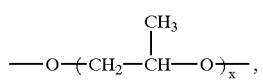

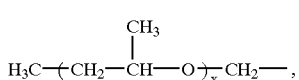      and

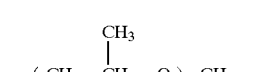

wherein in each case x is an integer typically of from 1 to about 20; and the like; combinations of alkylene groups and alkyleneoxy or polyalkyleneoxy groups, including those of the general formulae

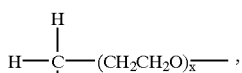

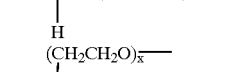

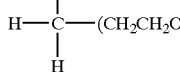

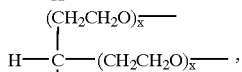

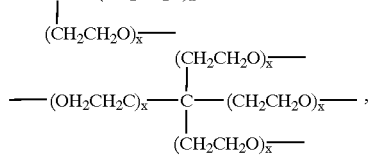

wherein each x, independently of the others, is an integer representing the number of repeat ethylene oxide groups, and typically is from about 1 to about 20, and those of the general formulae

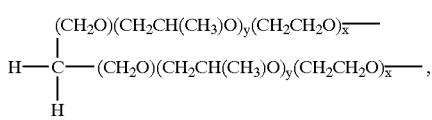

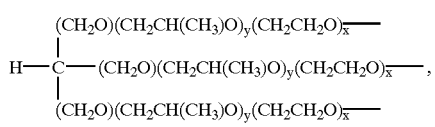

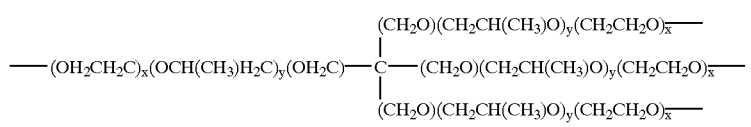

wherein each x, independently of the others, is an integer representing the number of repeat ethylene oxide groups, and typically is from about 1 to about 20, and wherein each y, independently of the others, is an integer representing the number of repeat isopropylene oxide groups, and typically is from about 1 to about 20, materials based on commercially available materials such as the VORANOL® series available from Dow Chemical Co., Midland, Mich., including polyol-initiated polyetherpolyols such as VORANOL® 370, including "X", "Y", and "Z" groups of the formulae

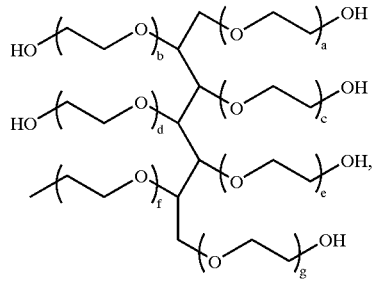

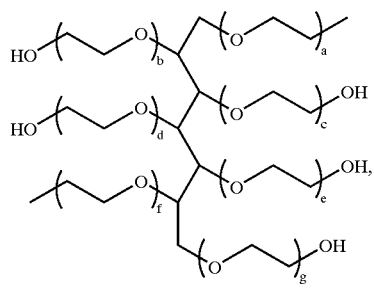

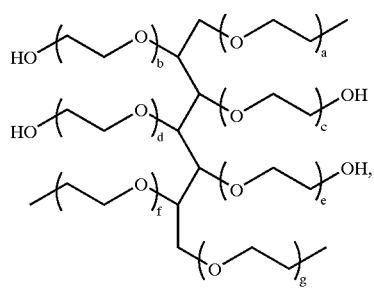

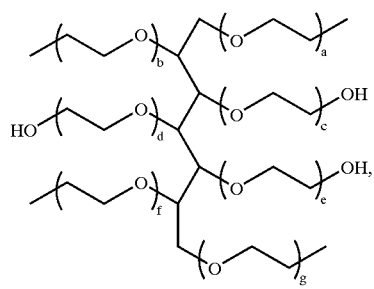

any other possible di-, tri-, and tetravalent groups based on this VORANOL® central group, wherein a, b, c, d, e, f, and g are each integers representing the number of ethylene oxide repeat units and the molecular weight of the starting material (wherein all end groups are terminated by hydroxy groups) is about 1,040, those based on sugars, such as sorbital, including those of the general formulae

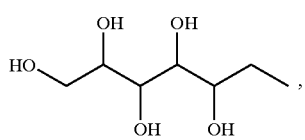

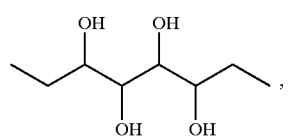

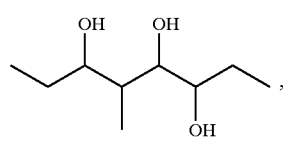

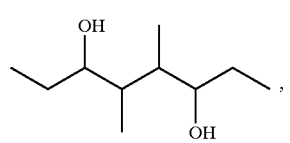

any other possible di-, tri-, and tetravalent groups based on this sorbital central group, those based on other sugars, such as mannitol, and the like. Also suitable are materials based on commercially available amine/alkylene oxide condensates such as VORANOL® 391, 770, and 800 and MULTRANOL® 9144, 9170, 9138, 9168, 8114, 4063, 4050, and 9181, available from Bayer, which generally are derived from the reaction of ethylene oxide or propylene oxide with an amine containing three or more active hydrogen atoms, wherein the reaction typically produce mixtures of compounds with varying degree of oxyalkylation, structures depicted are illustrative of average compositions which contain a range of alkylene oxide units, the amine initiators can be aliphatic or aromatic amines, exemplary amine initiators include but are not limited to ethylene diamine, diethylene triamine, triethyelene tetramine, 1,2-phenylene diamine, and melamine; an exemplary reaction is as follows:

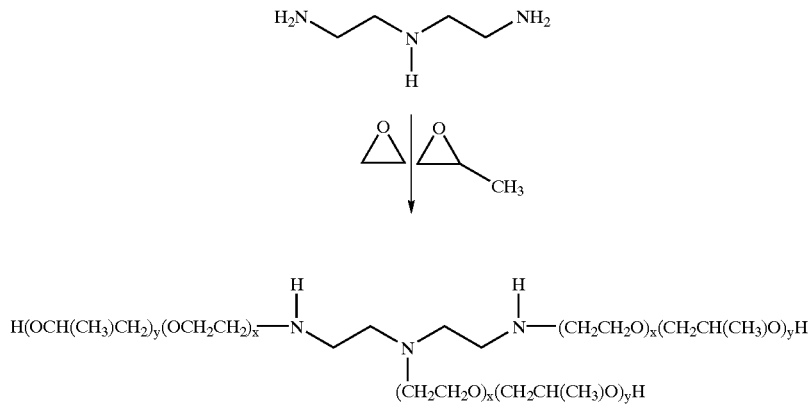

wherein each x, independently of the others, represents the number of repeat polyethylene oxide units and each y, independently of the others, represents the number of repeat polypropylene oxide units. Typical molecular weights are from about 200 to about 4,000, although the molecular weight can be outside of these ranges. Examples of suitable "X", "Y", and "Z" groups derived from these materials include, for example, and the like. Also suitable are combinations of arylene groups and alkyleneoxy or polyalkyleneoxy groups, including those of the general formulae

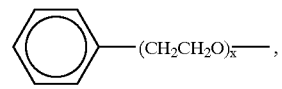

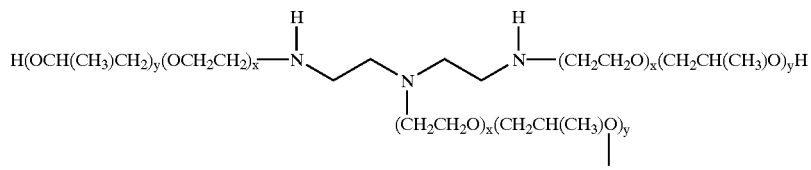

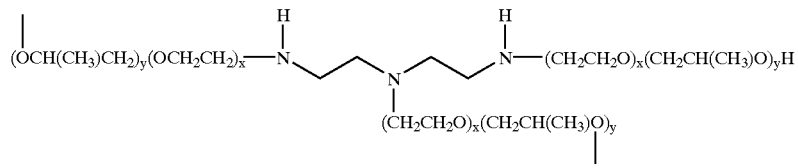

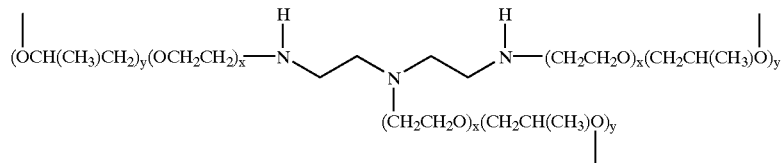

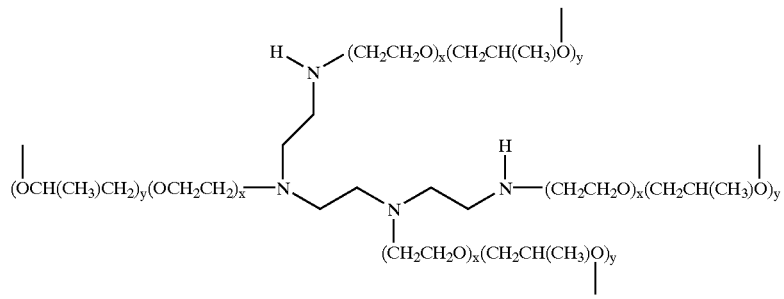

-continued

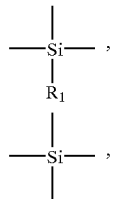

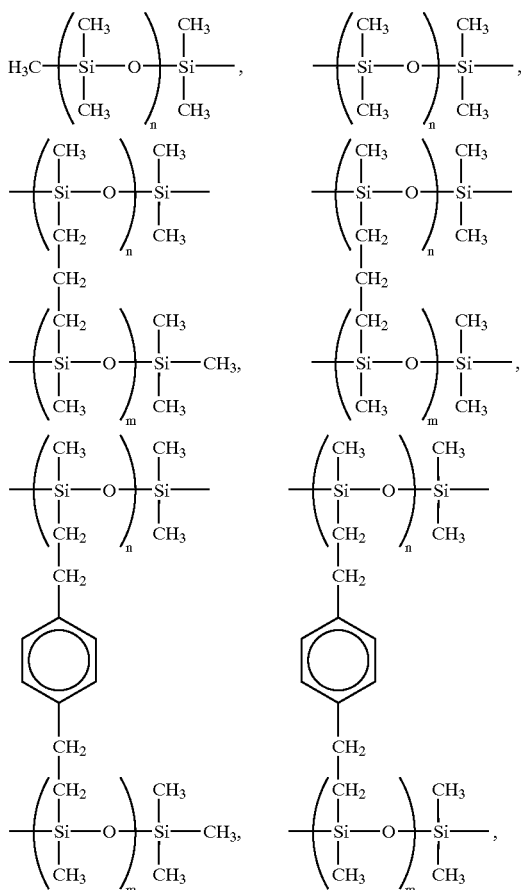

wherein each x, independently of the others, is an integer representing the number of repeat ethylene oxide groups, and typically is from about 1 to about 20, silylene groups, including those of the general formulae

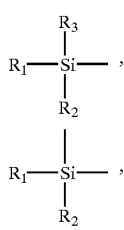

wherein $R_1$, $R_2$, and $R_3$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, siloxane groups, including those of the general formulae wherein m and n each, independently of the other, is an integer representing the number of repeat alkylsiloxane units, and typically is from about 3 to about 12, although the values of m and n can be outside of this range, combinations of alkylene groups and siloxane groups, including those of the general formulae

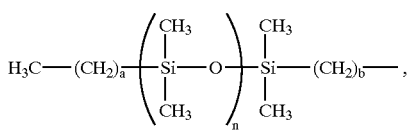

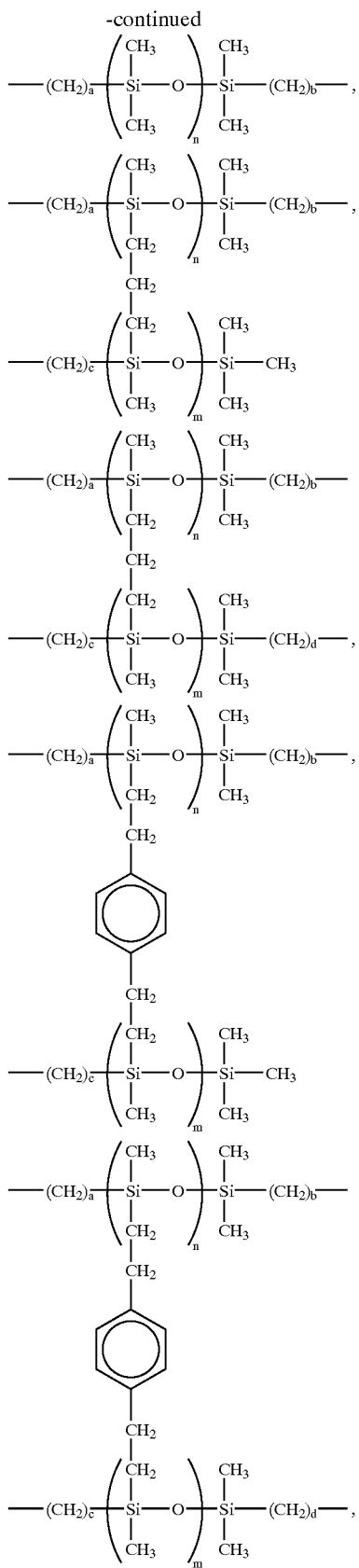

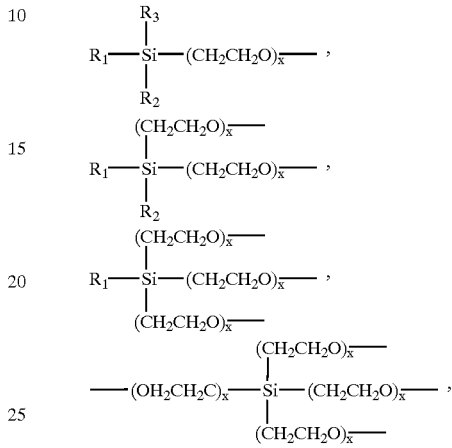

wherein m and n each, independently of the other, is an integer representing the number of repeat siloxane units, and typically is from about 3 to about 12, although the values of m and n can be outside of these ranges, and a, b, c, and d each, independently of the other, is an integer representing the number of repeat —CH$_2$— units, and typically is from 1 to about 6, and preferably from 1 to about 3, although the values of a, b, c, and d can be outside of these ranges, combinations of silylene groups and alkyleneoxy groups, including those of the general formulae wherein $R_1$, $R_2$, and $R_3$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and wherein each x, independently of the others, is an integer representing the number of repeat ethylene oxide groups, and typically is from about 3 to about 40, and preferably from about 9 to about 20, although the value of each x can be outside of these ranges, combinations of siloxane groups and alkyleneoxy groups, including those of the general formulae

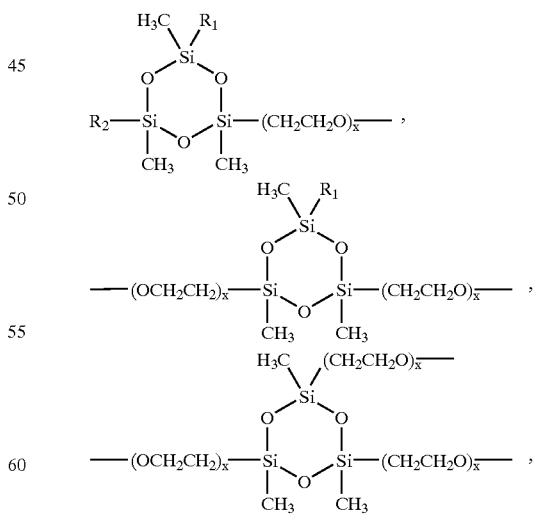

wherein $R_1$ and $R_2$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and wherein each x, independently of the others, is an integer representing the number of repeat ethylene oxide groups, and typically is from about 3 to about 40, and preferably from about 9 to about 20, although the value of each x can be outside of these ranges, other heterocyclic groups, such as those of the formulae

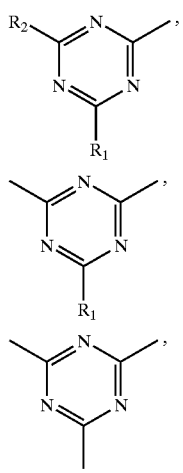

wherein $R_1$ and $R_2$ each, independently of the other, are alkyl groups (including linear, branched, cyclic, saturated, unsaturated, and substituted alkylene groups, and wherein hetero atoms, such as oxygen, sulfur, nitrogen, silicon, or the like, can be placed between the carbon atoms in the alkylene group), typically with from 1 to about 6 carbon atoms, although the number of carbon atoms can be outside of this range, and the like.

A few specific examples of suitable ink vehicle materials for the inks of the present invention include (but are not limited to) the following

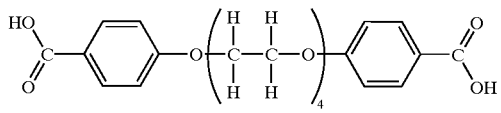

and

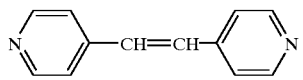

(a combination of a material of the formula A—$X_1$—A and a material of the formula B—$X_2$—B),

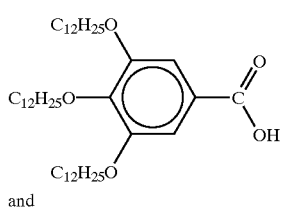

and

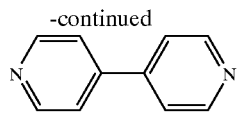

(a combination of a material of the formula W—A and a material of the formula B—X-B),

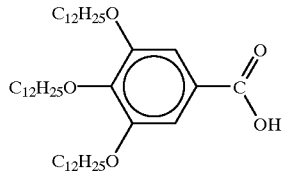

(a material of the formula W—C),

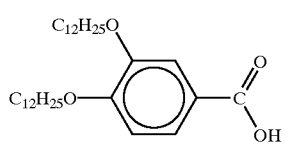

and

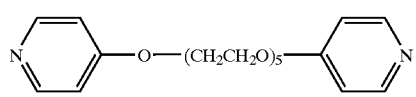

(a combination of a material of the formula W—A and a material of the formula B—X—B),

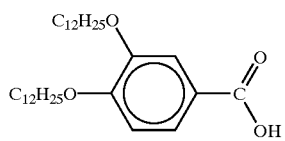

(a material of the formula W—C),

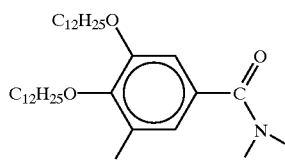

and

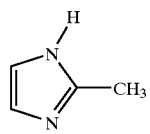

(a combination of a material of the formula $W_1$—A and a material of the formula $W_2$—B),

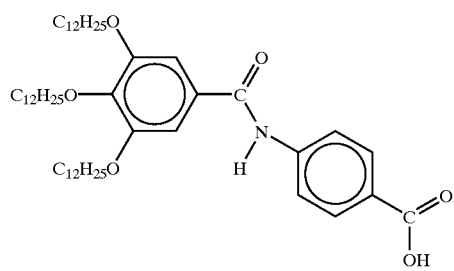
(a material of the formula W—C),
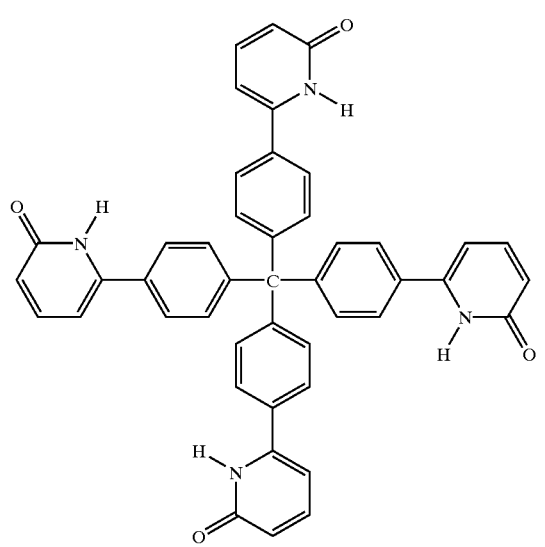
(a material of the formula C—Z—C),
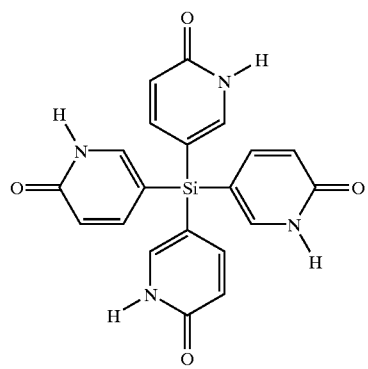
(a material of the formula C—Z—C),
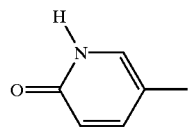
(a material of the formula W—C),
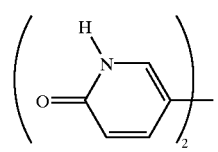
(a material of the formula C—X—C),
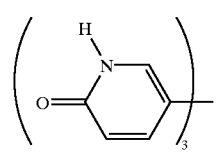
(a material of the formula C—Y—C),
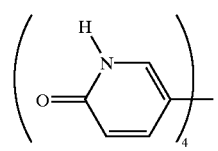
(a material of the formula C—Z—C),
(a material of the formula W—C),
(a material of the formula C—X—C), (a material of the formula 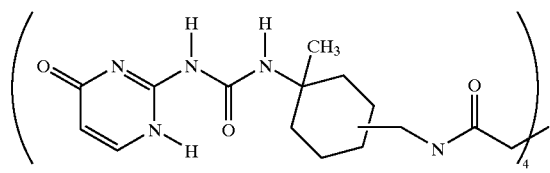),
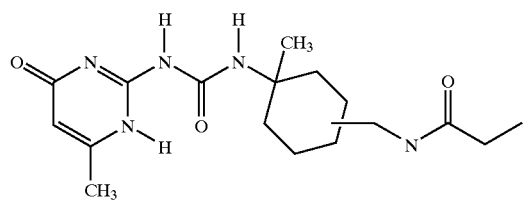
(a material of the formula C—Z—C with C branches),
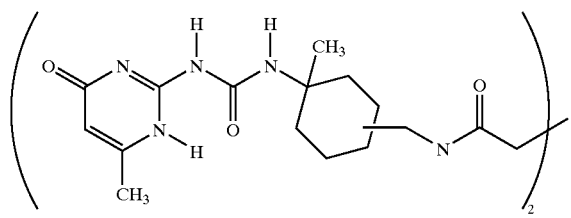
(a material of the formula W—C),
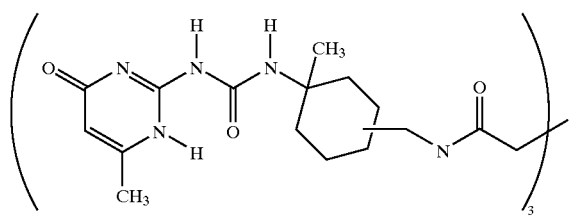
(a material of the formula C—X—C),
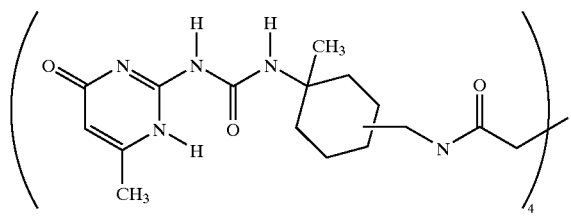
(a material of the formula 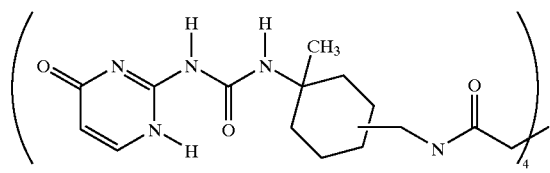),
(a material of the formula C—Z—C with C branches),
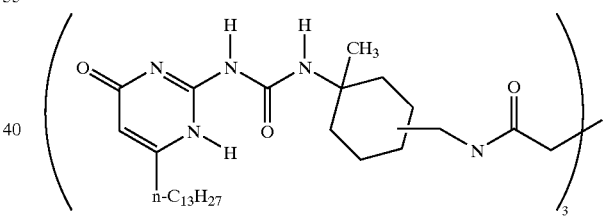
(a material of the formula W—C),
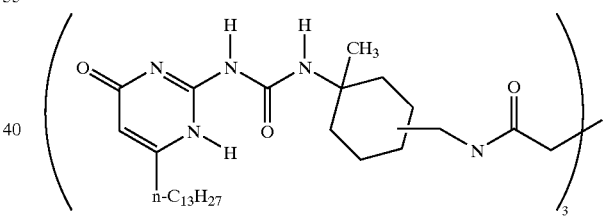
(a material of the formula C—X—C),
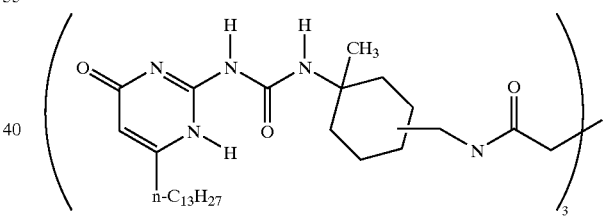
(a material of the formula 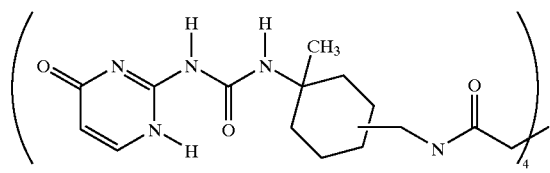),
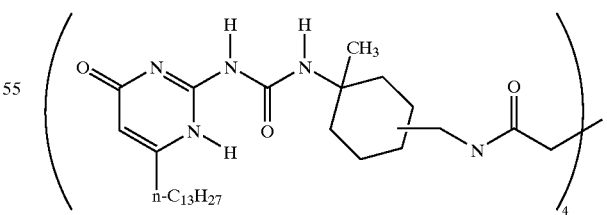
(a material of the formula C—Z—C with C branches),

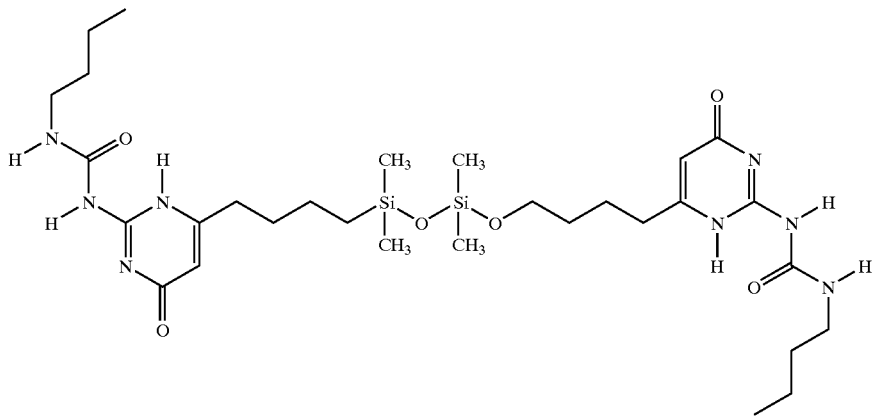

(a material of the formula C—X—C),

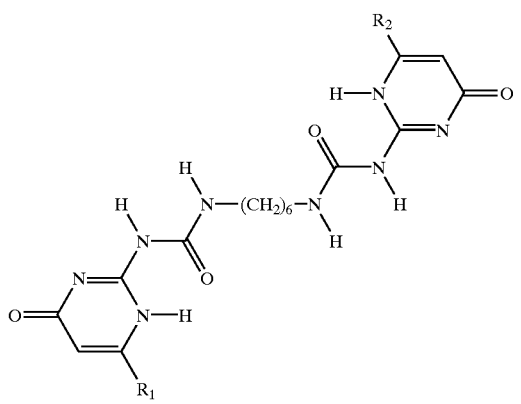

(a material of the formula C—X—C) wherein $R_1$ and $R_2$ each, independently of the other, is an alkyl group with from 1 to about 18 carbon atoms,

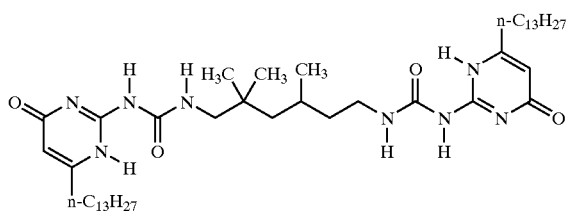

(a material of the formula C—X—C),

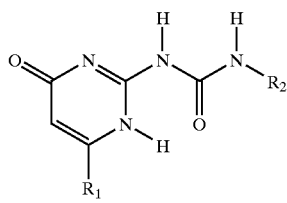

(a material of the formula W—C) wherein $R_1$ and $R_2$ each, independently of the other, is an alkyl group with from 1 to about 18 carbon atoms,

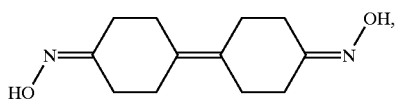

(a material of the formula C—X—C), and the like.

The "W", "X", "Y", and "Z" moieties, and/or the substituents, if any are present, on the "A", "B", and "C" groups are selected to enable the resulting ink vehicle material to be soluble, dispersible, or otherwise compatible with the other ink ingredients, and to obtain an ink melting point in the desired temperature range. Depending on the contents of the phase change ink, different "W", "X", "Y", "Z", and/or substituents on "A", "B", and "C" can be selected.

In inks wherein the ink vehicle is a combination of one or more materials containing one or more "A" groups and one or more materials containing one or more "B" groups, the "A" and "B" groups are present relative to each other in any desired or effective amount. If it is desired to maximize the degree of hydrogen-bonded polymerization within the image on the recording substrate, the ratio of "A" groups to "B" groups is approximately 1:1.

In inks wherein the ink vehicle is a combination of one or more materials containing one or more "A" groups and one or more materials containing one or more "B" groups, the "A" groups are acidic and the "B" groups are basic. The combination of ink vehicle materials, the "W", "X", "Y", and "Z" moieties, and the substituents, if any, on the "A" and "B" groups are selected so that the "A" groups form hydrogen bonds with the "B" groups without resulting in any substantial degree of deprotonation of the acidic hydrogen on the "A" groups, the "A" and "B" groups form a hydrogen bond, and not an ionic complex. For example, as illustrated in "Hydrogen-Bonded Liquid Crystals. A Novel Mesogen Incorporating Nonmesogenic 4,4'-Bipyridine through Selective Recognition between Hydrogen Bonding Donor and Acceptor," T. Kato et al., *Chemistry Letters*, p. 2003 (1990), the disclosure of which is totally incorporated herein by reference, there are five possibilities for interactions between an acid-containing group A—H and a base-containing group B, with one extreme being a complete covalent bond between A and H and the other extreme being complete deprotonation to form an ionic complex $A^-BH^+$, and with three intermediate stages of hydrogen bonding in between:

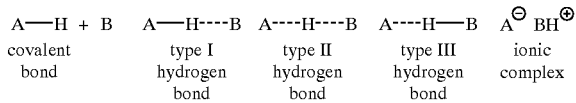

| covalent bond | type I hydrogen bond | type II hydrogen bond | type III hydrogen bond | ionic complex |

Provided that in the ink image on the recording substrate, after the ink has cooled to ambient temperature, the ink vehicle forms hydrogen-bonded oligomers or polymers, any of type I, type II, or type III hydrogen bonds are acceptable, but "A" and "B" are selected so that the ionic complex is not formed.

When the ink contains primarily a divalent, trivalent, and/or tetravalent ink vehicle, secondary vehicle materials of the formulae W—A, W—B, and W—C, wherein the "W" group is a monovalent moiety, can function as endcappers to the polymeric chains and networks formed by the divalent, trivalent, and/or tetravalent ink vehicle materials or mixture of materials. Higher amounts of secondary vehicle material generally result in the formation of shorter chains or networks, or lower molecular weight polymers. Since the degree of polymerization or polymer chain length is directly related to the viscosity and glass transition and melting temperatures of the hydrogen-bonded dimers, oligomers, or polymers, the concentration of monovalent endcapper can be used to substantially control these critical properties.

When present, the secondary vehicle material is present in the ink in any desired or effective amount; for inks containing materials with "A" and "B" groups, typically secondary vehicle materials of the formula W—A are present in amounts of from about 0.01 to about 10 moles of W—A materials per every 100 moles of "B" groups on the $X(B_1)(B_2)$, $X(A)(B)$, $Y(B_1)(B_2)(B_3)$, $Y(A)(B_1)(B_2)$, $Y(A_1)(A_2)(B)$, $Z(B_1)(B_2)(B_3)(B_4)$, $Z(A)(B_1)(B_2)(B_3)$, $Z(A_1)(A_2)(B_1)(B_2)$, and $Z(A_1)(A_2)(A_3)(B)$ components in in the ink, and preferably from about 0.01 about 2 moles of W-A materials per every 100 moles of "B" groups on the $X(B_1)(B_2)$, $X(A)(B)$, $Y(B_1)(B_2)(B_3)$, $Y(A)(B_1)(B_2)$, $Y(A_1)(A_2)(B)$, $Z(B_1)(B_2)(B_3)(B_4)$, $Z(A)(B_1)(B_2)(B_3)$, $Z(A_1)(A_2)(B_1)(B_2)$, and $Z(A_1)(A_2)(A_3)(B)$ components in the ink, although the relative amounts can be outside of these ranges; for inks containing ink vehicle materials with "C" groups, typically secondary vehicle materials of the formula W—C are present in amounts of from about 0.01 to about 10 moles of W—C materials per every 100 moles of "C" groups on the $X(C_1)(C_2)$, $Y(C_1)(C_2)(C_3)$, and $Z(C_1)(C_2)(C_3)(C_4)$ ink vehicle materials in the ink, and preferably from about 0.01 to about 1.0 mole of W—C materials per every 100 moles of "C" groups on the $X(C_1)(C_2)$, $Y(C_1)(C_2)(C_3)$, and $Z(C_1)(C_2)(C_3)(C_4)$ ink vehicle materials in the ink, although the relative amounts can be outside of these ranges.

The ink vehicles of the inks of the present invention form reversible hydrogen bonds, resulting in the formation of dimers, oligomers, polymers, or polymer networks held together by hydrogen bonds instead of covalent bonds. While not being limited to any particular theory, it is believed that in the inks of the present invention, some of these hydrogen bonds can be broken at the temperatures at which hot melt ink jet printing occurs (typically, although not necessarily, over 100° C.). When the ink is printed onto an intermediate transfer member or a final recording substrate, the ink cools as it is printed, which results in reformation of any hydrogen bonds broken by heating. The polymer-like materials thus formed behave like conventional covalently-bonded polymers to enhance image permanence.

When the ink vehicle is a combination of one or more materials having "A" groups and one or more "B" groups, hydrogen bonds can form, for example, as follows:

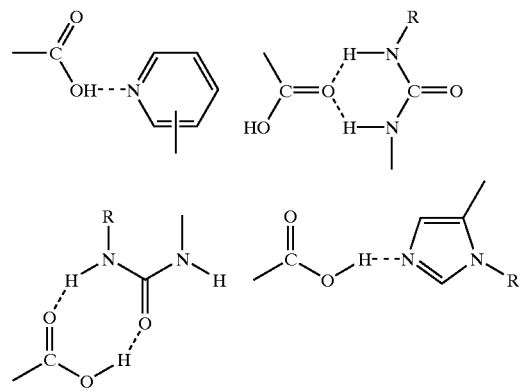

and the like. When the ink vehicle is one or more materials containing "C" groups, hydrogen bonds can form, for example, as follows:

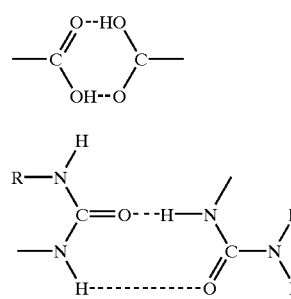

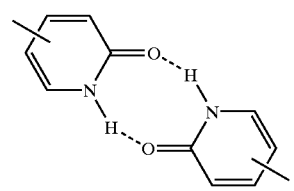

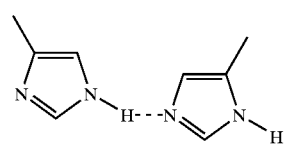

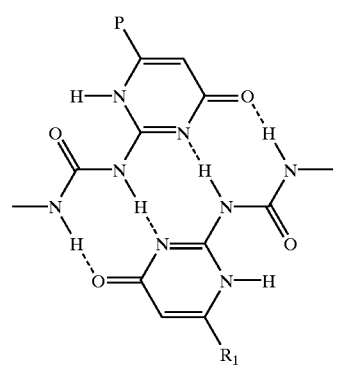

-continued

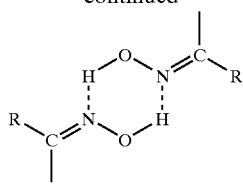

and the like. Generally, the more hydrogen bonds formed between an "A" group and a "B" group, or between two "C" groups, the more strongly bound are the moieties containing these groups, and the more energy is needed to break these hydrogen bonds. In addition, generally the greater the stability constant of the hydrogen-bonded complex, the greater the tendency for the "A" and "B" groups, or for the "C" groups, to associate.

The "A", "B", and "C" groups within an ink vehicle molecule or within a mixture of molecules comprising an ink vehicle can be either the same as each other or different from each other. For example, the compound

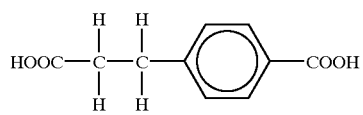

is an example of a material of the general formula $A_1$—X—$A_2$, wherein $A_1$ is

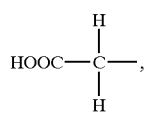

$A_2$ is

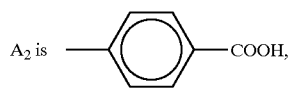

-continued

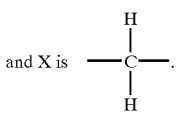

The different acidities of the carboxyl groups in $A_1$ and $A_2$ can affect the hydrogen bonding characteristics thereof.

Within the ink vehicle material, mixtures can be prepared of materials having the same "A", "B", and/or "C" groups but with some being bonded to a divalent "X" moiety and others to a trivalent "Y" moiety and/or a tetravalent "Z" moiety, or with some being bonded to a trivalent "Y" moiety and others to a tetravalent "Z" moiety. For example, an ink vehicle can comprise a mixture of molecules of the formula C—X—C and molecules of the formula $Y(C)_3$ and/or molecules of the formula $Z(C)_4$. By adjusting the relative amounts of "X", "Y", and "Z" bonded molecules in such a mixture, the degree of hydrogen-bonded oligomerization or polymerization and the structure of the resulting hydrogen-bonded oligomer or polymer chain or network can be controlled.

The various different "A", "B", and "C" groups can be placed on the "W", "X", "Y", and "Z" groups by any desired or suitable method. For example, oxime groups can be placed by reacting the corresponding ketone group with $NH_2OH$, as follows:

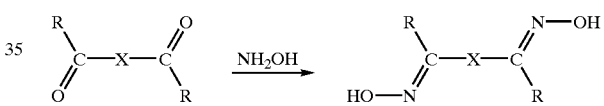

Hydroxy-substituted "W", "X", "Y", or "Z" groups can be substituted by reacting the hydroxy-substituted compound with a diisocyanate to place an isocyanate-substituted group on the originally hydroxy-substituted compound; thereafter, the isocyanate group can be further reacted with an amine containing the desired group, as follows:

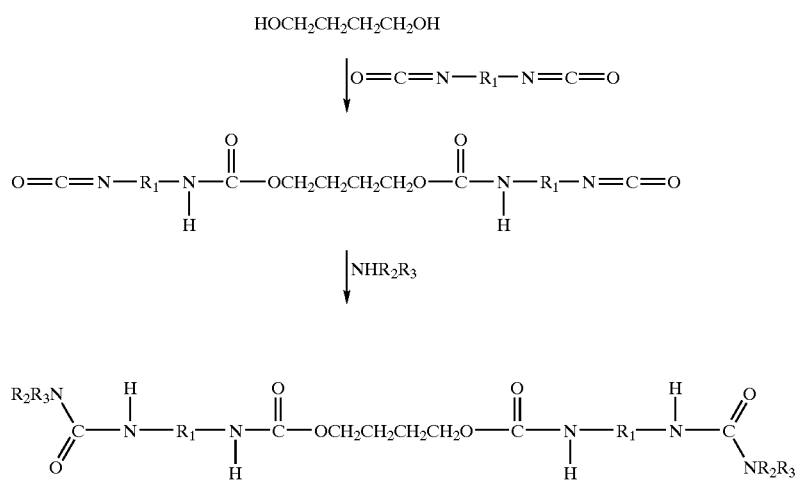

A specific embodiment of this method, used for placing ureidopyrimidone moieties onto central groups, is disclosed by Lange et al., *Journal of Polymer Science: Part A: Polymer Chemistry*, Vol. 37, p. 3657 (1999), the disclosure of which is totally incorporated herein by reference. Ink vehicle materials wherein the central moiety is a tetravalent silicon atom can be prepared from tetrakis(dimethylsiloxy) silane by reaction with allyl alcohol in the presence of a platinum catalyst, as follows:

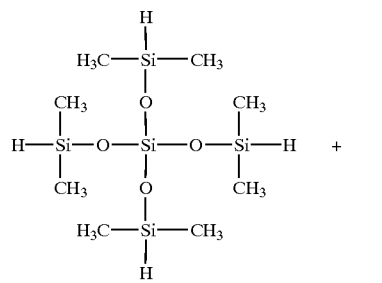

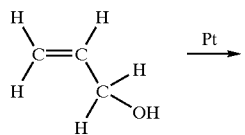

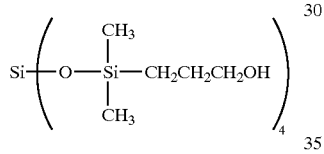

The hydroxy groups on the hydroxypropyl substituted silane can then be further reacted by known methods to place other desired groups thereon, such as polyalkylene oxide chains or the like. Additionally, substituents such as carboxylic acid containing moieties can be placed on a tetravalent silicon atom by reacting an ethylenically unsaturated carboxylic acid with tetrakis(dimethylsiloxy)silane in the presence of a platinum catalyst, as follows:

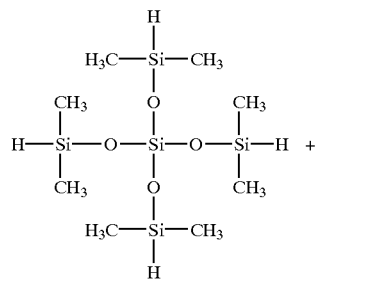

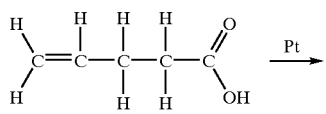

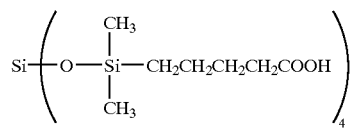

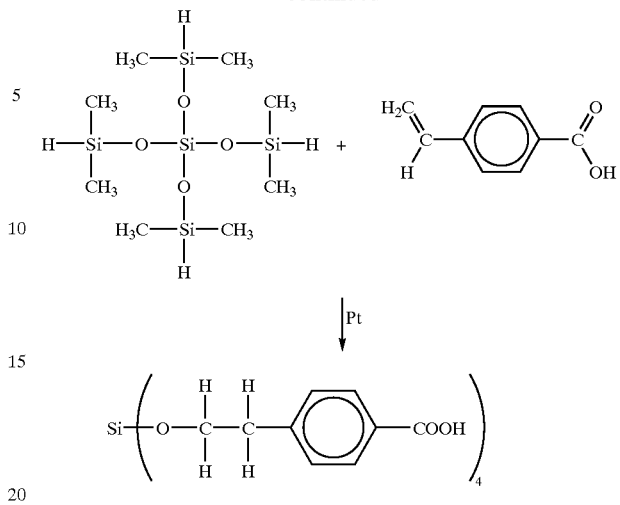

The various different "W", "X", "Y", and "Z" groups upon which the "A", "B", and "C" groups are placed can be prepared by any desired or suitable method. For example, a branched tetravalent "Z" group comprising a silicon atom with four polyethylene oxide chains bonded thereto can be prepared from tetrakis(dimethylsiloxy)silane by reaction with an allyl-substituted polyethylene oxide chain of the desired length, of the formula $CH_2$=CH—$CH_2$—O—$(CH_2CH_2O)_n$H (wherein n is an integer representing the number of repeat polyethylene oxide units), in the presence of a platinum catalyst. A branched trivalent "Y" group of the formula

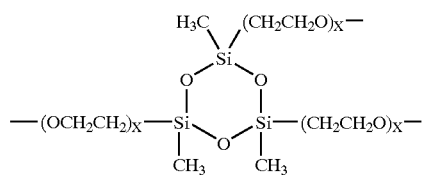

can be prepared by the reaction of the methyl hydrogen silane starting material, of the formula

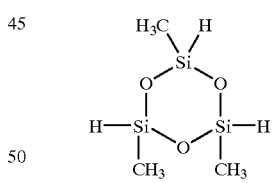

an allyl-substituted polyethylene oxide chain of the desired length, of the formula $CH_2$=CH—$CH_2$—O—$(CH_2CH_2O)_n$ H (wherein n is an integer representing the number of repeat polyethylene oxide units), in the presence of a platinum catalyst. Suitable "W", "X", "Y", and "Z" polyethylene glycol/polypropylene glycol moieties are also commercially available as the polyol-initiated polyetherpolyol and the amine-initiated polyetherpolyol VORANOL® materials from Dow Chemical Co., Midland, Mich., including VORANOL® 270 (triol, average molecular weight 700), 280 (functionality=7, average molecular weight 1,380), 335 (functionality=3.8, average molecular weight 640), 360 (functionality=4.5, average molecular weight 728), 370 (functionality=7.0, average molecular weight 1,040), 415 (triol, average molecular weight 6,000), 446 (functionality=

4.5, average molecular weight 566), 490 (functionality=4.3, average molecular weight 460), 520 (functionality=5.1, average molecular weight 550), 3010 (triol, average molecular weight 3,000), 391 (functionality=4, average molecular weight 575), 770 (functionality=4, average molecular weight 292), 800 (functionality=4, average molecular weight 278), and the like.

Methods for preparing suitable "W", "X", "Y", and "Z" groups are also disclosed in, for example, "Novel Hyperbranched Resins for Coating Applications," R. A. T. M. van Benthem, DSM Research, Geleen, Neth. *Prog. Org. Coat.* (2000), 40(1–4), 203–214; "Synthesis of an Organosilicon Hyperbranched Oligomer containing Alkenyl and Silyl Hydride Groups," J. Yao et al., *J. Polym. Sci., Part A: Polym. Chem.* (1999), 37(20), 3778–3784; "A New Approach to Hyperbranched Polymers by Ring-Opening Polymerization of an AB Monomer: 4-(2-Hydroxyethyl)-ε-Caprolactone," M. Liu et al., *Macromolecules* (1999), 32(20), 6881–6884; "Architectural Control in Hyperbranched Macromolecules," C. J. Hawker et al., *Polym. Mater. Sci. Eng.* (1995), 73 171-2, "Preparation of Polymers with Controlled Architecture: Synthesis and Polymerization of Hyperbranched Macromonomers," C. J. Hawker et al., *Polym. Mater. Sci. Eng.* (1991), 64 73–4; and "Hyperbranched Poly (siloxysilanes)," L. J. Mathias et al., *J. Am. Chem. Soc.* (1991), 113(10), 4043–4; the disclosures of each of which are totally incorporated herein by reference.

Further information regarding the composition, synthesis, and characterization of suitable ink vehicle materials for the inks of the present invention is disclosed in, for example, "Reversible Polymers Formed from Self-Complementary Monomers Using Quadruple Hydrogen Bonding," R. P. Sijbesma et al., *Science,* Vol. 278, p. 1601 (1997); "Supramolecular Polymers," R. Dagani, *Chemical and Engineering News,* p. 4 (December 1997); "Supramolecular Polymers from Linear Telechelic Siloxanes with Quadruple-Hydrogen-Bonded Units," J. H. K. Hirschberg et al., *Macromolecules,* Vol. 32, no. 8, p. 2696 (1999); "Design and Synthesis of 'Smart' Supramolecular Liquid Crystalline Polymers via Hydrogen-Bond Associations," A. C. Griffin et al., *PMSE Proceedings,* Vol. 72, p. 172 (1995); "The Design of Organic Gelators: Solution and Solid State Properties of a Family of Bis-Ureas," Andrew J. Carr et al., *Tetrahedron Letters,* Vol. 39, p. 7447 (1998); "Hydrogen-Bonded Supramolecular Polymer Networks," Ronald F. M. Lange et al., *Journal of Polymer Science, Part A: Polymer Chemistry,* Vol. 37, p. 3657 (1999); "Combining Self-Assembly and Self-Association—Towards Columnar Supramolecular Structures in Solution and in Liquid-Crystalline Mesophase," Arno Kraft et al., *Polym. Mater. Sci. Eng.,* Vol. 80, p. 18 (1999); "Facile Synthesis of β-Keto Esters from Methyl Acetoacetate and Acid Chloride: The Barium Oxide/Methanol System," Y. Yuasa et al., *Organic Process Research and Development,* Vol. 2, p. 412 (1998); "Self-Complementary Hydrogen Bonding of 1,1'-Bicyclohexylidene-4,4'-dione Dioxime. Formation of a Non-Covalent Polymer," F. Hoogesteger et al., *Tetrahedron,* Vol. 52, No. 5, p. 1773 (1996); "Molecular Tectonics. Three-Dimensional Organic Networks with Zeolite Properties," X. Wang et al., *J. Am. Chem. Soc.,* Vol. 116, p. 12119 (1994), "Helical Self-Assembled Polymers from Cooperative Stacking of Hydrogen-Bonded Pairs," J. H. K. Ky Hirschberg et al., *Nature,* Vol. 407, p. 167 (2000); "New Supramolecular Arrays based on Interactions between Carboxylate and Urea Groups: Solid-State and Solution Behavior," Abdullah Zafar et al., *New J. Chem.,* 1998, 137–141; M. J. Brienne et al., *J. Chem. Soc. Chem. Commun.,* p. 1868 (1989); T. Kato et al., *J. Am. Chem. Soc.,* Vol. 111, p. 8533 (1989); C. Alexander et al., *Makromol. Chem. Makromol. Symp.,* Vol. 77, p. 283 (1994); T. Kato et al., *Macromolecules,* Vol. 22, p. 3818 (1989); J. M. Lehn et al., *J. Chem. Soc. Chem. Commun.,* p. 479 (1990); C. P. Lillya, *Macromolecules,* Vol. 25, p. 2076 (1992); P. Brunet et al., *J. Am. Chem. Soc.,* Vol. 119, p. 2737 (1997); Y. Aoyama et al., *J. Am. Chem. Soc.,* Vol. 118, p. 5562 (1996); S. Kolotuchin et al., *Angew. Chem. Int. Ed. Eng.,* Vol. 34, p. 2654 (1996); A. Zafar et al., *Tetrahedron Lett.,* p. 2327 (1996); J. Yang et al., *Tetrahedron Lett.,* p. 3665 (1994); F. Garcia Tellado et al., *J. Am, Chem. Soc.,* Vol. 113, p. 9265 (1991); A. Zafar et al., *New Journal of Chemistry,* Vol. 22, p. 137 (1998); K. Hanabusa et al., *Chem. Left.,* p. 885 (1996); K. Hanabusa et al., *Angew. Chem. Int. Ed. Engl.,* Vol 35, p. 1949 (1996), J. Esch et al., *Chem. Eur. J.,* Vol. 3, p. 1238 (1997); M. de Loos et al., *J. Am. Chem. Soc.,* Vol. 119, p. 12675 (1997); E. Fan et al., *J. Am. Chem. Soc.,* Vol. 115, p. 369 (1993); F. H. Beijer et al., *J. Am. Chem. Soc.,* Vol. 120, p, 6761 (1998); B. J. B. Folmer et al., *Chem, Commun.,* p. 1629 (1998); B. J. B. Folmer et al., *Polymer Preprints,* Vol. 80, p. 20 (1999); F. Zeng et al., *Chem. Rev.,* Vol. 97, p. 1681 (1997); A. R. A. Palmans et al., *Chem. Eur. J.,* Vol. 3, p. 300 (1997); V. Percec et al., *Nature,* Vol 391, p. 161 (1998); A. Kraft et al., *J. Chem. Soc. Perkin Trans.* 1, p. 1019 (1998), A. Kraft et al., *Chem. Commun.,* p. 1085 (1998); G. Gottarelli et al., *J. Chem. Soc. Chem. Commun.,* p. 2555 (1995); G. Laughlan et al., *Science,* Vol. 265, p. 520 (1994); and B. J. B. Folmer et al., *Advanced Materials,* Vol. 12, p. 874 (2000); the disclosures of each of which are totally incorporated herein by reference.

The ink vehicle material or mixture of ink vehicle materials is present in the ink in any desired or effective amount, typically at least about 25 percent by weight, preferably at least about 50 percent by weight, and more preferably at least about 75 percent by weight, and typically no more than about 98 percent by weight, although the amount can be outside of these ranges.

Particularly preferred groups within "W", "X", "Y", and "Z", and particularly preferred substituents on "A", "B", and "C" include polyethylene oxide chains, polypropylene oxide chains, and the like, as well as mixtures thereof.

The hydrogen bonds form between the "A" groups and the "B" groups or between the "C" groups when the ink has been applied to a recording substrate (such as an intermediate transfer member or a final recording substrate) in an image pattern.

The formation of hydrogen-bonded oligomers or polymers from specific ink vehicle materials can be determined by any desired method. For example, a dramatic onset of resinous and viscoelastic characteristics on cooling is indicative of the formation of hydrogen-bonded oligomers or polymers from the ink vehicle material or combination of materials. The formation of hydrogen bonds and hydrogen-bonded oligomers or polymers can also be detected by IR spectroscopy. NMR spectroscopy may also help to detect the presence of hydrogen-bonded oligomers or polymers. In situations wherein the ink vehicle material is crystalline, X-ray crystallography can be used to define the oligomeric or polymeric structure.

In some embodiments of the present invention, the ink vehicle material functions as the sole ink vehicle for the hot melt ink composition. In other embodiments, if desired, other hot melt ink vehicles can be present in combination with the ink vehicles of the present invention.

Any desired or effective colorant can be employed in the inks of the present invention, including dyes, pigments, mixtures thereof, and the like, provided that the colorant can be dissolved or dispersed in the ink vehicle, with spirit soluble dyes being preferred. The colorant is present in the ink in any desired or effective amount to obtain the desired color and hue, typically no less than about 0.5 percent by weight of the ink, and preferably no less than about 1 percent by weight of the ink, and typically no more than about 15 percent by weight of the ink, preferably no more than about 10 percent by weight of the ink, and more preferably no more than about 5 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich), Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G10 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell), Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D 1355, D 1351 (BASF); Hostaperm Pink E (American Hoechst); Fanal Pink D4830 (BASF); Cinquasia Magenta (Du Pont), Paliogen Black L0084 (BASF); Pigment Black K801 (BASF); and carbon blacks such as REGAL 330® (Cabot), Carbon Black 5250, Carbon Black 5750 (Columbia Chemical), and the like.

When the ink vehicle material comprises a molecule with oligoalkylene oxide or polyalkylene oxide groups, water soluble dyes can be employed, such as anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131; 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical, Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical, Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc., D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF), Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyne® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof.

When the ink vehicle material comprises a molecule with large hydrocarbon groups or with oligosiloxane or polysiloxane groups, Solvent dyes can be employed, such as spirit soluble dyes and the like. Examples of suitable spirit solvent dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), and the like.

The inks of the present invention can optionally contain a conductivity enhancing agent when conductive inks are desirable, as in applications such as electric field assisted hot melt acoustic ink printing processes, particularly when the desired conductivity values are not obtained as a result of the other ink components, such as the colorant. Any desired or effective conductivity enhancing agent can be employed. Specific examples of suitable conductivity enhancing agents include complexes of dianilines, including dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis(2,6-diisopropyl-N,N-dimethylaniline) (Aldrich 40,353-9), (8) 4,4'-methylene bis (N,N-dimethylaniline) (Aldrich M4,445-1), (9) 4,4'-methylene bis (2,6-dimethylaniline) (Aldrich 36,079-1), (10) 4,4'-methylene bis (3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like, as well as mixtures thereof, said dianilines being complexed with, for example, conductivity inducing phosphorous compounds such as phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. Additional suitable conductivity enhancing agents include (1) (diethyl-(4-aminobenzyl) phosphonate (Aldrich 33,847-8), (2) diethyl-(phthalimidomethyl) phosphonate (Aldrich 36,622-6), (3) diethyl-(2,2,2-trifluoro-1-hydroxyethyl) phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,773-4), (8) zinc cyclohexanebutyrate (Aldrich 22,841-9), (9) zinc stearate (Aldrich 30,756-4), (10) methyl-1-adamantane sulfonate (Aldrich 40,956-1), (11) octadecyl-4-chlorobenzene sulfonate (Aldrich 47,799-0), (12) tetrabutylammonium trifluoromethanesulfonate (Aldrich 34,509-1), (13) S,S'-ethylene-p-toluene thiosulfonate (Aldrich 23,257-2), (14) pyridinium-3-nitrobenzene sulfonate (Aldrich 27,198-5), (15) p-toluene sulfonyl chloride (Aldrich 24,087-7), (16) o-toluene sulfonyl chloride (Aldrich 15,971-9), (17) 1-(p-toluene sulfonyl) imidazole (Aldrich 24,424-4), (18) 1-(p-toluene sulfonyl)-3-nitro-1,2,4-triazole (Aldrich 24,417-1), (19) 2,4,6-triisopropyl benzene sulfonyl chloride (Aldrich 11,949-0), (20) 1-(2,4,6-triisopropyl benzene sulfonyl) imidazole (Aldrich 40,948-0), (21) 1-(2,4,6-triisopropyl benzene sulfonyl)-3-nitro-1,2,4-triazole (Aldrich 40,948-0), (22) 4-nitrobenzene sulfonyl chloride (Aldrich 27,224-8), and the like, as well as mixtures thereof. The conductivity enhancing agent, when present, is present in the ink in any desired or effective amount, typically at least about 0.25 percent by weight of the ink, preferably at least about 0.5 percent by weight of the ink, more preferably at least about 2 percent by weight of the ink, even more preferably at least about 8 percent by weight of the ink, and still more preferably at least about 13 percent by weight, and typically no more than about 50 percent by weight of the ink, preferably no more than about 45 percent by weight of the ink, more preferably no more than about 35 percent by weight of the ink, even more preferably no more than about 25 percent by weight of the ink, and still more preferably no more than about 20 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include (but are not limited to) (1) 2,6-di-tert-butyl-4-methoxyphenol (Aldrich 25,106-2), (2) 2,4-di-tert-butyl-6-(4-methoxybenzyl) phenol (Aldrich 23,008-1), (3) 4-bromo-2,6-dimethylphenol (Aldrich 34,951-8), (4) 4-bromo-3,5-didimethylphenol (Aldrich B6,420-2), (5) 4-bromo-2-nitrophenol (Aldrich 30,987-7), (6) 4-(diethyl aminomethyl)-2,5-dimethylphenol (Aldrich 14,668-4), (7) 3-dimethylaminophenol (Aldrich D14,400-2), (8) 2-amino-4-tert-amylphenol (Aldrich 41,258-9), (9) 2,6-bis(hydroxymethyl)-p-cresol (Aldrich 22,752-8), (10) 2,2'-methylenediphenol (Aldrich B4,680-8), (11) 5-diethylamino)-2-nitrosophenol (Aldrich 26,951-4), (12) antimony dialkyl phosphorodithioate (commercially available from Vanderbilt), (13) molybdenum oxysulfide dithiocarbamate (commercially available from Vanderbilt), (14) (nickel-bis(o-ethyl(3,5-di-tert-butyl-4-hydroxybenzyl) phosphonate (commercially available from Ciba Geigy), (15) 4,4'-methylene-bis(dibutyldithiocarbamate) (commercially available as Vanlube 7723 from Vanderbilt), (16) tetrasodium-N-(1,2-dicarboxyethyl)-N-octadecyl sulfosuccinamate (commercially available from American Cyanamid), (17) 2,6-di-tert-butyl-α-dimethylamino-4-cresol (commercially available as Ethanox-703 from Ethyl Corporation), (18) 2,2'-isobutylidene-bis(4,6-dimethyl phenol) (commercially available as Vulkanox NKF from Mobay Chemicals), (19) 2,2'-methylenebis(6-tert-butyl-4-methylphenol) (commercially available as Cyanox-2246, Aldrich 41,315-5), (20) 2,2'-methylenebis(6-tert-butyl-4-ethylphenol) (commercially available as Cyanox-425, Aldrich 41,314-3), (21) N-isopropyl-N'-phenyl-phenylene diamine (commercially available as Santoflex-IP from Monsanto Chemicals), (22) N-(1,3-dimethylbutyl)-N'-phenyl-phenylene-diamine (commercially available as Santoflex-13 from Monsanto Chemicals), (23) N,N'-di(2-octyl)-4-phenylene diamine (commercially available as Antozite-1 from Vanderbilt), (24) N,N'-bis(1,4-dimethylpentyl)-4-phenylene diamine (commercially available as Santoflex-77 from Monsanto Chemicals), (25) 2,4,6-tris-(N-1,4-dimethyl pentyl-4-phenylenediamino)-1,3,5-triazine (commercially available as Durazone-37 from Uniroyal), (26) D-raffinose pentahydrate (Aldrich 20,667-9), (27) 2,2'-methylene bis(6-tert-butyl-4-methyl-phenol) (Aldrich 41,313-5), (28) 2,6-ditert-butyl-4-(dimethylaminomethyl) phenol (Aldrich 41,327-5), (29) 4-dodecylresorcinol (Aldrich D22,260-7), (30) Irganox 1010, and the like, as well as mixtures thereof. When present, the optional antioxidants are present in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

The inks of the present invention can also optionally contain a UV absorber. The optional UV absorbers in the inks of the present invention primarily protect the images generated therewith from UV degradation. Specific examples of suitable UV absorbers include (but are not limited to) (1) 2-amino-2',5-dichlorobenzophenone (Aldrich 10,515-5), (2) 2'amino-4',5'-dimethoxyacetophenone (Aldrich 32,922-3), (3) 2-benzyl-2-(dimethylamino)-4'-morpholino butyrophenone (Aldrich 40,564-7), (4) 4'-benzyloxy-2'-hydroxy-3'-methylacetophenone (Aldrich 29,884-0), (5) 4,4'-bis(diethylamino) benzophenone (Aldrich 16,032-6), (6) 5-chloro-2-hydroxy benzophenone (Aldrich C4,470-2), (7) 4'-piperazinoacetophenone (Aldrich 13,646-8), (8) 4'-piperidinoacetophenone (Aldrich 11,972-5), (9) 2-amino-5-chlorobenzophenone (Aldrich A4,556-4), (10) 2-bromo-2',4-dimethoxyacetophenone (Aldrich 19,948-6), (11) 2-bromo-2',5'-dimethoxyacetophenone (Aldrich 10,458-2), (12) 2-bromo-3'-nitroacetophenone (Aldrich 34,421-4), (13) 2-bromo-4'-nitroacetophenone (Aldrich 24,561-5), (14) 3',5'-diacetoxyacetophenone (Aldrich 11,738-2), (15) 2-phenylsulfonyl) acetophenone (Aldrich 34,150-3), (16) 3'-aminoacetophenone (Aldrich 13,935-1), (17) 4'-aminoacetophenone (Aldrich A3,800-2), (18) 1H-benzotriazole-1-acetonitrile (Aldrich 46,752-9), (19) 2-(2H-benzotriazol-2-yl)-4,6-di-tert-pentylphenol (Aldrich 42,274-6), (20) 1,1-(1,2-ethane-diyl)bis(3,3,5,5-tetramethylpiperazinone) (commercially available from Goodrich Chemicals), (21) 2,2,4-trimethyl-1,2-hydroquinoline (commercially available from Mobay Chemical), (22) 2-(4-benzoyl-3-hydroxy phenoxy) ethylacrylate, (23) 2-dodecyl-N-(1,2,2,6,6-pentamethyl-4-piperidinyl) succinimide (commercially available from Aldrich Chemical Co., Milwaukee, Wis.), (24) 2,2,6,6-tetramethyl-4-piperidinyl/β,β,β',β'-tetramethyl-3,9-(2,4,8,10-tetraoxo spiro(5,5)-undecane) diethyl)-1,2,3,4-butane tetracarboxylate (commercially available from Fairmount), (25) N-ρ-ethoxycarbonylphenyl)-N'-ethyl-N'-phenylformadine (commercially available from Givaudan), (26) 6-ethoxy-1,2-dihydro-2,2,4-trimethylquinoline (commercially available from Monsanto Chemicals), (27) 2,4,6-tris-(N-1,4-dimethylpentyl-4-phenylenediamino)-1,3,5-triazine (commercially available from Uniroyal), (28) 2-dodecyl-N-(2,2,6,6-tetramethyl-4-piperidinyl) succinimide (commercially available from Aldrich Chemical Co.), (29) N-(1-acetyl-2,2,6,6-tetramethyl-4-piperidinyl)-2-dodecyl succinimide (commercially available from Aldrich Chemical Co.), (30) (1,2,2,6,6-pentamethyl-4-piperidinyl/β, ββ',β'-tetramethyl-3,9-(2,4,8,10-tetraoxo-spiro-(5,5) undecane)diethyl)-1,2,3,4-butane tetracarboxylate (commercially available from Fairmount), (31) (2,2,6,6-tetramethyl-4-piperidinyl)-1,2,3,4-butane tetracarboxylate (commercially available from Fairmount), (32) nickel dibutyl dithio carbamate (commercially available as UV-Chek AM-105 from Ferro), and the like, as well as mixtures thereof. The optional UV absorber, when present, is present in the ink in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

Other optional additives to the inks include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300 and NEVTAC® 80 (commercially available from Neville Chemical Company), WINGTACK® 86, a modified synthetic polyterpene resin (commercially available from Goodyear), and the like, in an amount typically of at least about 1 percent by weight of the ink, and preferably at least about 3 percent by weight of the ink, and typically no more than about 40 percent by weight of the ink, preferably no more than about 20 percent by weight of the ink, and more preferably no more than about 10 percent by weight of the ink, although the amount can be outside of this range, adhesives, such as VERSAMID® 757, 759, or 744 (commercially available from Henkel), in an amount typically of at least about 0.5 percent by weight of the ink, preferably at least about 5 percent by weight of the ink, and more preferably at least about 110 percent by weight of the ink, and typically no more than about 50 percent by weight of the ink, preferably no more than about 40 percent by weight of the ink, and more preferably no more than about 20 percent by weight of the ink, although the amount can be outside of this range, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), KP-140®, a triphenyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount typically of at least about 0.5 and typically no more than about 20 percent by weight of the ink, and preferably no more than about 10 percent by weight of the ink, although the amount can be outside of this range, and the like.

The ink compositions of the present invention typically are solid at temperatures of about 50° C. and lower, preferably solid at temperatures of about 70° C. and lower, and more preferably solid at temperatures of about 80° C. and lower, and typically have viscosity values of from about 5 to 30 centipoise at temperatures no higher than about 160° C., preferably no higher than about 140° C., and more preferably no higher than about 120° C., although the temperature at which these viscosities are achieved can be outside of these ranges.

The ink compositions of the present invention generally have viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges.

The ink compositions of the present invention can be prepared by any desired or suitable method. For example, the ink ingredients can be mixed together, followed by heating, typically to a temperature of from about 100 to about 140° C., although the temperature can be outside of this range, and stirring or milling until a homogeneous ink composition is obtained, followed by cooling the ink to ambient temperature (typically from about 20 to about 25° C.). The inks of the present invention are solid at ambient temperature.

The present invention is also directed to a process which entails incorporating an ink of the present invention into an ink jet printing apparatus, melting the ink, and causing droplets of the melted ink to be ejected in an imagewise pattern onto a recording sheet. In one specific embodiment, the printing apparatus employs a piezoelectric printing process wherein droplets of the ink are caused to be ejected in imagewise pattern by oscillations of piezoelectric vibrating elements. In another specific embodiment, the printing apparatus employs an acoustic ink jet process, wherein droplets of the ink are caused to be ejected in imagewise pattern by acoustic beams. In another specific embodiment, the droplets of melted ink are caused to be ejected onto an intermediate transfer member, followed by transfer of the image from the intermediate transfer member to a recording sheet. In a specific embodiment, the intermediate transfer member is heated to a temperature above that of the final recording sheet and below that of the melted ink in the printing apparatus. Inks of the present invention can also be employed in other hot melt printing processes, such as hot melt thermal ink jet printing, hot melt continuous stream or deflection ink jet printing, or the like.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Synthesis of Compound I, Tetraethylene Glycol Di-para-benzoic Acid

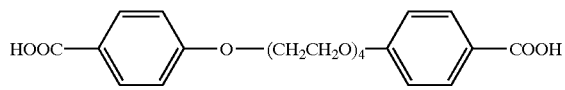

Tetraethylene glycol di-para-benzoic acid is prepared in accordance with a procedure published by Alexander et al. (*Polym. Prepr (Am. Chem. Soc., Div. Polym. Chem.*) 1993, 34(1), 168–169), the disclosure of which is totally incorporated herein by reference, by reaction of ethyl-para-hydroxybenzoate with tetraethylene glycol di-para-tosylate. Thus 10 grams (19.9 mmole) of tetraethyleneglycol di-ρ-tosylate, 6.61 grams (39.8 mmole) of ethyl-ρ-hydroxybenzoate, 1.74 grams (43.5 mmole) of sodium hydroxide, and 120 milliliters of 2-propanol are charged to a 250 milliliter round-bottomed flask equipped with a TEFLON® paddle stirrer and a reflux condenser. The mixture is refluxed for about 10 hours, during which time a white precipitate is formed. The precipitate (sodium tosylate) is removed by filtration and washed with 2-propanol. The filtrate is then collected and solvent is removed in vacuo to yield an oily liquid. 100 milliliters of 10 percent sodium hydroxide (w/v) in 95 percent ethanol is added to the oily product and the mixture is refluxed for 1 hour. Solvent is then removed and the solid residue is dissolved in 300 milliliters of water. The aqueous solution is acidified with hydrochloric acid, and the resulting precipitate is isolated by filtration and recrystallized from ethanol to give tetraethylene glycol di-para-benzoic acid in a yield of greater than 80 percent.

EXAMPLE II

Synthesis of Compound II, Tetrakis(4-pyridyloxymethylene)methane

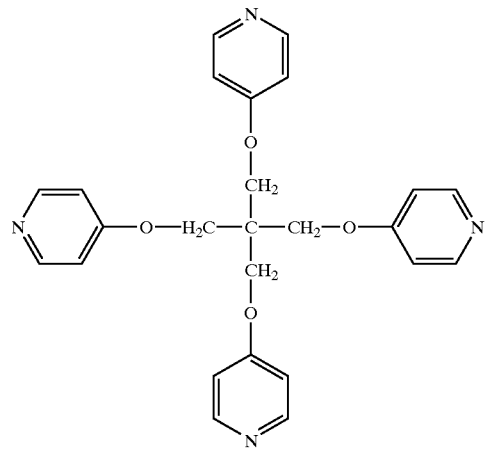

Tetrakis(4-pyridyloxymethlene)methane is prepared in accordance with a procedure published by Pourcain and Griffin (*Macromolecules* 1995, 28, 4116), the disclosure of which is totally incorporated herein by reference, by reaction of pentaerythritol tosylate with 4-hydroxypyridine. Thus, pentaerythritol is reacted stoichiometrically with tosyl chloride in pyridine to give pentaerythritol tosylate. Excess pyridine is removed in vacuo, the solution is diluted with cyclohexane, and pyridinium tosylate is removed by filtration. The filtrate is reacted with 4-hydroxypyridine in the presence of cesium carbonate to give the desired product, tetrakis(4-pyridyloxymethlene)methane.

EXAMPLE III

Synthesis of Compound III, Pentaethylene Glycol-α,ω-dipyridine

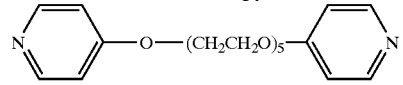

Pentaethylene glycol-α,ω-dipyridine is prepared by an analogous procedure to the procedure published by Pourcain and Griffin (*Macromolecules* 1995, 28, 4116), the disclosure of which is totally incorporated herein by reference, for the reaction of pentaerythritol tosylate with 4-hydroxypyridine. Thus, pentaethylene glycol di-ρ-tosylate (Aldrich 30, 958-3) is reacted with 4-hydroxypyridine (Aldrich 12,061-8) in the presence of cesium carbonate to give the desired product dipyridine.

EXAMPLE IV

Synthesis of Compound IV, 2(6-Isocyanatohexylaminocarbonylamino)-6-methyl-4(1H) pyrimidinone

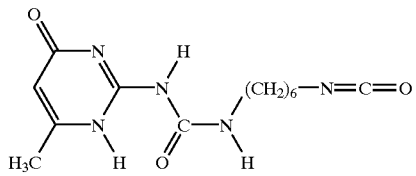

A solution of 0.70 mol 2-amino-4-hydroxy-6-methylpyrimidone in 4.75 mol 1,6-diisocyanatohexane (Aldrich D12,470-2) is heated at 100° C. for 16 hours. Pentane is then added and the resulting precipitate is filtered and washed with pentane. The white powder thus obtained is dried in vacuo at 50° C. This material is the basic synthon employed in the synthesis of the ureido-4(1H)-pyrimidone derivatives in Examples V to VIII.

EXAMPLE V

Synthesis of Compound V, VORANOL® 335 Difunctional Ureido-4(1H)-pyrimidone Derivative To a solution of 64 grams (380 meq) of VORANOL® 335 in chloroform, 253 milliequivalents of 2(6-isocyanato-hexylaminocarbonylamino)-6-methyl-4(1H)-pyrimidinone is added. After addition of a few drops of dibutyltindilaurate, the reaction is held at reflux (60° C.) for 16 hours. Residual catalyst is then removed by passing the solution over a short silica gel column and solvent is removed in vacuo to yield a mixed product that $^1$H NMR shows to possess an average of 1.8 ureido-4(1H)-pyrimidone groups per molecule.

EXAMPLE VI

Synthesis of compound VI, VORANOL® 335 Trifunctional Uureido-4(1H)-pyrimidone Derivative The trifunctional VORANOL® 335 derivative is prepared in an analogous fashion to that for the preparation of the difunctional derivative in Example V except that 380 milliequivalents of VORANOL® 335 are reacted with 380 milliequivalents of 2(6-isocyanato-hexylaminocarbonyl-amino)-6-methyl-4(1H)-pyrimidinone. $^1$H NMR indicates that the mixed product contains an average of 2.7 ureido-4(1H)-pyrimidone groups per molecule.

EXAMPLE VII

Synthesis of Compound VII, VORANOL® 370 Trifunctional Ureido-4(1H)-pyrimidone Derivative The trifunctional VORANOL® 370 derivative is prepared in an analogous fashion to that for the preparation of the difunctional derivative in Example V except that 104 grams (700 milliequivalents) of VORANOL® 370 are reacted with 300 milliequivalents of 2(6-isocyanato-hexylamino-carbonylamino)-6-methyl-4(1H)-pyrimidinone. $^1$H NMR indicates that the mixed product contains an average of 2.7 ureido-4(1H)-pyrimidone groups per molecule.

EXAMPLE VIII

Synthesis of Compound VIII, VORANOL® 370 Tetrafunctional Ureido-4(1H)-pyrimidone Derivative The tetrafunctional VORANOL® 370 derivative is prepared in an analogous fashion to that for the preparation of the difunctional derivative in Example V except that 700 milliequivalents of VORANOL® 370 are reacted with 400 milliequivalents of 2(6-isocyanato-hexylamino-carbonylamino)-6-methyl-4(1H)-pyrimidinone. $^1$H NMR indicates that the mixed product contains an average of 3.8 ureido-4(1H)-pyrimidone groups per molecule.

EXAMPLE IX

Synthesis of Compound IX, Tetrapyridone-4-yl silane

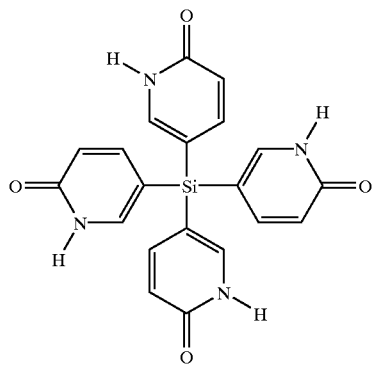

The tetrasubstituted silyl pyridone tecton is synthesized by the procedure described by Wang et al. (*J. Am. Chem. Soc.* 1994, 116, 12119–12120), the disclosure of which is totally incorporated herein by reference. Thus, 5-bromo-2-(phenylmethoxy)pyridine is lithiated by stoichiometric reaction with n-butyl lithium in cyclohexane. A solution of SiCl$_4$ in cyclohexane is then added dropwise to yield the benzyl ether-blocked pyridone. This material is deprotected by addition of a small amount of trifluoromethyl acetic acid. The reaction mixture is diluted with CH$_2$Cl$_2$ and washed with 5 percent aqueous bicarbonate to remove residual acid. Solvent is removed in vacuo to yield the desired tetrasubstituted silyl pyridone.

EXAMPLE X

Synthesis of Compound X, Pentaethylene Glycol α, ω-Dipyridone

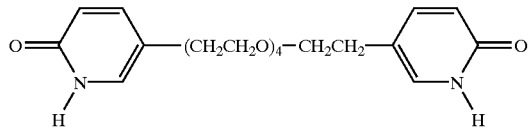

The di-pyridone tecton is synthesized by the procedure described in Example IX by reaction of 5-lithio-2-

(phenylmethoxy)pyridine with pentaethylene glycol di-ρ-tosylate, Thus, 5-bromo-2-(phenylmethoxy)pyridine is lithiated by stoichiometric reaction with n-butyl lithium in cyclohexane. A solution of pentaethylene glycol di-ρ-tosylate in cyclohexane is added dropwise to yield the corresponding benzyl ether-blocked pyridone. This material is deprotected by addition of a small amount of trifluoromethyl acetic acid. The reaction mixture is diluted with $CH_2Cl_2$ and washed with 5 percent aqueous bicarbonate to remove residual acid. Solvent is removed in vacuo to yield the desired di-pyridone.

EXAMPLE XI

A black solid ink composition is prepared by mixing 4 moles (8 equivalents) of tetraethylene glycol di-para-benzoic acid (Compound I) with 1 mole (4 equivalents) of tetrakis(4-pyridyloxymethylene)methane (Compound II) and 2 moles (4 equivalents) of pentaethylene glycol-α,ω-dipyridine (Compound III) and heating the mixture under a $N_2$ blanket to about 160° C. To eighty five grams of this hot stoichiometric mixture, 5 grams of the UV absorber 2-dodecyl-N-(2,2,6,6-tetramethyl-4-piperidinyl) succinimide (Aldrich 41,317-8), 5 grams of the antioxidant tetrasodium-N-(1,2-dicarboxyethyl)-N-octadecyl sulfosuccinamate (Aerosol 22N, American Cyanamid Corporation), and 5 grams of the colorant Orasol Black RLP (Ciba-Geigy) are added. The mixture is then held a temperature of about 160° C. and stirred for a period of about 60 minutes to form a homogeneous solution. Thereafter, the mixture is cooled to 25° C. to yield a black solid ink.

EXAMPLE XII

A black solid ink composition is prepared by mixing eighty five grams of the VORANOL® 370 trifunctional ureido-4(1H)-pyrimidone derivative (Compound VII), 5 grams of the UV absorber 2-dodecyl-N-(2,2,6,6-tetramethyl-4-piperidinyl) succinimide (Aldrich 41,317-8), 5 grams of the antioxidant tetrasodium-N-(1,2-dicarboxyethyl)-N-octadecyl sulfosuccinamate (Aerosol 22N, American Cyanamid Corporation), and 5 grams of the colorant Orasol Black RLP (Ciba-Geigy). The mixture is heated a temperature of about 140° C. and stirred at this temperature for a period of about 60 minutes to form a homogeneous solution. Thereafter the mixture is cooled to 25° C. to yield a black solid ink.

EXAMPLE XIII

A blue solid ink composition is prepared by mixing 75 grams of pentaethylene glycol α,ω-dipyridone (Compound X), 10 grams of tetrapyridone-4-yl silane (Compound IX), 5 grams of the UV absorber 2-dodecyl-N-(2,2,6,6-tetramethyl-4-piperidinyl) succinimide (Aldrich 41,317-8), 5 grams of the antioxidant tetrasodium-N-(1,2-dicarboxyethyl)-N-octadecyl sulfosuccinamate (Aerosol 22N, American Cyanamid Corporation), and 5 grams of the colorant Sudan Blue (BASF). The mixture is heated to a temperature of about 140° C. and stirred for a period of about 60 minutes to form a homogeneous solution. Thereafter the mixture is cooled to 25° C. to yield a blue solid ink.

EXAMPLE XIV

A yellow solid ink composition is prepared by mixing 85 grams of the VORANOL® 370 tetrafunctional ureido-4(1H)-pyrimidone derivative (Compound VIII), 5 grams of the UV absorber 2-dodecyl-N-(2,2,6,6-tetramethyl-4-piperidinyl) succinimide (Aldrich 41,317-8), 5 grams of the antioxidant tetrasodium-N-(1,2-dicarboxyethyl)-N-octadecyl sulfosuccinamate (Aerosol 22N, American Cyanamid Corporation), and 5 grams of the colorant Sudan Yellow (BASF). The resulting mixture is heated to a temperature of about 140° C. and stirred for a period of about 60 minutes to form a homogeneous solution. Thereafter the mixture is was cooled to 25° C. to yield a yellow solid ink.

EXAMPLE XV

A red solid ink composition is prepared by mixing 65 grams of the VORANOL® 335 difunctional ureido-4(1H)-pyrimidone derivative (Compound V), 20 grams of the VORANOL® 335 trifunctional ureido-4(1H)-pyrimidone derivative (Compound VI), 6 grams of the UV absorber 2-dodecyl-N-(2,2,6,6-tetramethyl-4-piperidinyl) succinimide (Aldrich 41,317-8), 5 grams of the antioxidant tetrasodium-N-(1,2-dicarboxyethyl)-N-octadecyl sulfosuccinamate (Aerosol 22N, American Cyanamid Corporation), and 5 percent by weight of the colorant Sudan Red (BASF). The mixture is heated to a temperature of about 150° C. and stirred for a period of about 60 minutes to form a homogeneous solution. Thereafter the mixture is cooled to 25° C. to yield a red solid ink.

EXAMPLE XVI

The inks prepared as described in Examples XI through XV are incorporated into a TEKTRONIX® PHASER® 850 hot melt ink jet printer and used to generate images on XEROX® 4024 paper. It is believed that the images thus generated will exhibit excellent color quality, good optical density values, sharp edges, and good lighffastness values.

EXAMPLE XVII

Synthesis of 2-Amino-6-Methyl-4-Pyrimidone (1)
[Procedure 1]

The title compound was prepared according to a literature method (Hirschberg, J. H. K., Beijer, F. H., van Aert, H. A., Magusin, P. C. M., Sijbesma, R. P., Meijer, E. W., *Macromolecules*, 1999, 32, 2696–2705, the disclosure of which is totally incorporated herein by reference). To a 1 liter round bottom flask under an inert argon atmosphere was added 650 milliliters of dry ethanol and 90.08 grams (0.5 mole) of guanidine carbonate. Thereafter, with good stirring was added dropwise over 2 hours 130.17 grams (1 mole) of ethyl acetoacetate, after which heat was applied and the mixture refluxed for 15 hours. The mixture was then cooled to room temperature and 800 milliliters of deionized water was slowly added to induce precipitation of the product. Subsequent vacuum filtration and washing with cold acetone secured the anticipated product in 68 percent yield (mp 311° C.). All physical properties were in accord with the reported properties.

In a similar manner, 2-amino-6-propyl-4-pyrimidone (2) was prepared from commercially available (Aldrich) ethyl butyrylacetate.

Other 6-Substituted 2-Amino-4-Pyrimidones

To vary the substitution pattern at the 6 position of the aforementioned heterocyclic ring it is convenient to apply a recently reported literature procedure for the preparation of beta-keto esters (Yuasa, Y., Tsurata, H., *Organic Process Research and Development*, 1988, 2, 412-414, the disclosure of which is totally incorporated herein by reference). This procedure affords rapid access to a wide variety of variously 4-substituted ethyl acetoacetates (the 4-substituent being derived from an acid chloride) which can be incorporated into the above mentioned reaction to provide 2-amino-4-pyrimidones which have varying substitution patterns at their 6 positions. The following synthesis is illustrative.

[Procedure 2]

To 200 milliliters of toluene was added 37.8 grams (0.24 mol) of barium oxide. After addition of water (0.5 milliliter) and activation with vigorous stirring, methyl acetoacetate (92.9 grams, 0.8 mol) was added dropwise at 25 to 30° C. over a period of one hour. Into the solution was added dropwise hexadecanoyl chloride (54.9 grams, 0.2 mol) at the same temperature over a period of 1 hour and stirring was continued for an additional hour. Methanol (15 grams, 0.47 mol) was added to the reaction mixture, which was then stirred for 16 hours. The pH of the reaction mixture was adjusted to 1 with 5 percent sulfuric acid solution and the insoluble barium salt was filtered off. The organic filtrate was washed with 5 percent sodium bicarbonate followed by brine. Solvent was removed by rotary evaporation and the product, methyl 3-keto-octadecanoate (3), was secured as a low melting solid (54° C.) by vacuum distillation in 75 percent yield. In a completely analogous fashion was prepared methyl 3-keto-dodecanoate (4) from decanoyl chloride.

Substituting compound (3) in Procedure (1) then afforded 2-amino-6-pentadecyl-4-pyrimidone (5).

Substitution of compound (4) in Procedure (1) afforded 2-amino-6-nonyl-4-pyrimidone (6).

The above described heterocyclic amines were then reacted with either monofunctional or difunctional isocyanates to provide ink vehicles with high degrees of internal hydrogen bonding. The following general procedures are illustrative.

Hydrogen Bonded Dimeric Species

[Procedure 3]

Reaction of 2-Amino-6-Methyl-4-Pyimidone with Octadecyl Isocyanate

Equimolar amounts (0.1 mole) of compound (1) and stearyl isocyanate were combined in 100 milliliters of pyidine solvent and allowed to react for 3 hours at 60° C. The reaction mixture was then allowed to cool to room temperature, which provoked crystallization. The resulting urea possessed a melting point of 147° C. Melting points in degrees Celsius for these compounds are given in the table below.

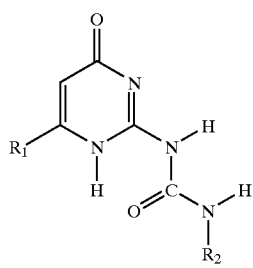

| $R_1$ | $R_2$ | mp |
|---|---|---|
| methyl | octadecyl | 145 |
| methyl | butyl | 215 |
| propyl | heptyl | 127 |
| propyl | octadecyl | 111 |
| nonyl | butyl | 120 |

Black and yellow inks are prepared with each of these compounds by substituting the compounds for Compound VII in Example XII and Compound VIII in Example XIV, respectively. These compounds can also be admixed with other compounds according to the present invention to yield inks with lower melting points Hydrogen Bonded Polymeric Species

[Procedure 4]

Reaction of 2-Amino-6-Methyl-4-Pyrimidone with Hexadecyldiisocyanate

One tenth of a mole of compound (1) and 0.05 moles of hexadecyldiisocyanate were combined in 100 milliliters of pryridine solvent and allowed to react for 3 hours at 60° C. The reaction mixture was then allowed to cool to room temperature to allow crystallization. The resulting bis(urea) possessed a melting point of 240° C. Melting points in degrees Celsius for these compounds are given in the table below.

| $R_1$ | $R_3$ | mp |
|---|---|---|
| methyl | 1,6-hexamethylene | 240 |
| nonyl | 1,6-hexamethylene | 190 |
| pentadecyl | 1,6-hexamethylene | 172 |

Black and yellow inks are prepared with each of these compounds by substituting the compounds for Compound VII in Example XII and Compound VIII in Example XIV, respectively. These compounds can also be admixed with other compounds according to the present invention to yield inks with lower melting points.

Other embodiments and modifications of the present invention may occur to those of ordinary skill in the art subsequent to a review of the information presented herein, these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from (c) those of the formula

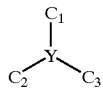

(d) those of the formula

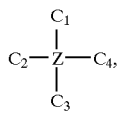

or (e) mixtures of two or more of (c), and/or (d), wherein at least one "C" in the material of the formula (c), (d), or mixtures of two or more of (c), and/or (d) is a moiety containing a urea group of the formula

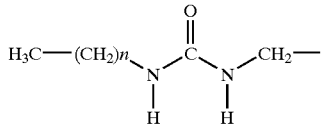

wherein n is an integer of from 0 to about 3, wherein each "C" is a moiety either capable of forming at least one hydrogen bond with a moiety identical to itself or capable of forming at least one hydrogen bond with another "C" moiety, each "Y" is a trivalent moiety, and each "Z" is a tetravalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

2. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from (a) those of the formula

W—C (b) those of the formula $C_1$—X—$C_2$ (c) those of the formula

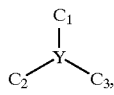

(d) those of the formula

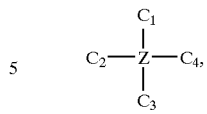

or (e) mixtures of two or more of (a), (b), (c), and/or (d), wherein at least one "C" in the material of the formula (a), (b), (C), (d), or mixtures of two or more of (a), (b), (c), and/or (d) is a moiety containing a pyridone group, wherein each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

3. An ink composition according to claim 2 wherein the pyridone group is of the formulae

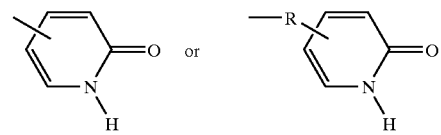

wherein R is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

4. An ink composition according to claim 2 wherein the pyridone group is of the formulae

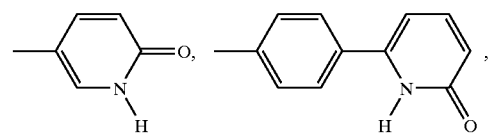

or combinations thereof.

5. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from (a) those of the formula

W—C (b) those of the formula $C_1$—X—$C_2$ (c) those of the formula

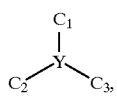

(d) those of the formula

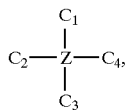

or (e) mixtures of two or more of (a), (b), (c), and/or (d), wherein at least one "C" in the material of the formula (a), (b), (c), (d), or mixtures of two or more of (a), (b), (c), and/or (d) is a moiety containing a ureidopyrimidone group, wherein each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

6. An ink composition according to claim 5 wherein the ureidopyrimidone group is of the formulae

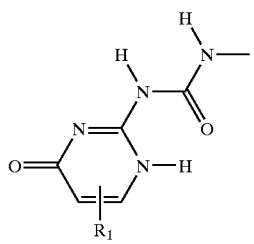

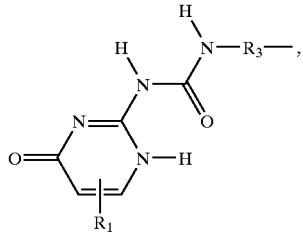

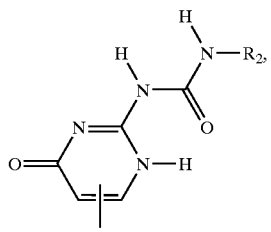

or

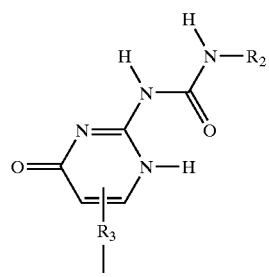

wherein $R_1$ and $R_2$ each, independently of the other, is a hydrogen atom, an alkyl group, an aryl group, or a combination thereof, and $R_3$ is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

7. An ink composition according to claim 5 wherein the ureidopyrimidone group is of the formulae

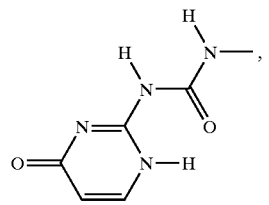

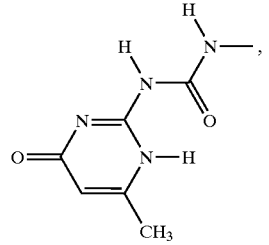

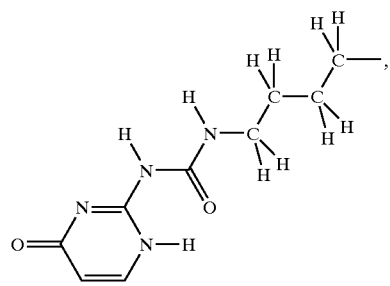

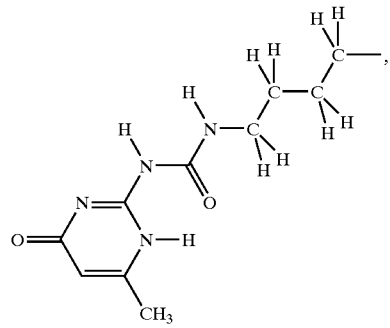

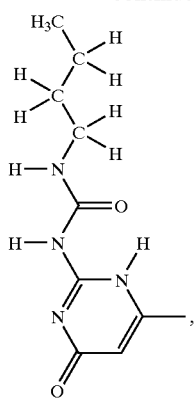

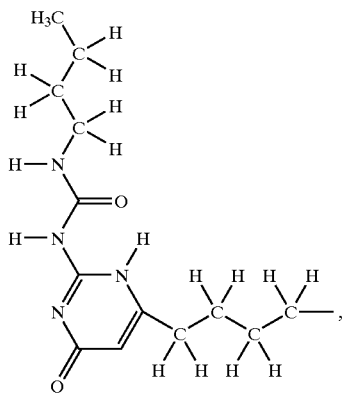

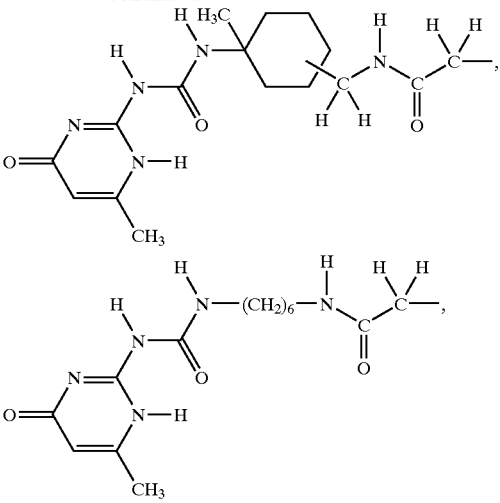

or combinations thereof.

8. A phase change ink composition comprising a colorant and an ink vehicle, said ink being a solid at temperatures less than about 50° C. and exhibiting a viscosily of no more than about 20 centipoise at a jetting temperature of no more than about 160° C. wherein the ink vehicle comprises a material selected from (a) those of the formula $$W-C$$

(b) those of the formula $$C_1-X-C_z$$

(c) those of the formula

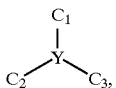

(d) those of the formula

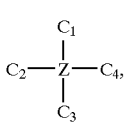

or (e) mixtures of two or more of (a), (b), (c), and/or (d), wherein at least one "C" in the material of the formula (a), (b), (c), (d), or mixtures of two or more of (a), (b), (c), and/or (d) is a moiety containing a oxime group of the formulae

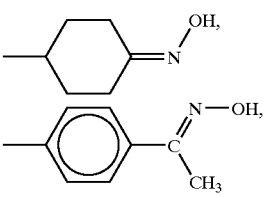

or combinations thereof, wherein each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

9. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from those of the formula

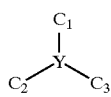

wherein Y is

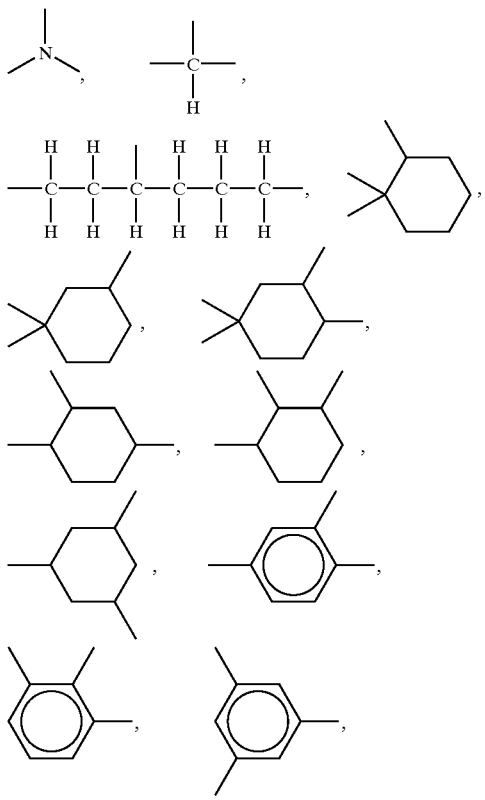

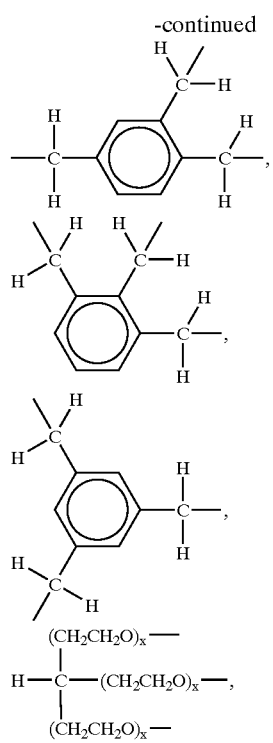

wherein each x, independently of the others, is an integer representing the number of repeat ethylene oxide groups,

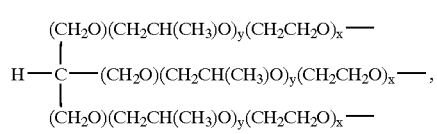

wherein each x, independently of the others, is an integer representing the number of repeat ethylene oxide groups, and wherein each y, independently of the others, is an integer representing the number of repeat isopropylene oxide groups, trivalent groups formed by removing three hydroxy groups from compounds of the formula

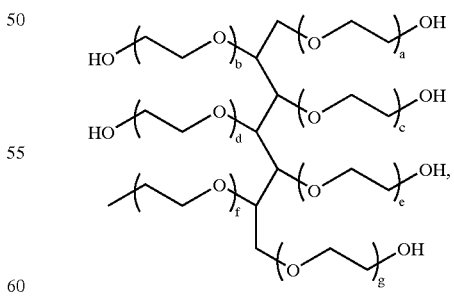

wherein a, b, c, d, e, f, and g are each integers representing the number of ethylene oxide repeat units, trivalent groups formed by removing three hydroxy groups from compounds of the formula

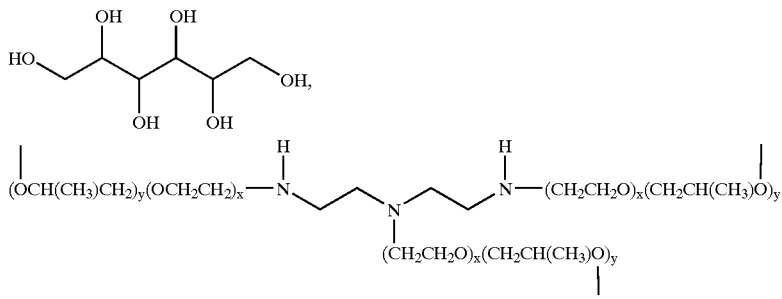

wherein each x, independently of the others, represents the number of repeat polyethylene oxide units and each y, independently of the others, represents the number of repeat polypropylene oxide units,

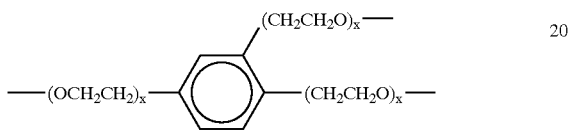

wherein each x, independently of the others, is an integer representing the number of repeat ethylene oxide groups,

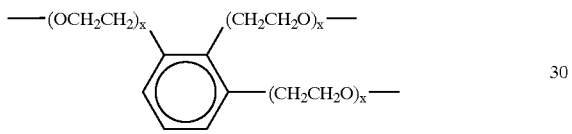

wherein each x, independently of the others, is an integer representing the number of repeat ethylene oxide groups,

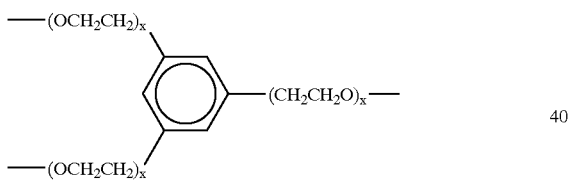

wherein each x, independently of the others, is an integer representing the number of repeat ethylene oxide groups,

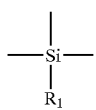

wherein $R_1$ is an alkyl group,

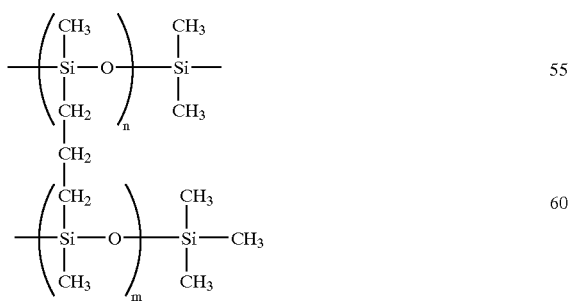

wherein m and n each, independently of the other, is an integer representing the number of repeat alkylsiloxane units,

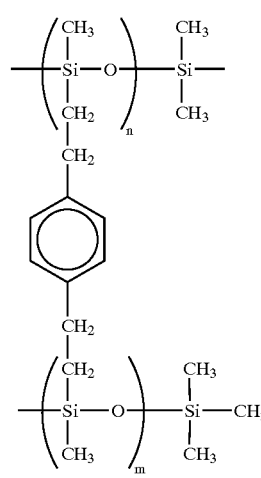

wherein m and n each, independently of the other, is an integer representing the number of repeat alkylsiloxane units,

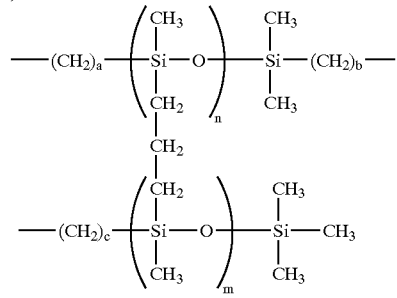

wherein m and n each, independently of the other, is an integer representing the number of repeat siloxane units, and a, b, and c each, independently of the other, are integers representing the number of repeat —$CH_2$— units,

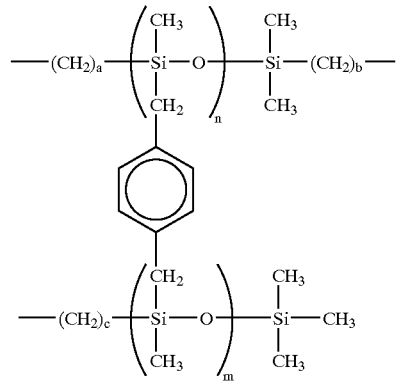

wherein m and n each, independently of the other, is an integer representing the number of repeat siloxane units, and a, b, and c each, independently of the other, are integers representing the number of repeat —CH$_2$— units,

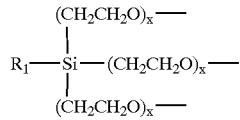

wherein R$_1$ is an alkyl group and wherein each x, independently of the others, is an integer representing the number of repeat ethylene oxide groups,

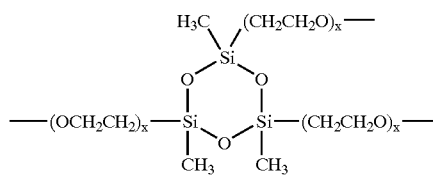

wherein each x, independently of the others, is an integer representing the number of repeat ethylene oxide groups.

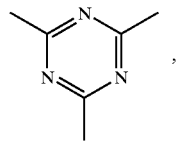

or combinations thereof, wherein each "C" is a moiety either capable of forming at least one hydrogen bond with a moiety identical to itself or capable of forming at least one hydrogen bond with another "C" moiety, and each "Y" is a trivalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosily of the ink at the first temperature, said viscosity reduction being caused by said breakage of said hydrogen bonds.

10. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from those of the formula

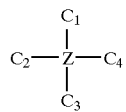

wherein Z is

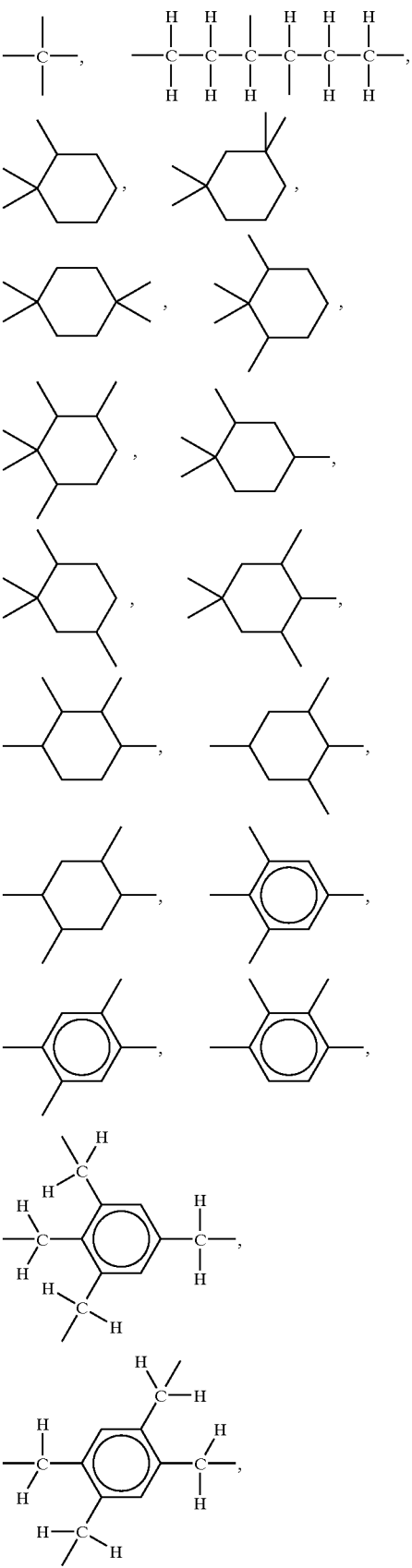

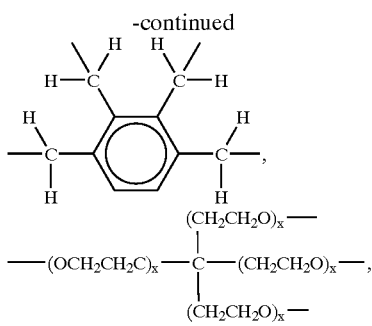

wherein each x, independently of the others, is an integer representing the number of repeat ethylene oxide groups,

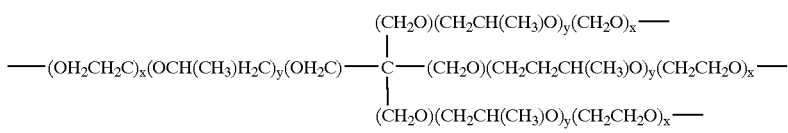

wherein each x, independently of the others, is an integer representing the number of repeat ethylene oxide groups, and wherein each y, independently of the others, is an integer representing the number of repeat isopropylene oxide groups, tetravalent groups formed by removing four hydroxy groups from compounds of the formula

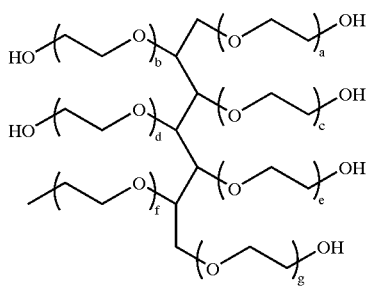

wherein a, b, c, d, e, f, and g are each integers representing the number of ethylene oxide repeat units, tetravalent groups formed by removing four hydroxy groups from compounds of the formula

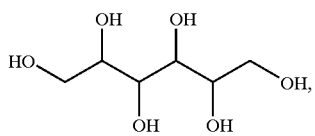

wherein each x, independently of the others, represents the number of repeat polyethylene oxide units and each y, independently of the others, represents the number of repeat polypropylene oxide units,

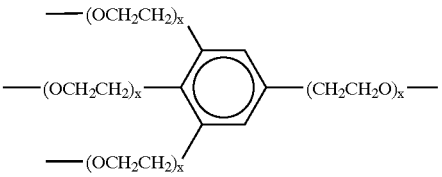

wherein each x, independently of the others, is an integer representing the number of repeat ethylene oxide groups,

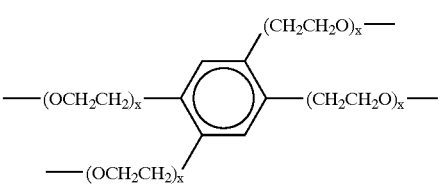

wherein each x, independently of the others, is an integer representing the number of repeat ethylene oxide groups,

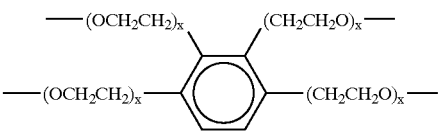

wherein each x, independently of the others, is an integer representing the number of repeat ethylene oxide groups,

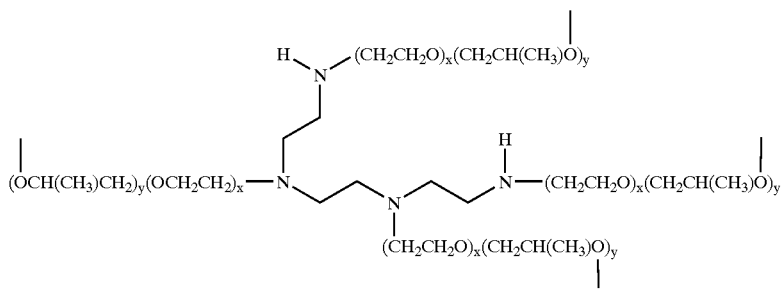

—Si—,

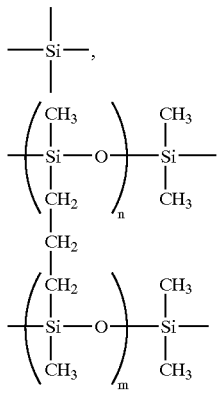

wherein m and n each, independently of the other, is an integer representing the number of repeat alkylsiloxane units,

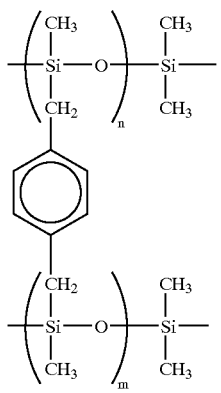

wherein m and n each, independently of the other, is an integer representing the number of repeat alkylsiloxane units,

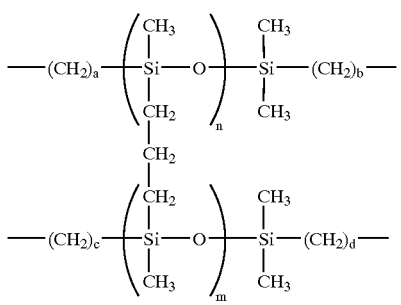

wherein m and n each, independently of the other, is an integer representing the number of repeat siloxane units, and a, b, c, and d each, independently of the other, are integers representing the number of repeat —CH$_2$— units,

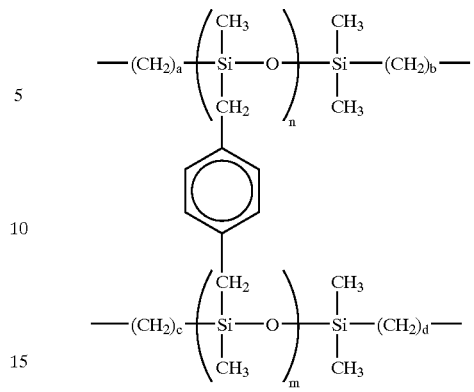

wherein m and n each, independently of the other, is an integer representing the number of repeat siloxane units, and a, b, c, and d each, independently of the other, are integers representing the number of repeat —CH$_2$— units,

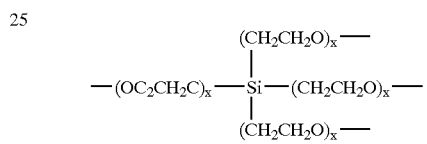

wherein each x, independently of the others, is an integer representing the number of repeat ethylene oxide groups, or combinations thereof, wherein each "C" is a moiety either capable of forming at least one hydrogen bond with a moiety identical to itself or capable of forming at least one hydrogen bond with another "C" moiety, and each "Z" is a tetravalent moiety, wherein at a first temperature hydrogen bonds of sufficient strength exist between the "C" groups so that the ink vehicle forms hydrogen-bonded dimers, oligomers, or polymers, and wherein at a second temperature which is higher than the first temperature the hydrogen bonds between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

11. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from mixtures of (a) at least one member selected from (i) those of the formula $W_1$—A (ii) those of the formula $A_1$—$X_1$—$A_2$ (iii) those of the formula

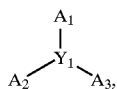

(iv) those of the formula

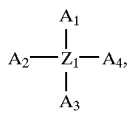

(v) those of the formula $A_1—X_1—B_1$ (vi) those of the formula

(vii) those of the formula

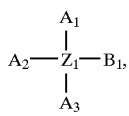

(viii) those of the formula

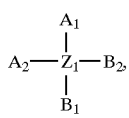

or (ix) mixtures of two or more of (i), (ii), (iii), (iv), (v), (vi), (vii), and/or (viii), and (b) at least one member selected from
(i) those of the formula $W_2—B$ (ii) those of the formula $B_1—X_2—B_2$ (iii) those of the formula

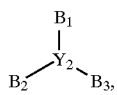

(iv) those of the formula

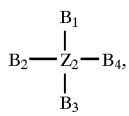

(v) those of the formula $A_2—X_2—B_2$ (vi) those of the formula

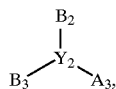

(vii) those of the formula

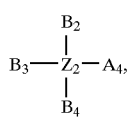

(viii) those of the formula

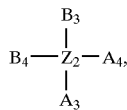

or (ix) mixtures of two or more of (i), (ii), (iii), (iv), (v), (vi), (vii), and/or (viii), wherein at least one "A" in the material of the formula (a)(i), (a)(ii), (a)(iii), (a)(iv), (a)(v), (a)(vi), (a)(vii), (a)(viii), or mixtures of two or more of (a)(i), (a)(ii), (a)(iii), (a)(iv), (a)(v), (a)(vi), (a)(vii), or (a)(viii) is a moiety containing a carboxylic acid group of the formulae

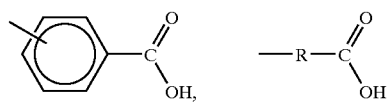

wherein R is an alkyl group with from 1 to about 12 carbon atoms,

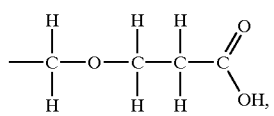

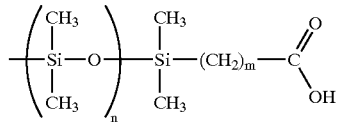

wherein n is an integer of from 1 to about 12 and m is an integer of from about 3 to about 12.

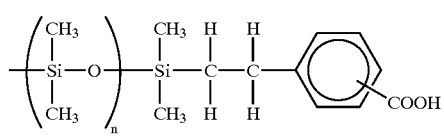

wherein n is an integer of from 1 to about 12,

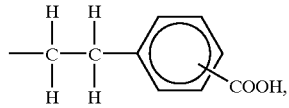

-continued

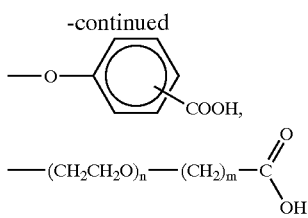

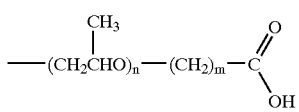

wherein n is an integer of from 1 to about 20 and m is an integer of from about 3 to about 12,

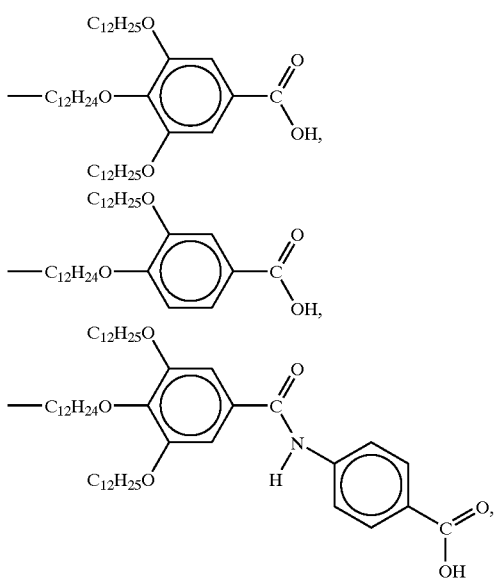

or a combination thereof, wherein each "A" is an acidic moiety and each "B" is a basic moiety, wherein each "A" is capable of forming at least one hydrogen bond with at least one "B" and each "B" is capable of forming at least one hydrogen bond with at least one "A", each "W" is a monovalent moiety, each "X" is a divalent moiety, each "Y" is a trivalent moiety, and each "Z" is a tetravalent moiety, wherein at a first temperature hydrogen bonds of sufficient strength exist between the "A" groups and the "B" groups so that the ink vehicle forms hydrogen-bonded dimers, oligomers, or polymers, and wherein at a second temperature which is higher than the first temperature the hydrogen bonds between the "A" groups and the "B" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

12. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from mixtures of (a) at least one member selected from (i) those of the formula $$W_1-A$$

(ii) those of the formula $$A_1-X_1-A_2$$

(iii) those of the formula

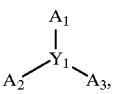

(iv) those of the formula

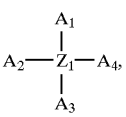

(v) those of the formula $$A_1-X_1-B_1$$

(vi) those of the formula

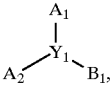

(vii) those of the formula

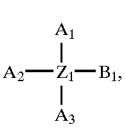

(viii) those of the formula

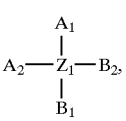

or (ix) mixtures of two or more of (i), (ii), (iii), (iv), (v), (vi), (vii), and/or (viii), and (b) at least one member selected from (i) those of the formula $$W_2-B$$

(ii) those of the formula $$B_1-X_2-B_2$$

(iii) those of the formula

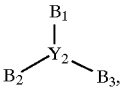

(iv) those of the formula

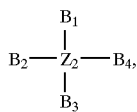

(v) those of the formula

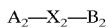

(vi) those of the formula

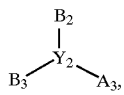

(vii) those of the formula

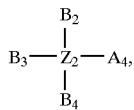

(viii) those of the formula

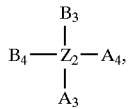

or (ix) mixtures of two or more of (i), (ii), (iii), (iv), (v), (vi), (vii), and/or (viii), wherein at least one "B" in the material of the formula (b)(i), (b)(ii), (b)(iii), (b)(iv), (b)(v), (b)(vi), (b)(vii), (b)(viii), or mixtures of two or more of (b)(i), (b)(ii), (b)(iii), (b)(iv), (b)(v), (b)(vi), (b)(vii), or(b)(viii) is a moiety containing a pyridine group, wherein each "A" is an acidic moiety and each "B" is a basic moiety, wherein each "A" is capable of forming at least one hydrogen bond with at least one "B" and each "B" is capable of forming at least one hydrogen bond with at least one "A", each "W" is a monovalent moiety, each "X" is a divalent moiety, each "Y" is a trivalent moiety, and each "Z" is a tetravalent moiety, wherein at a first temperature hydrogen bonds of sufficient strength exist between the "A" groups and the "B" groups so that the ink vehicle forms hydrogen-bonded dimers, oligomers, or polymers, and wherein at a second temperature which is higher than the first temperature the hydrogen bonds between the "A" groups and the "B" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

13. An ink composition according to claim 12, wherein the pyridine group is of the formulae

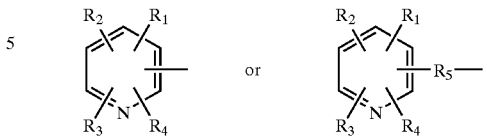

wherein $R_1$, $R_2$, $R_3$, and $R_4$ each, independently of the others, is a hydrogen atom, an alkyl group, an alkoxy group, a polyalkyleneoxy group, a hydroxy group, an amine group, animine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, an azide group, or a combination thereof, and $R_5$ is an alkylene group, an arylene group, an arylalkylene group, an alkylarylene group, an alkyleneoxy group, a polyalkyleneoxy group, a heterocyclic group, a silylene group, a siloxane group, a polysiloxane group, or a combination thereof.

14. An ink composition according to claim 12 wherein the pyridine group is of the formula

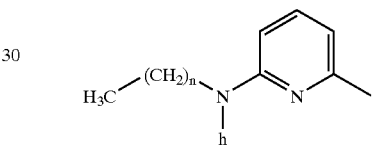

wherein n is an integer representing the number of repeat —$CH_2$— groups.

15. An ink composition according to claim 14 wherein n is an integer of from 0 to about 3.

16. An ink composition according to claim 12 wherein the pyridine group is of the formula

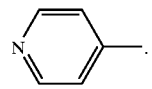

17. An ink composition according to claim 12 wherein the pyridine group is of the formulae

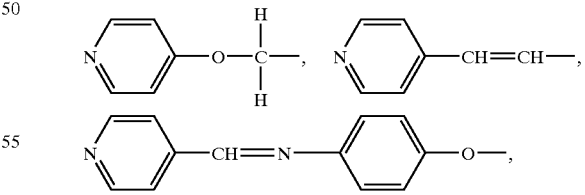

or a combination thereof.

18. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from mixtures of (a) at least one member selected from (i) those of the formula $W_1$—A (ii) those of the formula

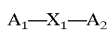
A₁—X₁—A₂

(iii) those of the formula

(iv) those of the formula

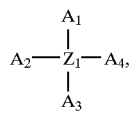

(v) those of the formula

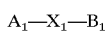
A₁—X₁—B₁

(vi) those of the formula

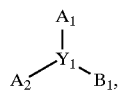

(vii) those of the formula

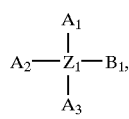

(viii) those of the formula

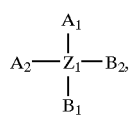

or (ix) mixtures of two or more of (i), (ii), (iii), (iv), (v), (vi), (vii), and/or (viii), and (b) at least one member selected from (i) those of the formula

W₂—B (ii) those of the formula

B₁—X₂—B₂

(iii) those of the formula

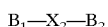

(iv) those of the formula

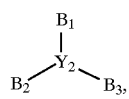

(v) those of the formula

A₂—X₂—B₂

(vi) those of the formula

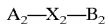

(vii) those of the formula

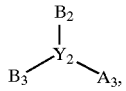

(viii) those of the formula

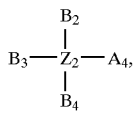

or (ix) mixtures of two or more of (i), (ii), (iii), (iv), (v), (vi), (vii), and/or (viii), wherein at least one "B" in the material of the formula (b)(i), (b)(ii), (b)(iii), (b)(iv), (b)(v), (b)(vi), (b)(vii), (b)(viii), or mixtures of two or more of (b)(i), (b)(ii), (b)(iii), (b)(iv), (b)(v), (b)(vi), (b)(vii), or (b)(viii) is a moiety containing a urea group of the formula

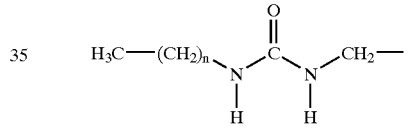

wherein n is an integer of from 0 to about 12, wherein each "A" is an acidic moiety and each "B" is a basic moiety, wherein each "A" is capable of forming at least one hydrogen bond with at least one "B" and each "B" is capable of forming at least one hydrogen bond with at least one "A", each "W" is a monovalent moiety, each "X" is a divalent moiety, each "Y" is a trivalent moiety, and each "Z" is a tetravalent moiety, wherein at a first temperature hydrogen bonds of sufficient strength exist between the "A" groups and the "B" groups so that the ink vehicle forms hydrogen-bonded dimers, oligomers, or polymers, and wherein at a second temperature which is higher than the first temperature the hydrogen bonds between the "A" groups and the "B" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

19. A phase change ink composition comprising a colorant and an ink vehicle, said ink being a solid at temperatures less than about 50° C. and exhibiting a viscosily of no more than about 20 centipoise at a jetting temperature of no more than about 160° C., wherein the ink vehicle comprises a material selected from mixtures of (a) at least one member selected from (i) those of the formula

W₁—A (ii) those of the formula

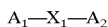

(iii) those of the formula

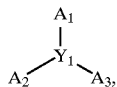

(iv) those of the formula

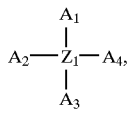

(v) those of the formula

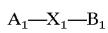

(vi) those of the formula

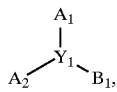

(vii) those of the formula

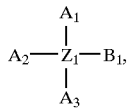

(viii) those of the formula

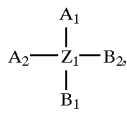

or (ix) mixtures of two or more of (i), (ii), (iii), (iv), (v), (vi), (vii), and/or (viii), and (b) at least one member selected from
(i) those of the formula

(ii) those of the formula $B_1—X_2—B_2$ (iii) those of the formula

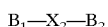

(iv) those of the formula

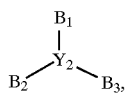

(v) those of the formula $A_2—X_2—B_2$ (vi) those of the formula

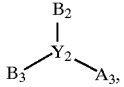

(vii) those of the formula

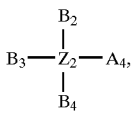

(viii) those of the formula

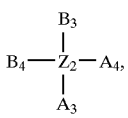

or (ix) mixtures of two or more of (i), (ii), (iii), (iv), (v), (vi), (vii), and/or (viii), wherein at least one "B" in the material of the formula (b)(i), (b)(ii), (b)(iii), (b)(iv), (b)(v), (b)(vi), (b)(vii), (b)(viii), or mixtures of two or more of (b)(i), (b)(ii), (b)(iii), (b)(iv), (b)(v), (b)(vi), (b)(vii), or (b)(viii) is a moiety containing an imidazole group, wherein each "A" is an acidic moiety and each "B" is a basic moiety, wherein each "A" is capable of forming at least one hydrogen bond with at least one "B" and each "B" is capable of forming at least one hydrogen bond with at least one "A", each "W" is a monovalent moiety, each "X" is a divalent moiety, each "Y" is a trivalent moiety, and each "Z" is a tetravalent moiety, wherein at a first temperature hydrogen bonds of sufficient strength exist between the "A" groups and the "B" groups so that the ink vehicle forms hydrogen-bonded dimers, oligomers, or polymers, and wherein at a second temperature which is higher than the first temperature the hydrogen bonds between the "A" groups and the "B" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

20. An ink composition according to claim 19 wherein the imidazole group is of the formulae

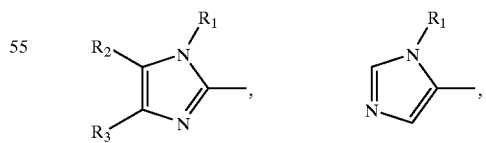

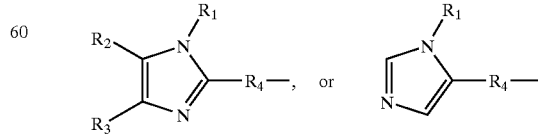

wherein $R_1$ is a hydrogen atom, an alkyl group, or a combination thereof, $R_2$ and $R_3$ each, independently of the other, is a hydrogen atom, an alkyl group, an alkoxy group, a polyalkyleneoxy group, a hydroxy group, an amine group, an imine group, an ammonium group, a cyano group, a pyridine group, a pyridinium group, an ether group, an aldehyde group, a ketone group, a carboxylic acid group, an ester group, an amide group, a carbonyl group, a thiocarbonyl group, a sulfonate group, a sulfoxide group, a nitrile group, a sulfone group, an acyl group, an acid anhydride group, an azide group, or a combination thereof, and $R_4$ is an alkylene group, an arylene group, an arylalkylene group, an alkylarylene group, an alkyleneoxy group, a polyalkyleneoxy group, a heterocyclic group, a silylene group), a siloxane group, a polysiloxane group, or a combination thereof.

21. An ink composition according to claim 19 wherein the imidazole group is of the formulae

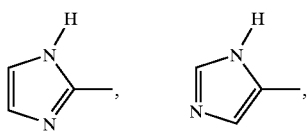

or combinations thereof.

22. An ink composition according to claim 19 wherein the imidazole group is of the formulae

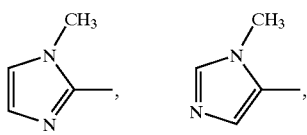

or combinations thereof.

23. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises a material selected from mixtures of (a) at least one member selected from (ii) those of the formula

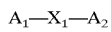

(iii) those of the formula

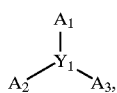

(iv) those of the formula

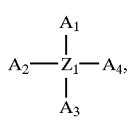

(v) those of the formula

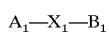

(vi) those of the formula

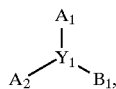

(vii) those of the formula

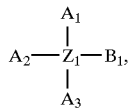

(viii) those of the formula
or (ix) mixtures of two or more of (ii), (iii), (iv), (v), (vi), (vii), and/or (viii), and (b) at least one member selected from (ii) those of the formula

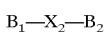

(iii) those of the formula

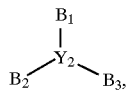

(iv) those of the formula

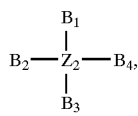

(v) those of the formula

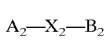

(vi) those of the formula

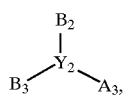

(vii) those of the formula

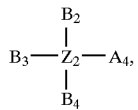

(viii) those of the formula

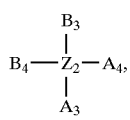

or (ix) mixtures of two or more of (ii), (iii), (iv), (v), (vi), (vii), and/or (viii), wherein $X_1$, $X_2$, $Y_1$, $Y_2$, $Z_1$, and $Z_2$ each, independently of the others, are alkylene groups, arylene groups, arylalkylene groups, alkylarylene groups, alkyleneoxy groups, polyalkyleneoxy groups, aryleneoxy groups, arylalkyleneoxy groups, alkylaryleneoxy groups, heterocyclic groups, silylene groups, siloxane groups, polysiloxane groups, hetero atoms, direct bonds, or combinations thereof, wherein each "A" is an acidic moiety and each "B" is a basic moiety, wherein each "A" is capable of forming at least one hydrogen bond with at least one "B" and each "B" is capable of forming at least one hydrogen bond with at least one "A", each "W" is a monovalent moiety, each "X" is a divalent moiety, each "Y" is a trivalent moiety, and each "Z" is a tetravalent moiety, wherein at a first temperature hydrogen bonds of sufficient strength exist between the "A" groups and the "B" groups so that the ink vehicle forms hydrogen-bonded bonded dimers, oligomers, or polymers, and wherein at a second temperature which is higher than the first temperature the hydrogen bonds between the "A" groups and the "B" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds.

24. An ink composition according to claim 23 wherein the ink vehicle comprises a material selected from those of the formulae

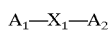

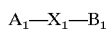

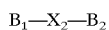

or

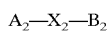

wherein $X_1$ and $X_2$ each, independently of the others, is

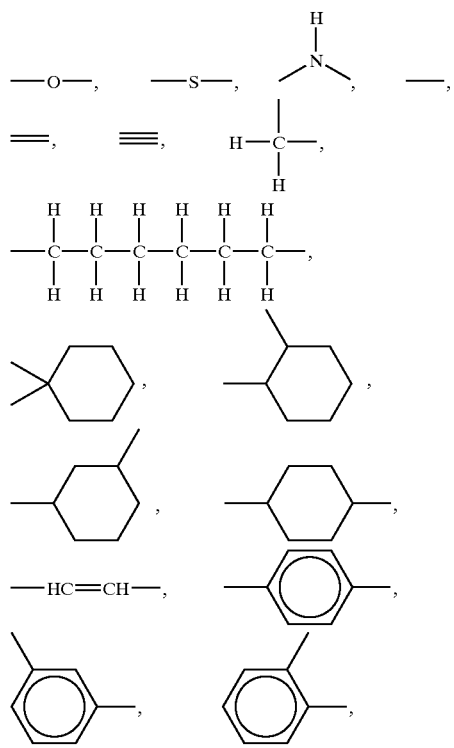

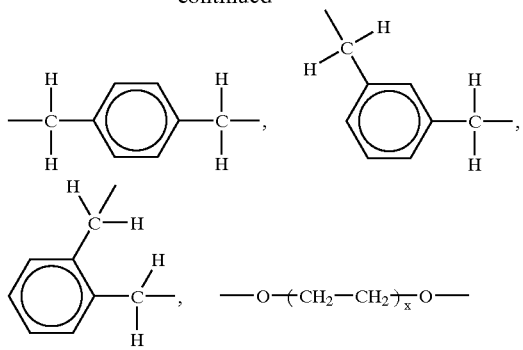

wherein x is an integer representing the number of repeat ethylene oxide groups,

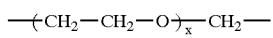

wherein x is an integer representing the number of repeat ethylene oxide groups.

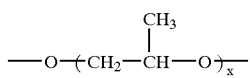

wherein x is an integer representing the number of repeat ethylene oxide groups,

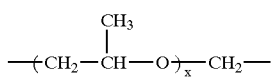

wherein x is an integer representing the number of repeat ethylene oxide groups,

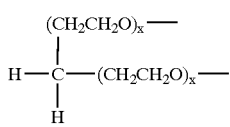

wherein each x, independently of the others, is an integer representing the number of repeat ethylene oxide groups,

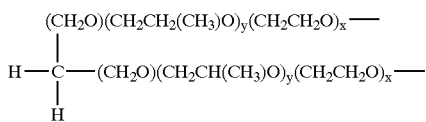

wherein each x, independently of the others, is an integer representing the number of repeat ethylene oxide groups, and wherein each y, independently of the others, is an integer representing the number of repeat isopropylene oxide groups, divalent groups formed by removing two hydroxy groups from compounds of the formula

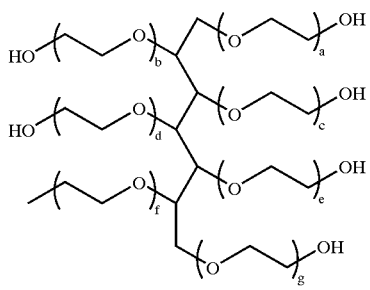

wherein a, b, c, d, e, f, and g are each integers representing the number of ethylene oxide repeat units, divalent groups formed by removing two hydroxy groups from compounds of the formula

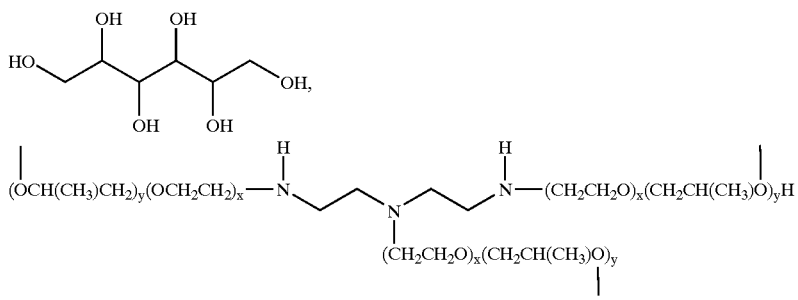

wherein each x, independently of the others, represents the number of repeat polyethylene oxide units and each y, independently of the others, represents the number of repeat polypropylene oxide units,

wherein each x, independently of the others, is an integer representing the number of repeat ethylene oxide groups,

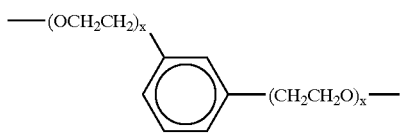

wherein each x, independently of the others, is an integer representing the number of repeat ethylene oxide groups,

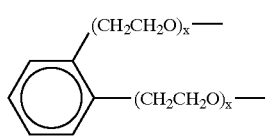

wherein each x, independently of the others, is an integer representing the number of repeat ethylene oxide groups,

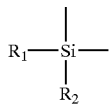

wherein $R_1$, and $R_2$ each, independently of the other, are alkyl groups,

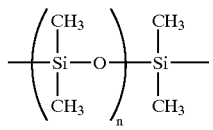

wherein n is an integer representing the number of repeat alkylsiloxane units,

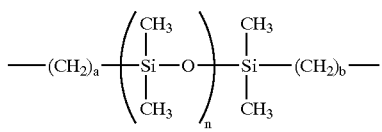

wherein n is an integer representing the number of repeat alkylsiloxane units and a and b each, independently of the other, are integers representing the number of repeat —$CH_2$— units,

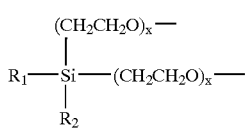

wherein $R_1$ and $R_2$ each, independently of the other, are alkyl groups and wherein each x, independently of the others, is an integer representing the number of repeat ethylene oxide groups,

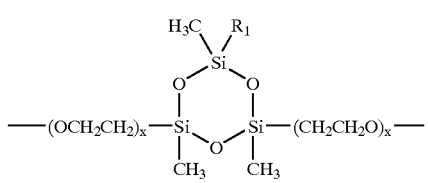

wherein $R_1$ is an alkyl group and wherein each x, independently of the others, is an integer representing the number of repeat ethylene oxide groups,

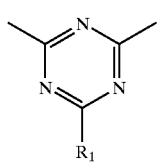

wherein R₁ is an alkyl group, or combinations thereof.

25. An ink composition according to claim 23, wherein the ink vehicle comprises a material selected from those of the formulae

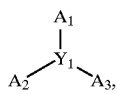 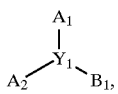

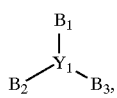 or 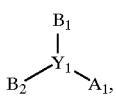

wherein Y₁ and Y₂ each, independently of the others, is

 

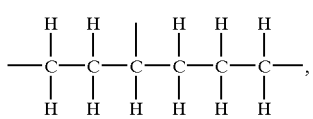 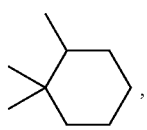

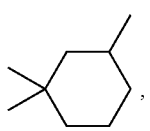 

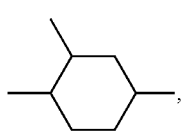 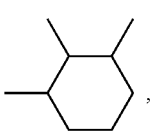

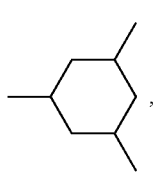 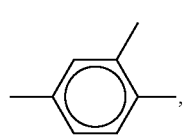

-continued

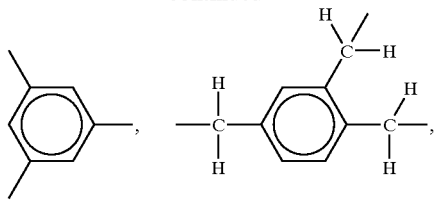

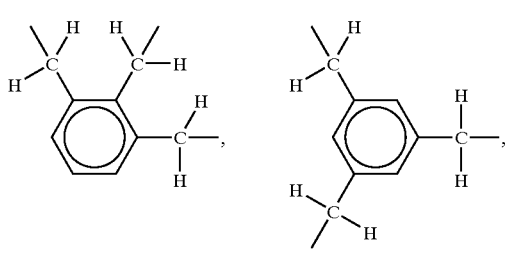

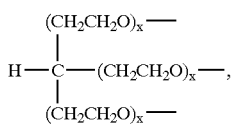

wherein each x, independently of the others, is an integer representing the number of repeat ethylene oxide groups,

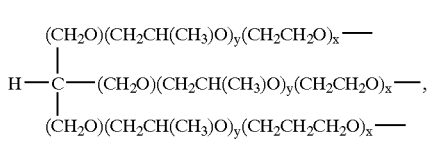

wherein each x, independently of the others, is an integer representing the number of repeat ethylene oxide groups, and wherein each y, independently of the others, is an integer representing the number of repeat isopropylene oxide groups, trivalent groups formed by removing three hydroxy groups from compounds of the formula

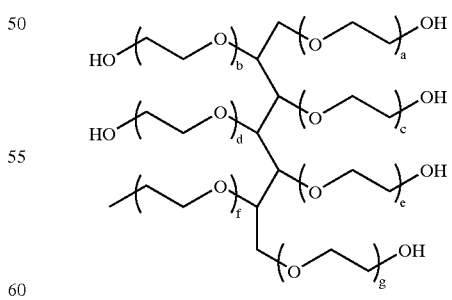

wherein a, b, c, d, e, f, and g are each integers representing the number of ethylene oxide repeat units, trivalent groups formed by removing three hydroxy groups from compounds of the formula

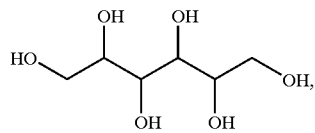

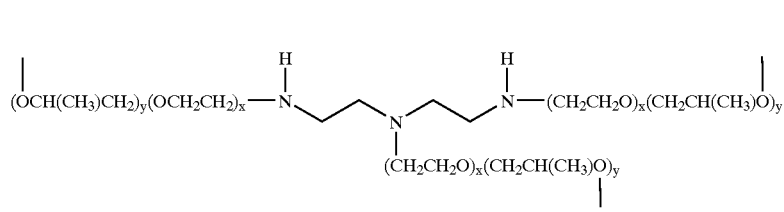

wherein each x, independently of the others, represents the number of repeat polyethylene oxide units and each y, independently of the others, represents the number of repeat polypropylene oxide units,

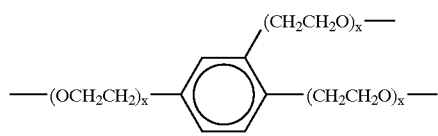

wherein each x, independently of the others, is an integer representing the number of repeat ethylene oxide groups,

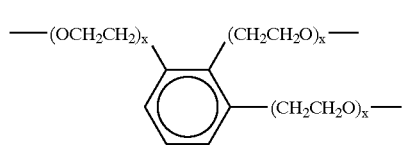

wherein each x, independently of the others, is an integer representing the number of repeat ethylene oxide groups,

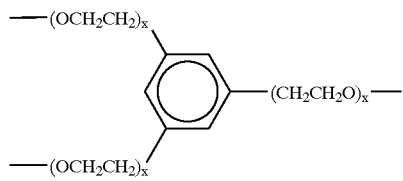

wherein each x, independently of the others, is an integer representing the number of repeat ethylene oxide groups,

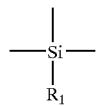

wherein $R_1$ is an alkyl group,

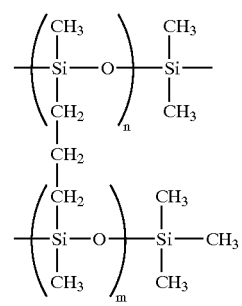

wherein m and n each, independently of the other, is an integer representing the number of repeat alkylsiloxane units,

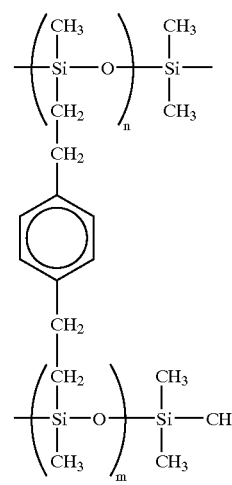

wherein m and n each, independently of the other, is an integer representing the number of repeat alkyisiloxane units,

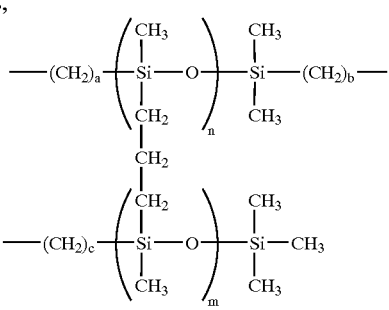

wherein m and n each, independently of the other, is an integer representing the number of repeat slioxane units, and a, b, and c each, independently of the other, are integers representing the number of repeat —CH$_2$— units,

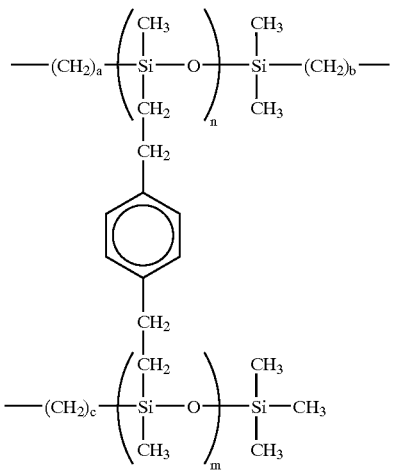

wherein m and n each, independently of the other, is an integer representing the number of repeat siloxane units, and a, b, and c each, independently of the other, are integers representing the number of repeat —CH$_2$— units,

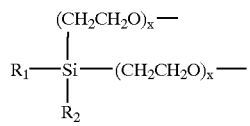

wherein R$_1$ is an alkyl group and wherein each x, independently of the others, is an integer representing the number of repeat ethylene oxide groups,

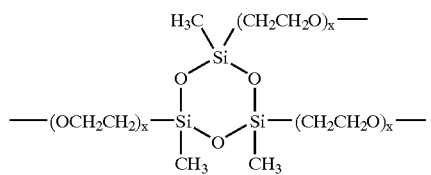

wherein each x, independently of the others, is an integer representing the number of repeat ethylene oxide groups,

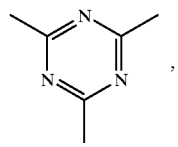

or combinations thereof.

26. An ink composition according to claim 23 wherein the ink vehicle comprises a material selected from those of the formulae

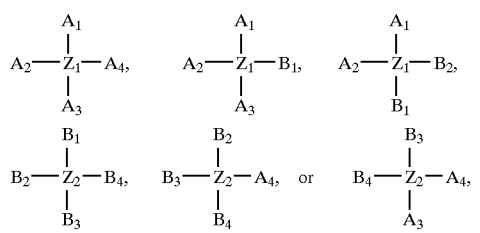

wherein Z$_1$ and Z$_2$ each, independently of the others, is

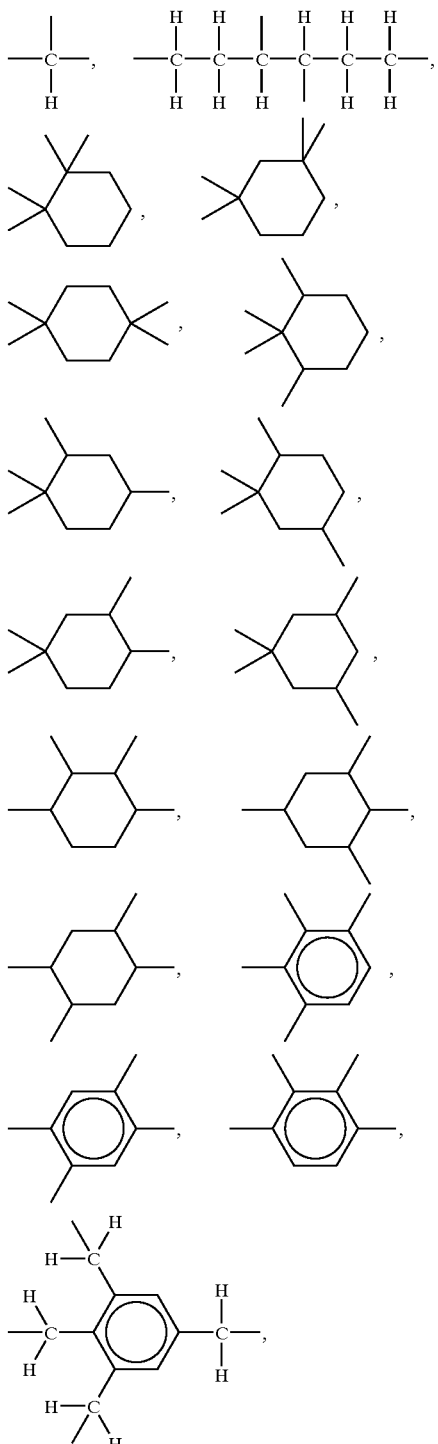

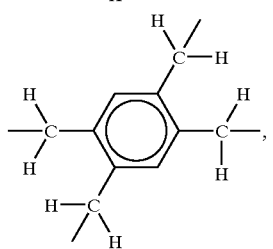

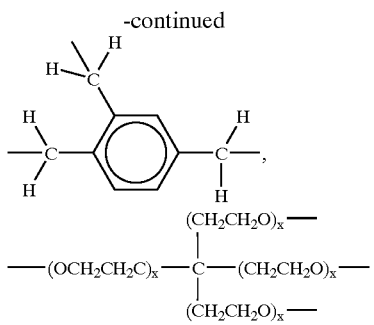

wherein each x, independently of the others, is an integer representing the number of repeat ethylene oxide groups,

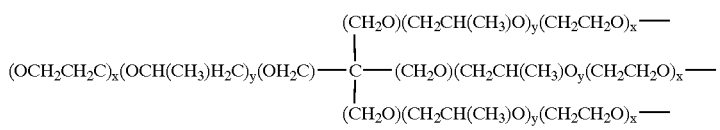

wherein each x, independently of the others, is an integer representing the number of repeat ethylene oxide groups, and wherein each y, independently of the others, is an integer representing the number of repeat isopropylene oxide groups, tetravalent groups formed by removing four hydroxy groups from compounds of the formula

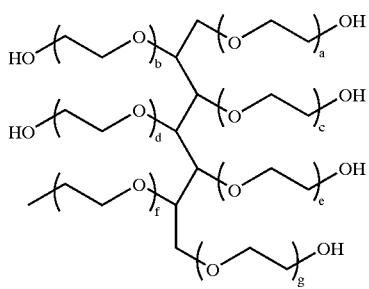

wherein a, b, c, d, e, f, and g are each integers representing the number of ethylene oxide repeat units, tetravalent groups formed by removing four hydroxy groups from compounds of the formula

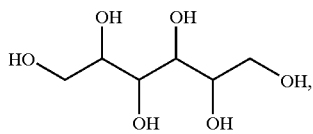

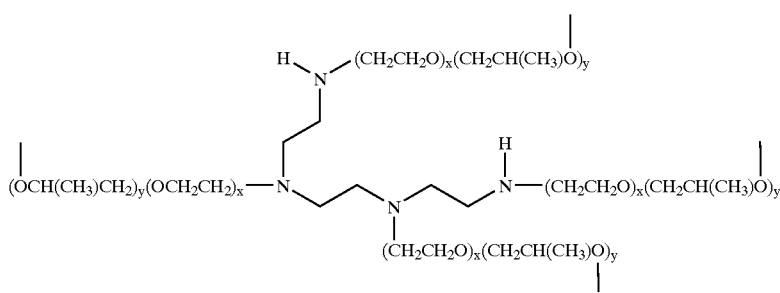

wherein each x, independently of the others, represents the number of repeat polyethylene oxide units and each y, independently of the others, represents the number of repeat polypropylene oxide units,

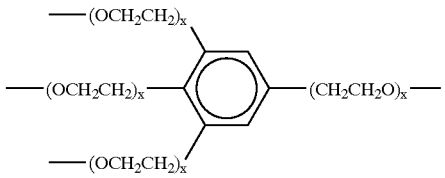

wherein each x, independently of the others, is an integer representing the number of repeat ethylene oxide groups,

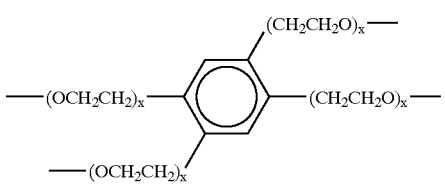

wherein each x, independently of the others, is an integer representing the number of repeat ethylene oxide groups,

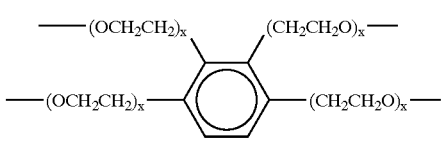

wherein each x, independently of the others, is an integer representing the number of repeat ethylene oxide groups,

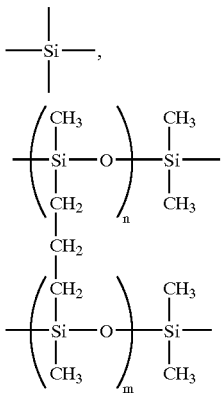

wherein m and n each, independently of the other, is an integer representing the number of repeat alkylsiloxane units,

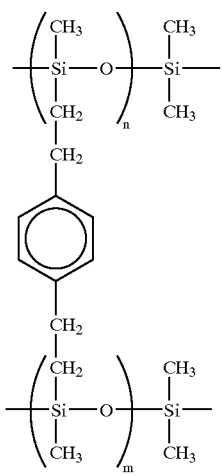

wherein m and n each, independently of the other, is an integer representing the number of repeat alkylsiloxane units,

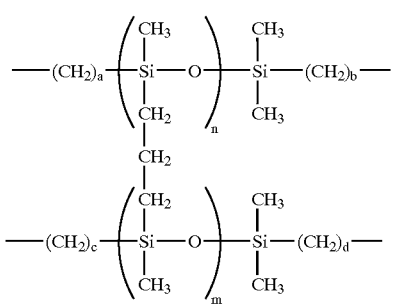

wherein m and n each, independently of the other is an integer representing the number of repeat siloxane units, and a, b, c, and d each, independently of the other, are integers representing the number of repeat —CH$_2$— units,

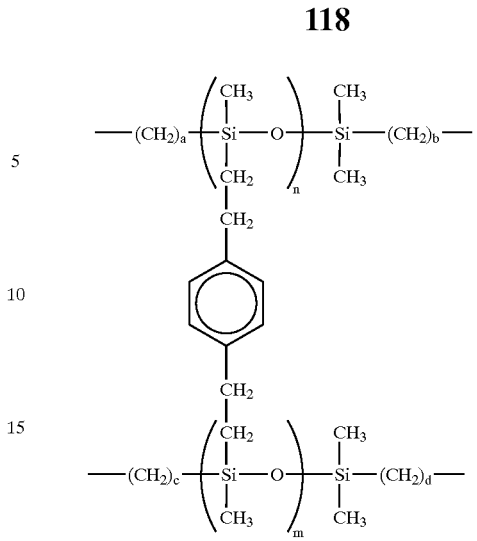

wherein m and n each, independently of the other, is an integer representing the number of repeat siloxane units, and a, b, c, and d each, independently of the other, are integers representing the number of repeat —CH$_2$— units,

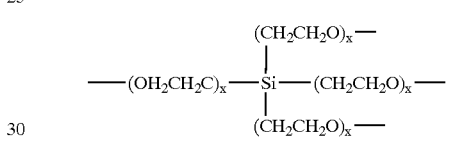

wherein each x, independently of the others, is an integer representing the number of repeat ethylene oxide groups, or combinations thereof.

27. A phase change ink composition comprising a colorant and an ink vehicle, said ink being a solid at temperatures less than about 50° C. and exhibiting a viscosity of no more than about 20 centipoise at a jetting temperature of no more than about 160° C., wherein the ink vehicle comprises (1) a material selected from (a) those of the formula

(b) those of the formula

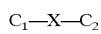

(c) those of the formula

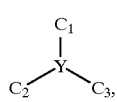

(d) those of the formula

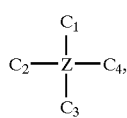

or (e) mixtures of two or more of (a), (b), (c), and/or (d); or (2) a material selected from mixtures of (a) at least one member selected from (i) those of the formula

(ii) those of the formula

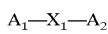

(iii) those of the formula

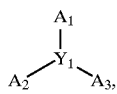

(iv) those of the formula

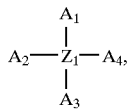

(v) those of the formula

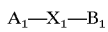

(vi) those of the formula

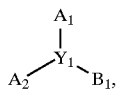

(vii) those of the formula

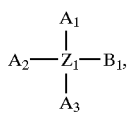

(viii) those of the formula

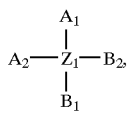

or (ix) mixtures of two or more of (i), (ii), (iii), (iv), (v), (vi), (vii), and/or (viii), and (b) at least one member selected from (i) those of the formula

(ii) those of the formula

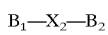

(iii) those of the formula

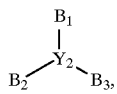

(iv) those of the formula

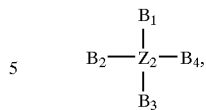

(v) those of the formula

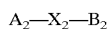

(vi) those of the formula

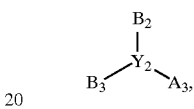

(vii) those of the formula

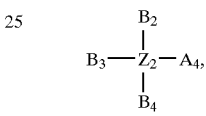

(viii) those of the formula

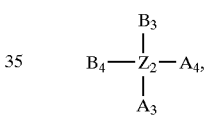

or (ix) mixtures of two or more of (i), (ii), (iii), (iv), (v), (vi), (vii), and/or (viii), wherein each "A" is an acidic moiety and each "B" is a basic moiety, wherein each "A" is capable of forming at least one hydrogen bond with at least one "B" and each "B" is capable of forming at least one hydrogen bond with at least one "A" , each "C" is a moiety either capable of forming at least one hydrogen bond with a moiety identical to itself or capable of forming at least one hydrogen bond with another "C" moiety, each "W" is a monovalent moiety, each "X" is a divalent moiety, each "Y" is a trivalent moiety, and each "Z" is a tetravalent moiety, wherein at a first temperature hydrogen bonds of sufficient strength exist either between the "A" groups and the "B" groups or between the "C" groups so that the ink vehicle forms hydrogen-bonded dimers, oligomers, or polymers, and wherein at a second temperature which is higher than the first temperature the hydrogen bonds either between the "A" groups and the "B" groups or between the "C" groups are sufficiently broken that fewer hydrogen-bonded dimers, oligomers, or polymers are present in the ink at the second temperature than are present in the ink at the first temperature, so that the viscosity of the ink at the second temperature is reduced compared to the viscosity of the ink at the first temperature, said viscosity reduction being caused by said breakage of said hydrogen bonds, wherein the ink vehicle comprises (1) a compound of the formula 121
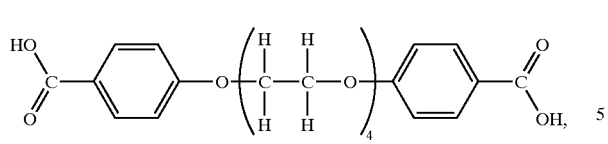
(2) a compound of the formula
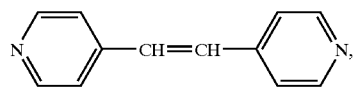
(3) a mixture of
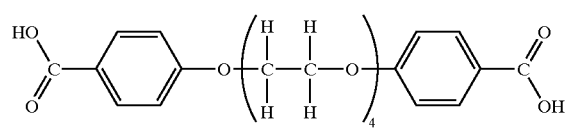
and
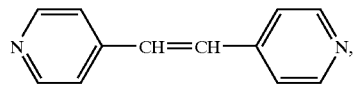
(4) a compound of the formula
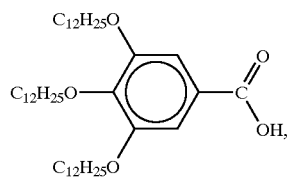
(5) a compound of the formula
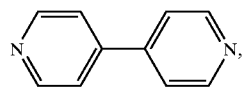
(6) a mixture of
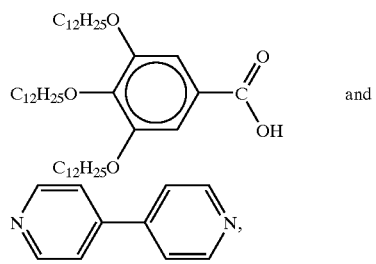
(7) a compound of the formula
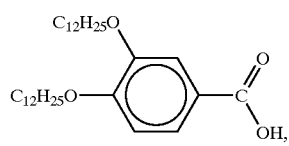
122
(8) a compound of the formula
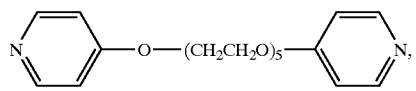
(9) a mixture of
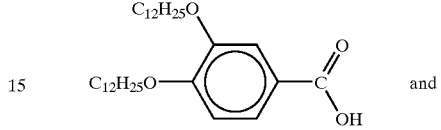
(10) a compound of the formula
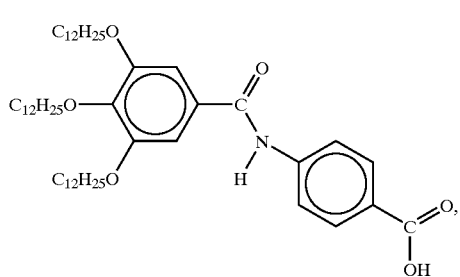
(11) a compound of the formula
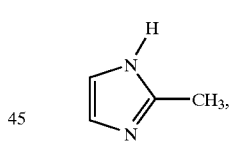
(12) a mixture of
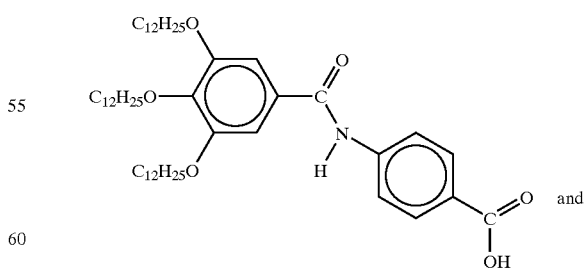
and
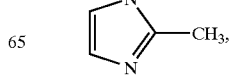

(14) a compound of the formula

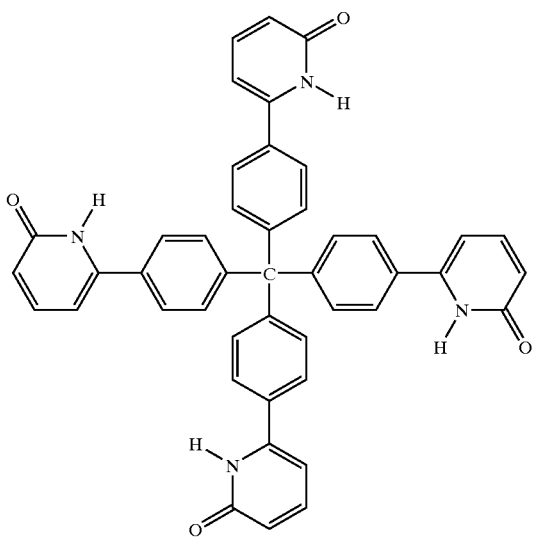

(15) a compound of the formula

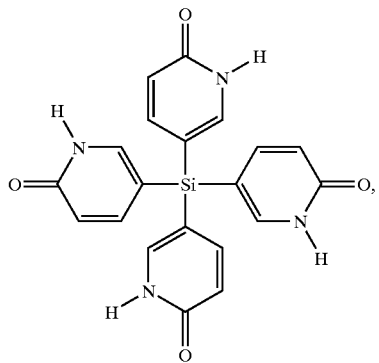

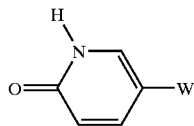

wherein W is a monovalent group formed by removing one hydroxy group from a compound of the formula

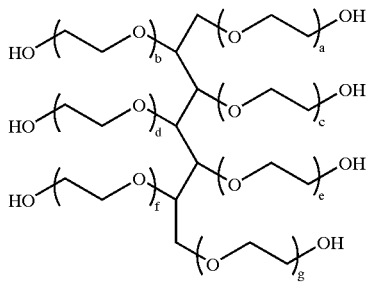

wherein a, b, c, d, e, f, and g are each integers representing the number of ethylene oxide repeat units, and wherein the molecular weight of the compound of the formula

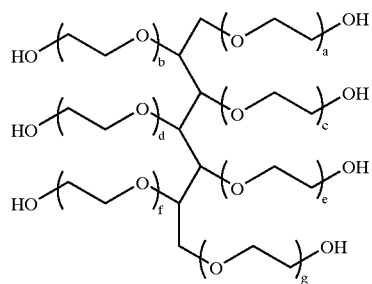

is about 1,040, (16) a compound of the formula

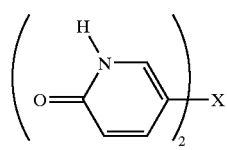

wherein X is a divalent group formed by removing two hydroxy groups from a compound of the formula

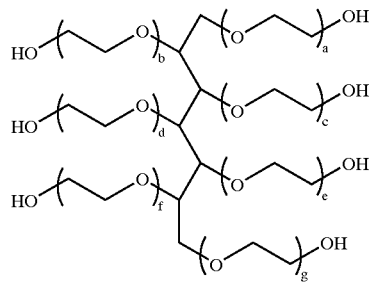

wherein a, b, c, d, e, f, and g are each integers representing the number of ethylene oxide repeat units, and wherein the molecular weight of the compound of the formula

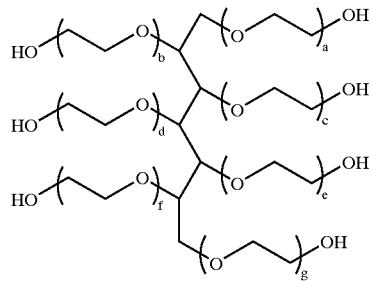

is about 1,040, (17) a compound of the formula

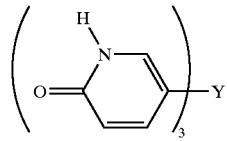

wherein Y is a trivalent group formed by removing three hydroxy groups from a compound of the formula

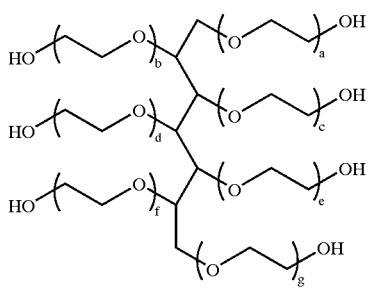

wherein a, b, c, d, e, f, and g are each integers representing the number of ethylene oxide repeat units, and wherein the molecular weight of the compound of the formula

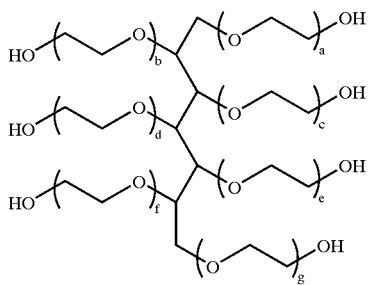

is about 1,040, (18) a compound of the formula

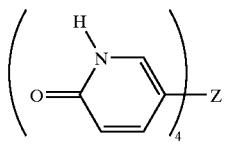

wherein Z is a tetravalent group formed by removing four hydroxy groups from a compound of the formula

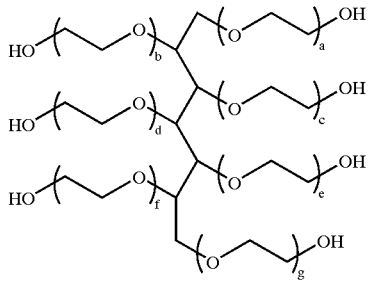

wherein a, b, c, d, e, f, and g are each integers representing the number of ethylene oxide repeat units, and wherein the molecular weight of the compound of the formula

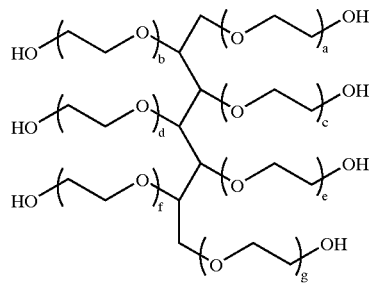

is about 1,040, (19) a compound of the formula

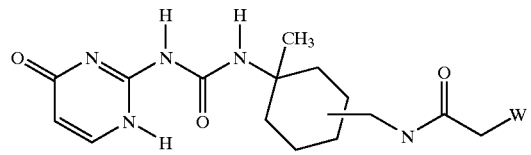

wherein W is a monovalent group formed by removing one hydroxy group from a compound of the formula

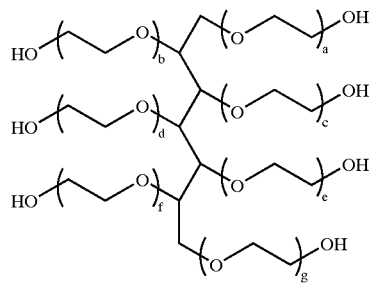

wherein a, b, c, d, e, f, and g are each integers representing the number of ethylene oxide repeat units, and wherein the molecular weight of the compound of the formula

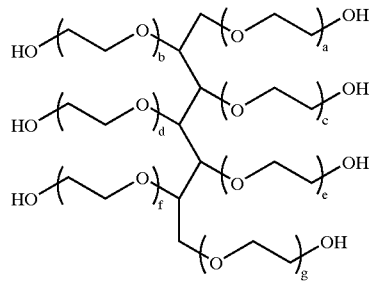

is about 1,040, (20) a compound of the formula

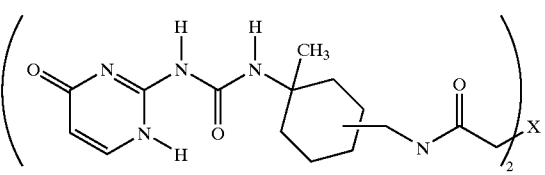

wherein X is a divalent group formed by removing two hydroxy groups from a compound of the formula

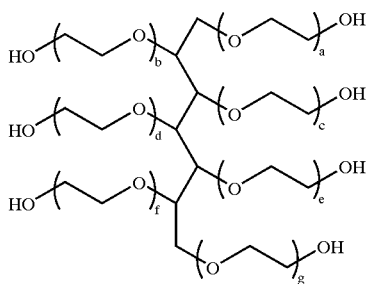

wherein a, b, c, d, e, f, and g are each integers representing the number of ethylene oxide repeat units, and wherein the molecular weight of the compound of the formula

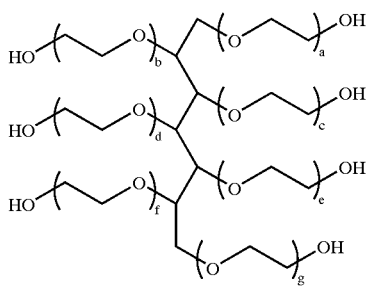

is about 1,040, (21) a compound of the formula

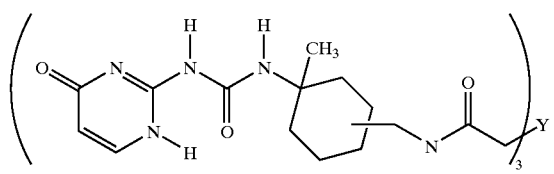

wherein Y is a trivalent group formed by removing three hydroxy groups from a compound of the formula

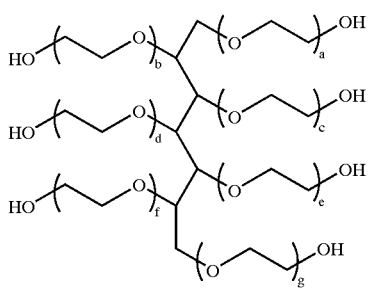

wherein a, b, c, d, e, f, and g are each integers representing the number of ethylene oxide repeat units, and wherein the molecular weight of the compound of the formula

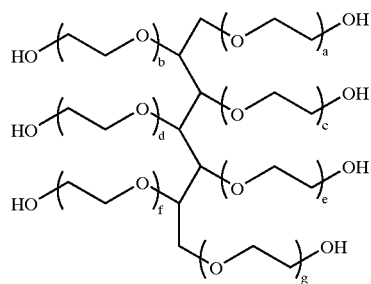

is about 1,040, (22) a compound of the formula

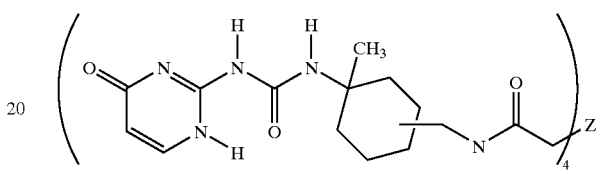

wherein Z is a tetravalent group formed by removing four hydroxy groups from a compound of the formula

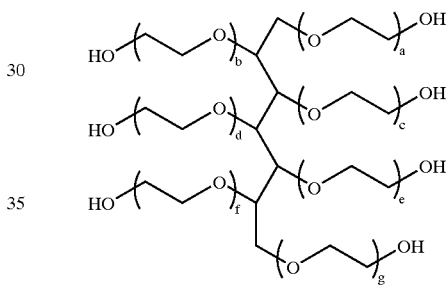

wherein a, b, c, d, e, f, and g are each integers representing the number of ethylene oxide repeat units, and wherein the molecular weight of the compound of the formula

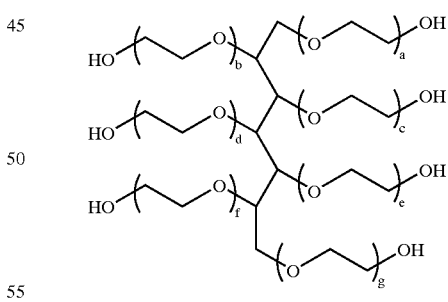

is about 1,040, (23) a compound of the formula

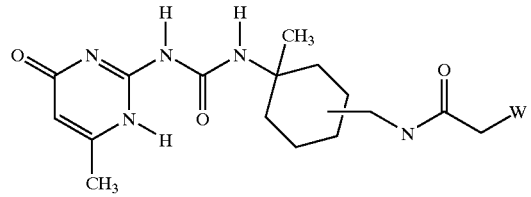

wherein W is a monovalent group formed by removing one hydroxy group from a compound of the formula

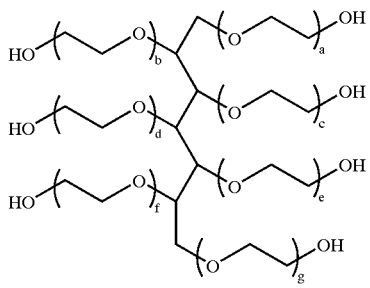

wherein a, b, c, d, e, f, and g are each integers representing the number of ethylene oxide repeat units, and wherein the molecular weight of the compound of the formula

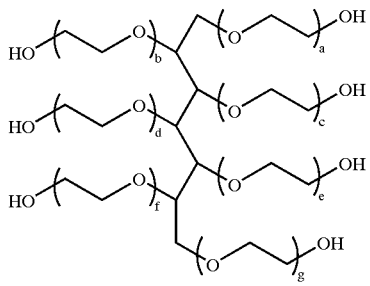

is about 1,040, (24) a compound of the formula

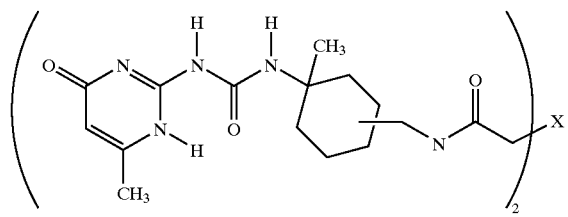

wherein X is a divalent group formed by removing two hydroxy groups from a compound of the formula

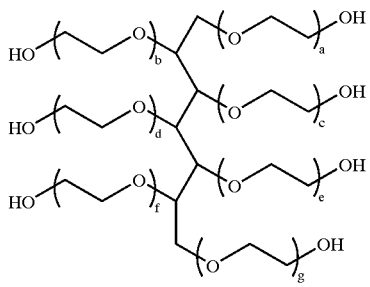

wherein a, b, c, d, e, f, and g are each integers representing the number of ethylene oxide repeat units, and wherein the molecular weight of the compound of the formula

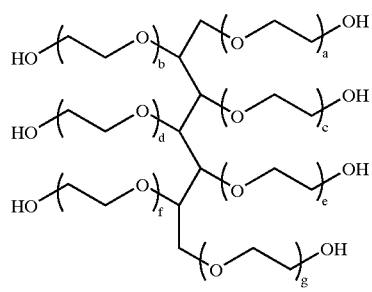

is about 1,040, (25) a compound of the formula

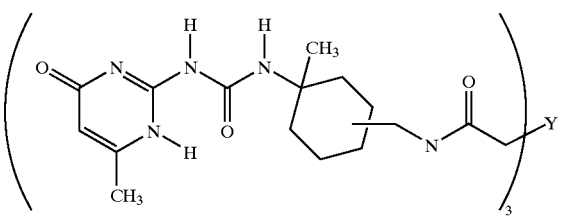

wherein Y is a trivalent group formed by removing three hydroxy groups from a compound of the formula

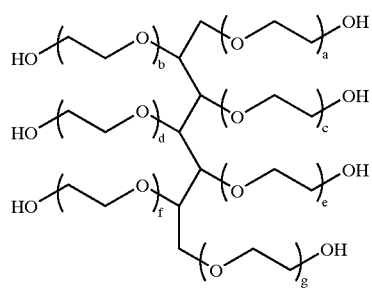

wherein a, b, c, d, e, f, and g are each integers representing the number of ethylene oxide repeat units, and wherein the molecular weight of the compound of the formula

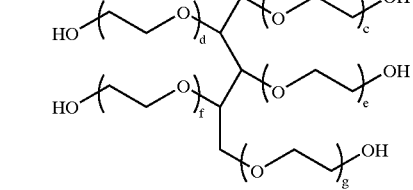

is about 1,040, (26) a compound of the formula

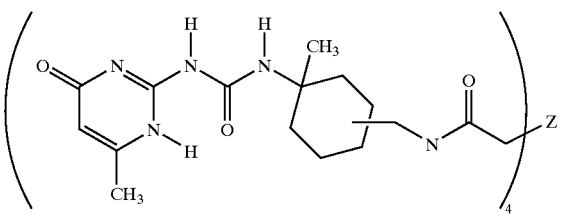

wherein Z is a tetravalent group formed by removing four hydroxy groups from a compound of the formula

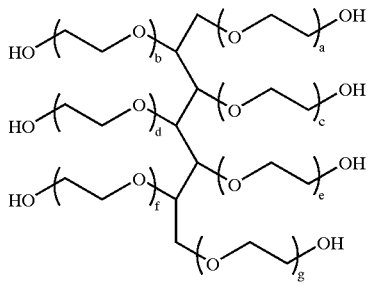

wherein a, b, c, d, e, f, and g are each integers representing the number of ethylene oxide repeat units, and wherein the molecular weight of the compound of the formula

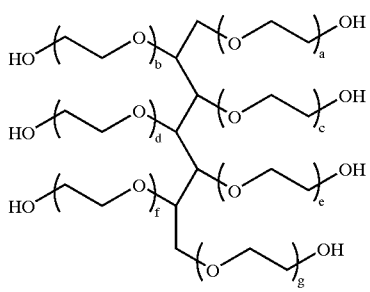

is about 1,040, (27) a compound of the formula

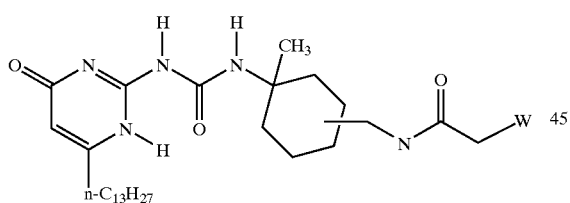

wherein W is a monovalent group formed by removing one hydroxy group from a compound of the formula

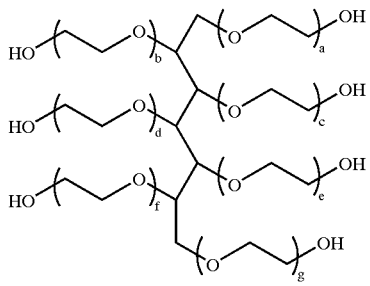

wherein a, b, c, d, e, f, and g are each integers representing the number of ethylene oxide repeat units, and wherein the molecular weight of the compound of the formula

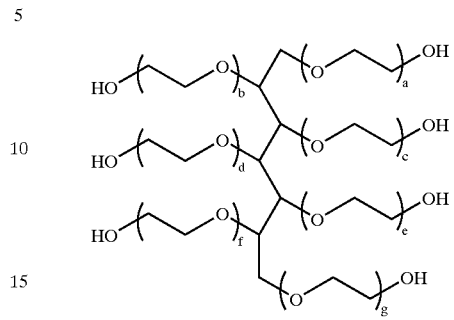

is about 1,040, (28) a compound of the formula

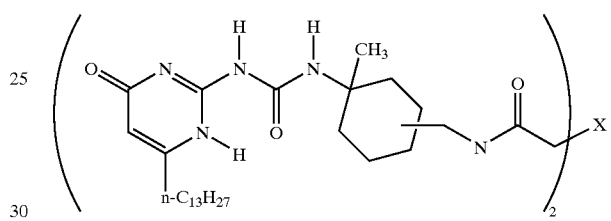

wherein X is a divalent group formed by removing two hydroxy groups from a compound of the formula

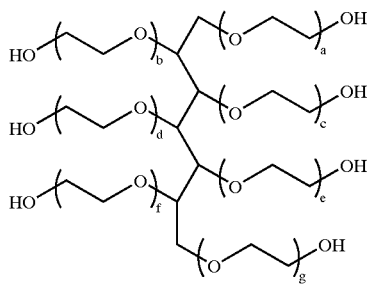

wherein a, b, c, d, e, f, and g are each integers representing the number of ethylene oxide repeat units, and wherein the molecular weight of the compound of the formula

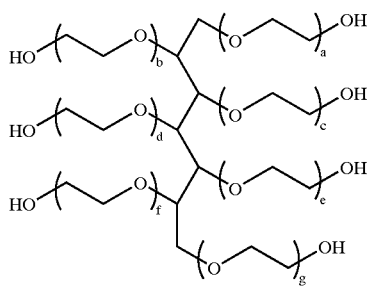

is about 1,040, (29) a compound of the formula

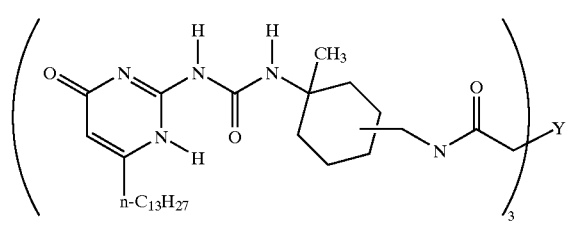

wherein Y is a trivalent group formed by removing three hydroxy groups from a compound of the formula

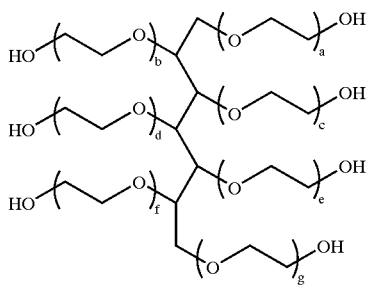

wherein a, b, c, d, e, f, and g are each integers representing the number of ethylene oxide repeat units, and wherein the molecular weight of the compound of the formula

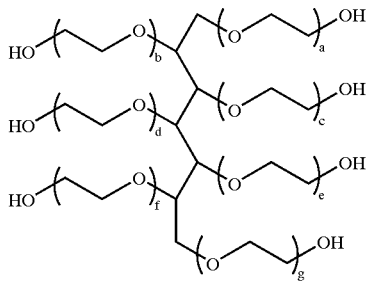

is about 1,040, (30) a compound of the formula

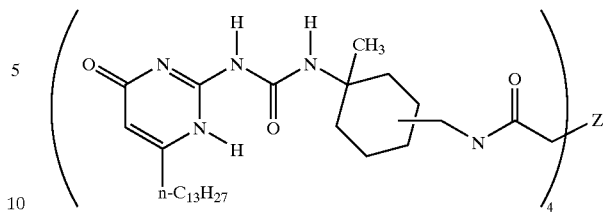

wherein Z is a tetravalent group formed by removing four hydroxy groups from a compound of the formula

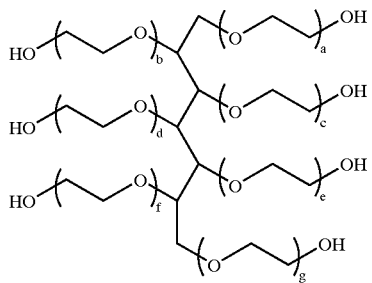

wherein a, b, c, d, e, f, and g are each integers representing the number of ethylene oxide repeat units, and wherein the molecular weight of the compound of the formula

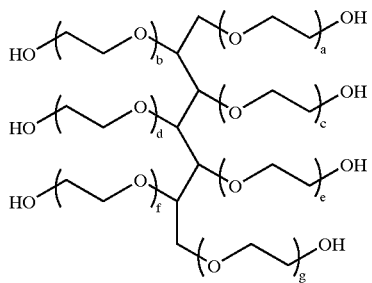

is about 1,040, (31) a compound of the formula

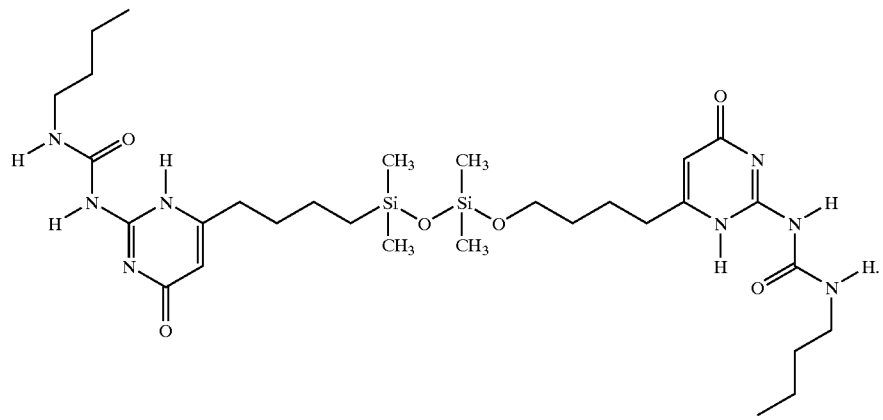

(32) a compound of the formula

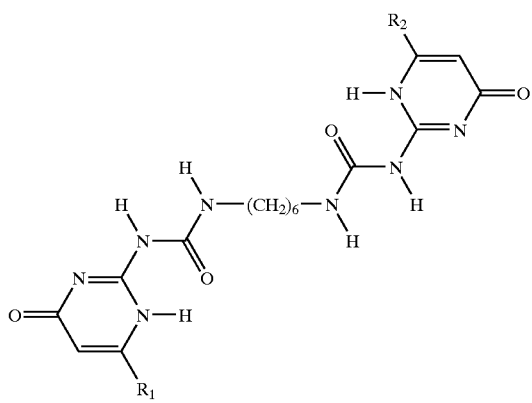

wherein $R_1$ and $R_2$ each, independently of the other, is an alkyl group with from 1 to about 18 carbon atoms, (33) a compound of the formula

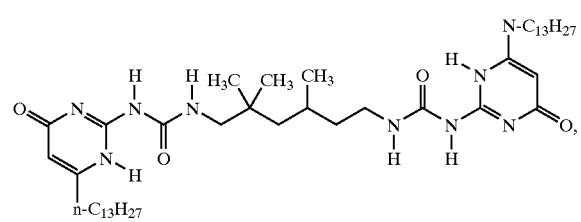

(34) a compound of the formula

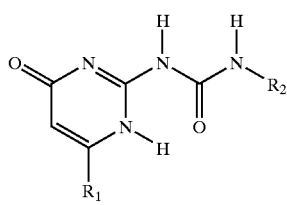

wherein $R_1$ and $R_2$ each, independently of the other, is an alkyl group with from 1 about 18 carbon atoms, (35) a compound of the formula

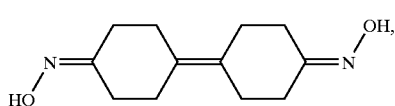

(36) a compound of the formula

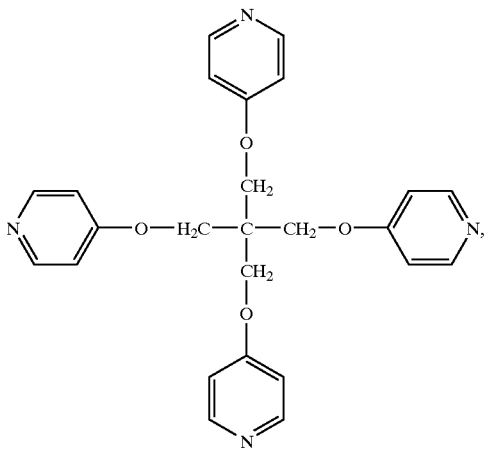

(37) a compound of the formula

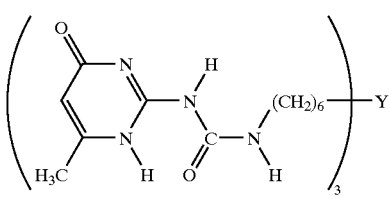

wherein Y is a trivalent group formed by removing three hydroxy groups from a compound of the formula

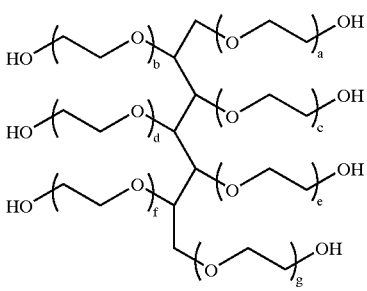

wherein a, b, c, d, e, f, and g are each integers representing the number of ethylene oxide repeat units, and wherein the molecular weight of the compound of the formula

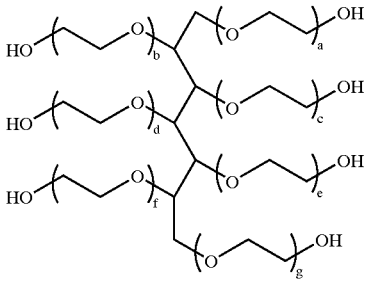

is about 1,040, (38) a compound of the formula

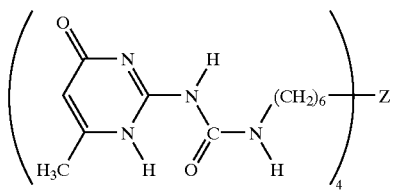

wherein Z is a tetravalent group formed by removing four hydroxy groups from a compound of the formula

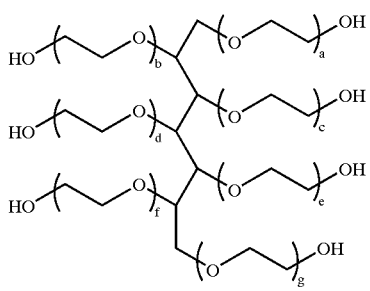

wherein a, b, c, d, e, f, and g are each integers representing the number of ethylene oxide repeat units, and wherein the molecular weight of the compound of the formula

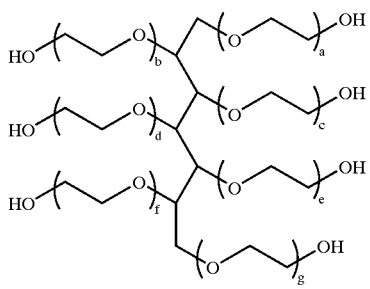

is about 1,040, (39) a compound of the formula

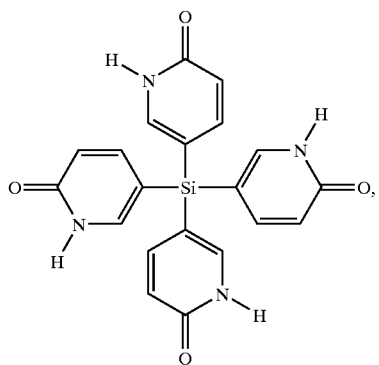

(40) a compound of the formula

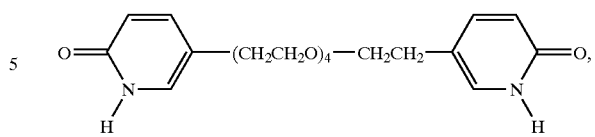

(41) a mixture of

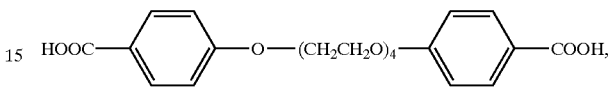

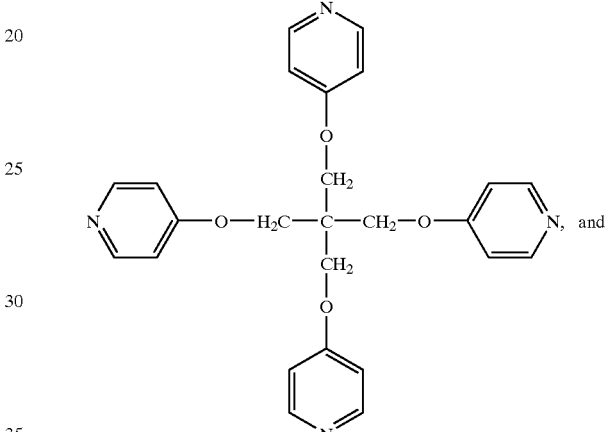

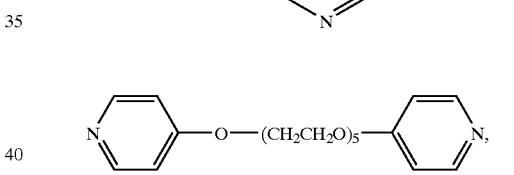

(42) a mixture of

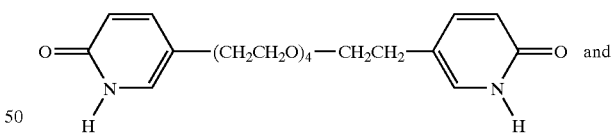

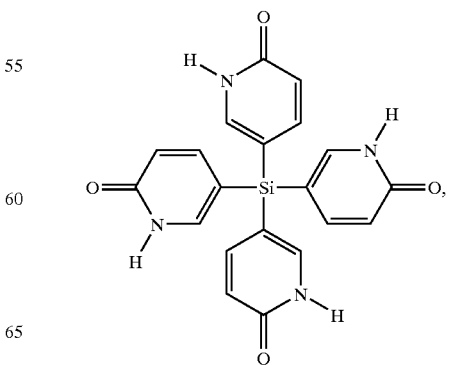

(43) a compound of the formula

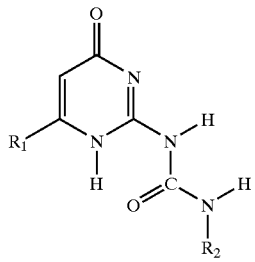

wherein R₁ is methyl, propyl, or nonyl and R₂ is butyl, heptyl, or octadecyl, (44) a compound of the formula

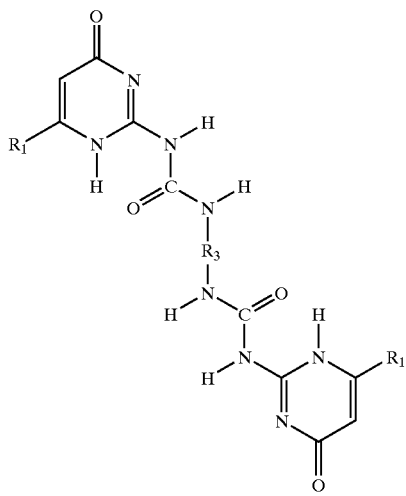

wherein R₃ is 1,6-hexamethylene and R₁ is methyl, (45) a compound of the formula

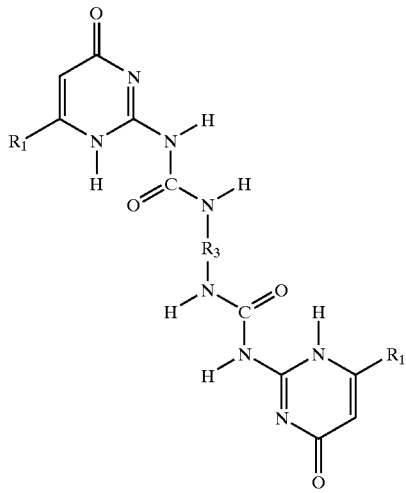

wherein R₃ is 1,6-hexamethylene and R₁ is nonyl, (46) a compound of the formula

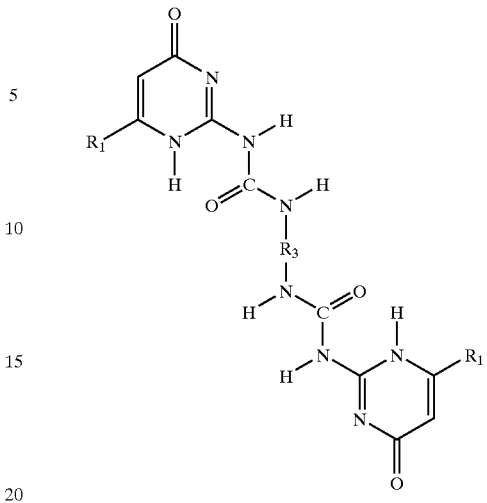

wherein R₃ is 1,6-hexamethylene and R₁ is pentadecyl, or (47) mixtures thereof.

28. An ink composition according to claim 27 wherein the ink vehicle comprises a compound of the formula

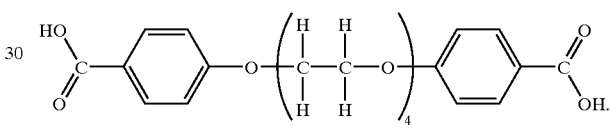

29. An ink composition according to claim 27 wherein the ink vehicle comprises a compound of the formula

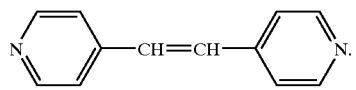

30. An ink composition according to claim 27 wherein the ink vehicle comprises a mixture of

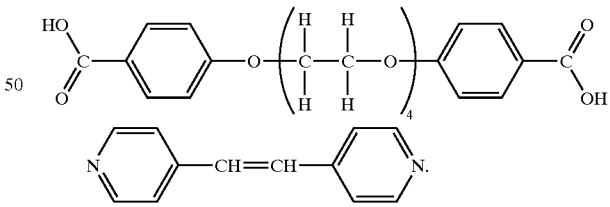

31. An ink composition according to claim 27 wherein the ink vehicle comprises a compound of the formula

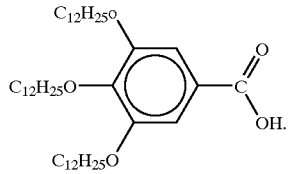

32. An ink composition according to claim 27 wherein the ink vehicle comprises a compound of the formula.

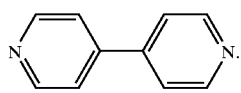

33. An ink composition according to claim 27 wherein the ink vehicle comprises a mixture of

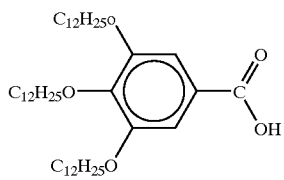

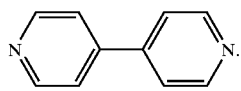

34. An ink composition according to claim 27 wherein the ink vehicle comprises a compound of the formula

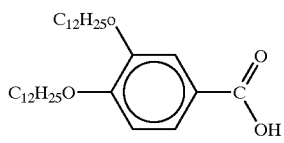

35. An ink composition according to claim 27 wherein the ink vehicle comprises a compound of the formula

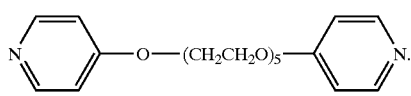

36. An ink composition according to claim 27 wherein the ink vehicle comprises a mixture of

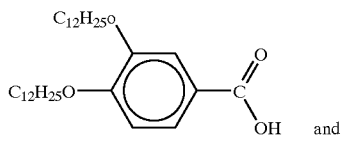 and

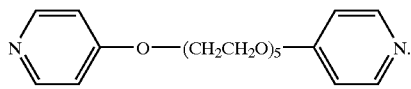

37. An ink composition according to claim 27 wherein the ink vehicle comprises a compound of the formula

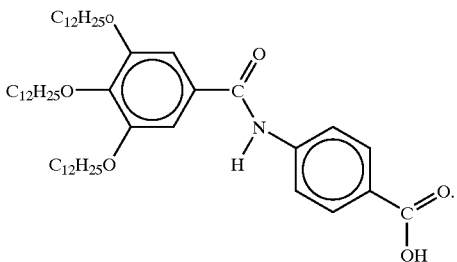

38. An ink composition according to claim 27 wherein the ink vehicle comprises a compound of the formula

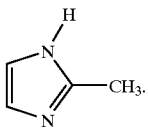

39. An ink composition according to claim 27 wherein the ink vehicle comprises a mixture of

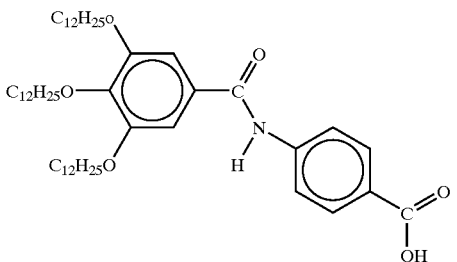

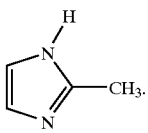

40. An ink composition according to claim 27 wherein the ink vehicle comprises a compound of the formula

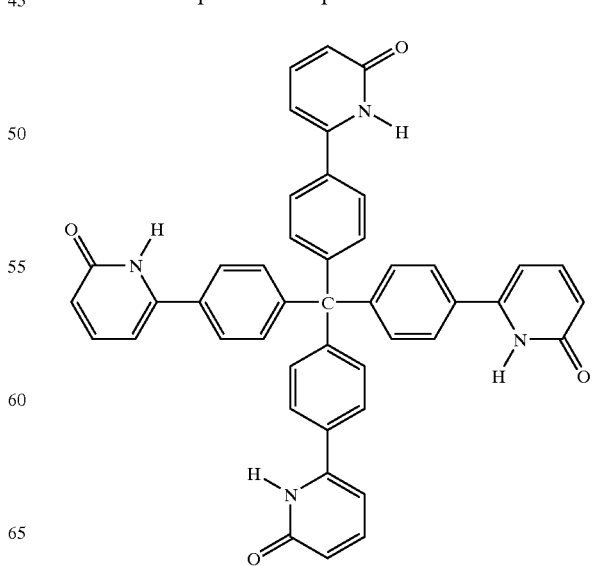

41. An ink composition according to claim 27 wherein the ink vehicle comprises a compound of the formula

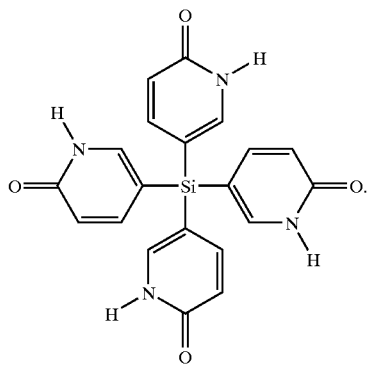

42. An ink composition according to claim 27 wherein the ink vehicle comprises a compound of the formula

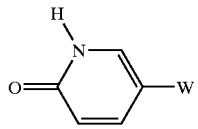

wherein W is a monovalent group formed by removing one hydroxy group from a compound of the formula

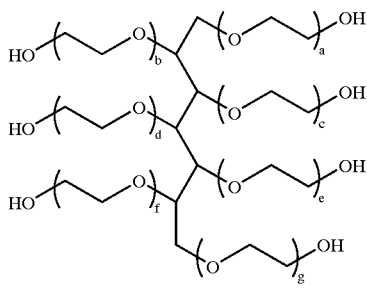

wherein a, b, c, d, e, f, and g are each integers representing the number of ethylene oxide repeat units, and wherein the molecular weight of the compound of the formula

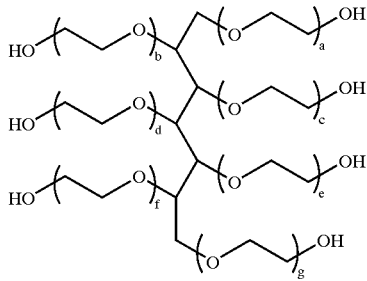

is about 1,040.

43. An ink composition according to claim 27 wherein the ink vehicle comprises a compound of the formula

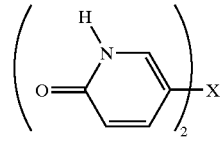

wherein X is a divalent group formed by removing two hydroxy groups from a compound of the formula

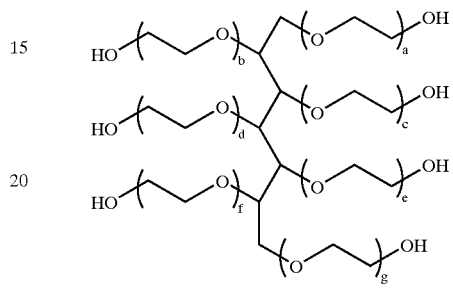

wherein a, b, c, d, e, f, and g are each integers representing the number of ethylene oxide repeat units, and wherein the molecular weight of the compound of the formula

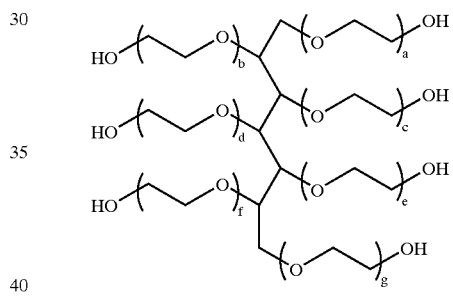

is about 1,040.

44. An ink composition according to claim 27 wherein the ink vehicle comprises a compound of the formula

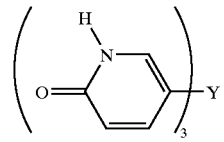

wherein Y is a trivalent group formed by removing three hydroxy groups from a compound of the formula

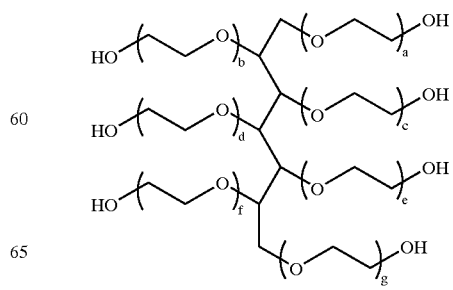

wherein a, b, c, d, e, f, and g are each integers representing the number of ethylene oxide repeat units, and wherein the molecular weight of the compound of the formula

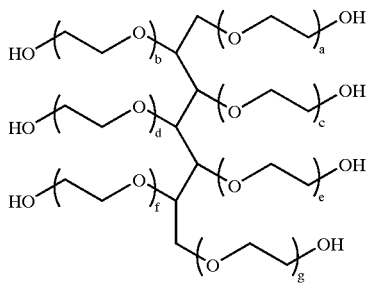

is about 1,040.

45. An ink composition according to claim 27 wherein the ink vehicle comprises a compound of the formula

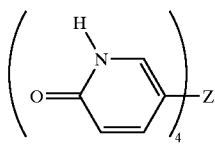

wherein Z is a tetravalent group formed by removing four hydroxy groups from a compound of the formula

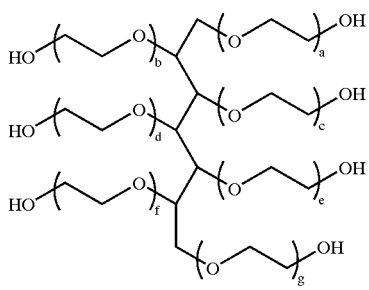

wherein a, b, c, d, e, f, and g are each integers representing the number of ethylene oxide repeat units, and wherein the molecular weight of the compound of the formula

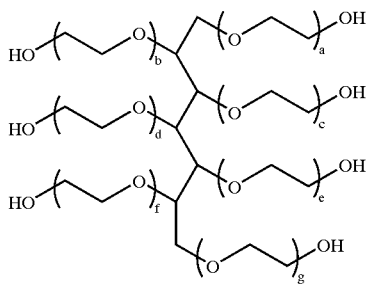

is about 1,040.

46. An ink composition according to claim 27 wherein the ink vehicle comprises a compound of the formula

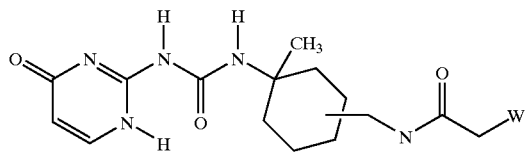

wherein W is a monovalent group formed by removing one hydroxy group from a compound of the formula

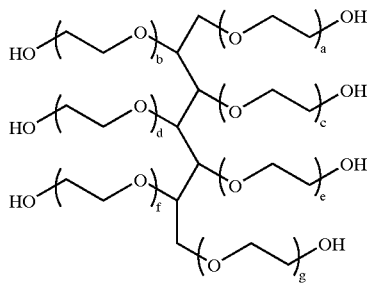

wherein a, b, c, d, e, f, and g are each integers representing the number of ethylene oxide repeat units, and wherein the molecular weight of the compound of the formula

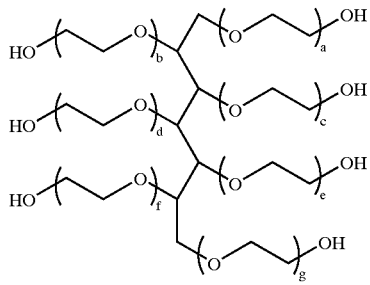

is about 1,040.

47. An ink composition according to claim 27 wherein the ink vehicle comprises a compound of the formula

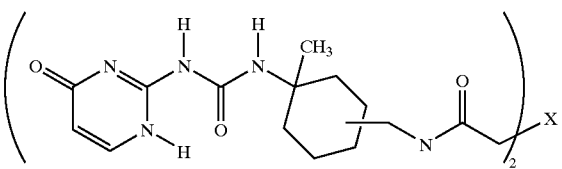

wherein X is a divalent group formed by removing two hydroxy groups from a compound of the formula

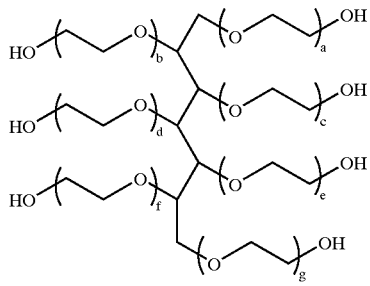

wherein a, b, c, d, e, f, and g are each integers representing the number of ethylene oxide repeat units, and wherein the molecular weight of the compound of the formula

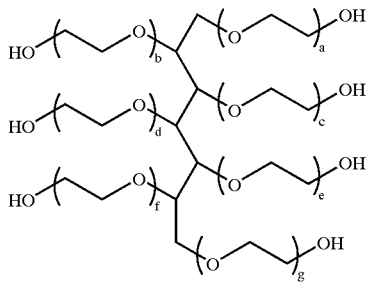

is about 1,040.

48. An ink composition according to claim 27 wherein the ink vehicle comprises a compound of the formula

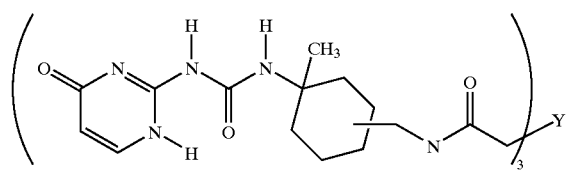

wherein Y is a trivalent group formed by removing three hydroxy groups from a compound of the formula

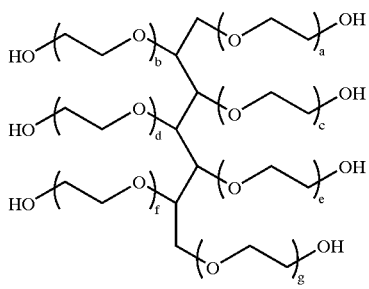

wherein a, b, c, d, e, f, and g are each integers representing the number of ethylene oxide repeat units, and wherein the molecular weight of the compound of the formula

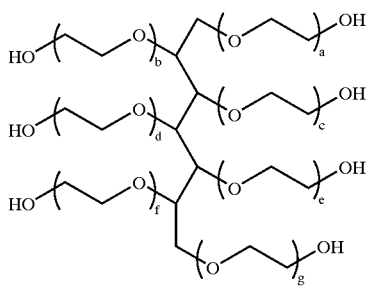

is about 1,040.

49. An ink composition according to claim 27 wherein the ink vehicle comprises a compound of the formula

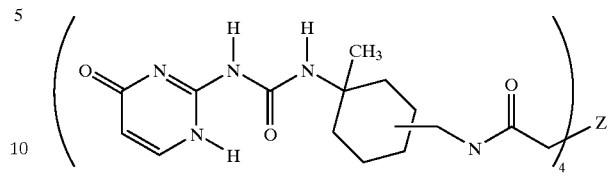

wherein Z is a tetravalent group formed by removing four hydroxy groups from a compound of the formula

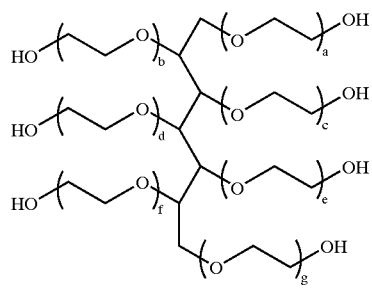

wherein a, b, c, d, e, f, and g are each integers representing the number of ethylene oxide repeat units, and wherein the molecular weight of the compound of the formula

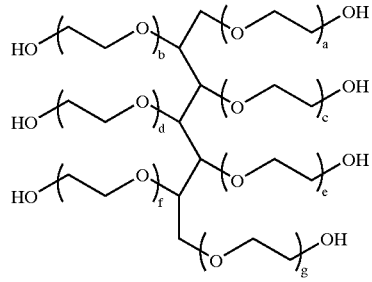

is about 1,040.

50. An ink composition according to claim 27 wherein the ink vehicle comprises a compound of the formula

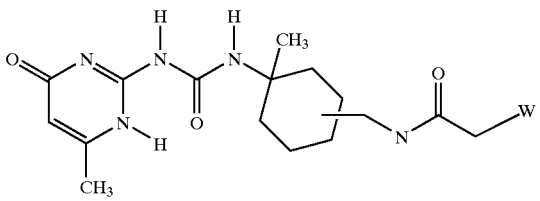

wherein W is a monovalent group formed by removing one hydroxy group from a compound of the formula

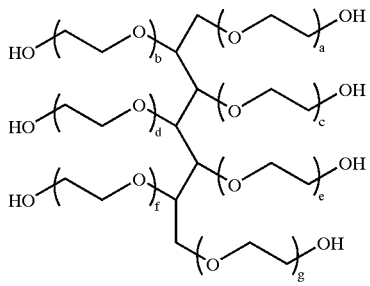

wherein a, b, c, d, e, f, and g are each integers representing the number of ethylene oxide repeat units, and wherein the molecular weight of the compound of the formula

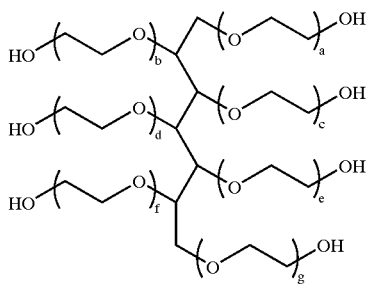

is about 1,040.

51. An ink composition according to claim 27 wherein the ink vehicle comprises a compound of the formula

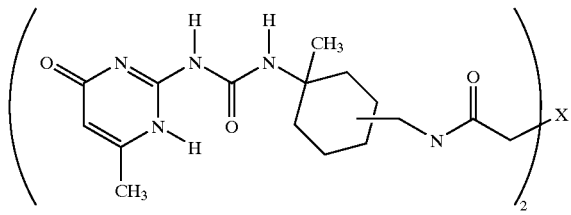

wherein X is a divalent group formed by removing two hydroxy groups from a compound of the formula

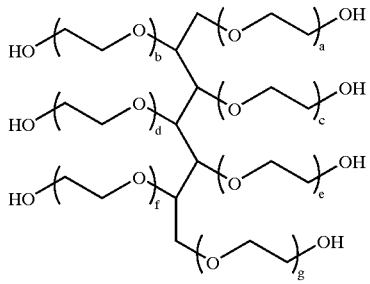

wherein a, b, c, d, e, f, and g are each integers representing the number of ethylene oxide repeat units, and wherein the molecular weight of the compound of the formula

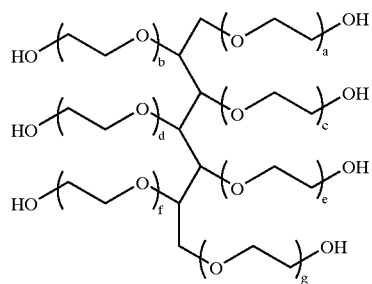

is about 1,040.

52. An ink composition according to claim 27 wherein the ink vehicle comprises a compound of the formula

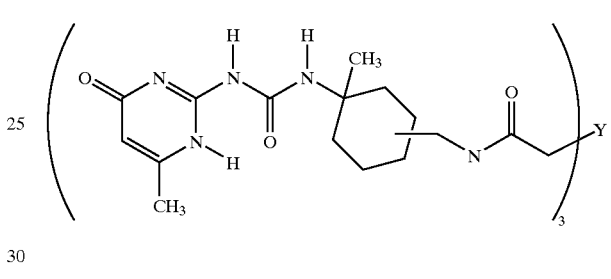

wherein Y is a trivalent group formed by removing three hydroxy groups from a compound of the formula

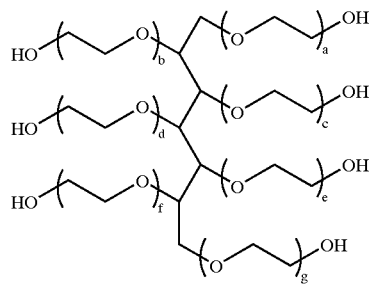

wherein a, b, c, d, e, f, and g are each integers representing the number of ethylene oxide repeat units, and wherein the molecular weight of the compound of the formula

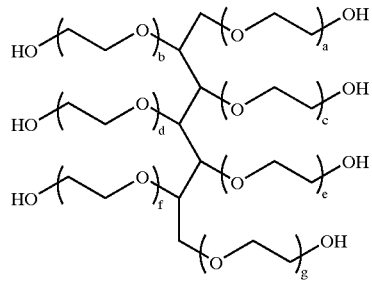

is about 1,040.

53. An ink composition according to claim 27 wherein the ink vehicle comprises a compound of the formula

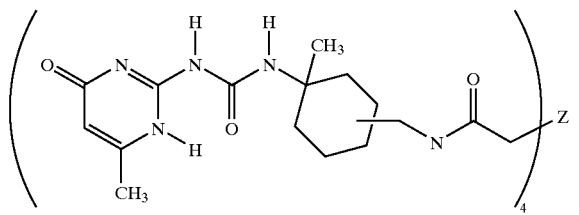

wherein Z is a tetravalent group formed by removing four hydroxy groups from a compound of the formula

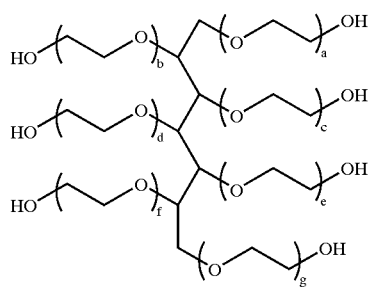

wherein a, b, c, d, e, f, and g are each integers representing the number of ethylene oxide repeat units, and wherein the molecular weight of the compound of the formula

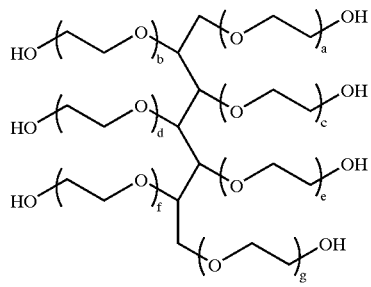

is about 1,040.

54. An ink composition according to claim 27 wherein the ink vehicle comprises a compound of the formula

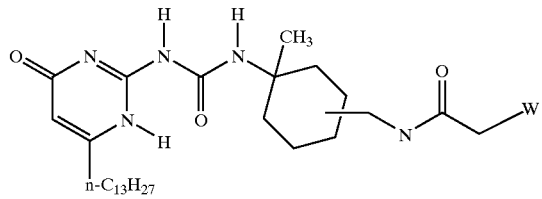

wherein W is a monovalent group formed by removing one hydroxy group from a compound of the formula

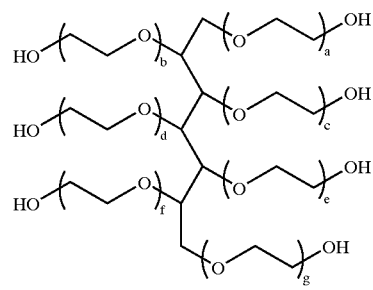

wherein a, b, c, d, e, f, and g are each integers representing the number of ethylene oxide repeat units, and wherein the molecular weight of the compound of the formula

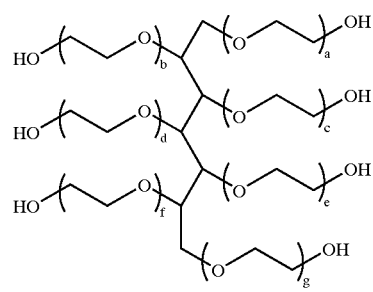

is about 1,040.

55. An ink composition according to claim 27 wherein the ink vehicle comprises a compound of the formula

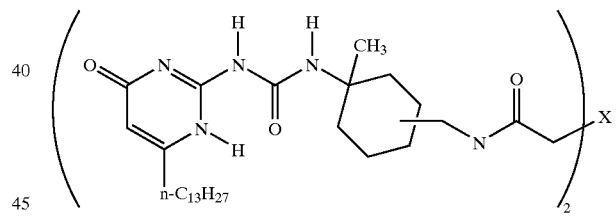

wherein X is a divalent group formed by removing two hydroxy groups from a compound of the formula

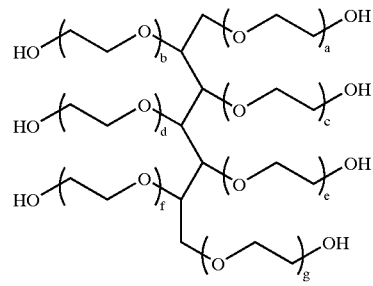

wherein a, b, c, d, e, f, and g are each integers representing the number of ethylene oxide repeat units, and wherein the molecular weight of the compound of the formula

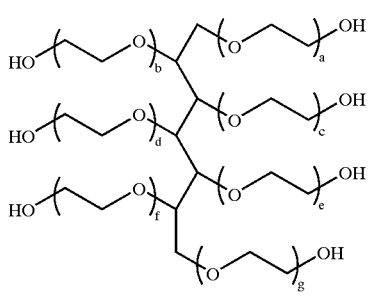

is about 1,040.

56. An ink composition according to claim 27 wherein the ink vehicle comprises a compound of the formula

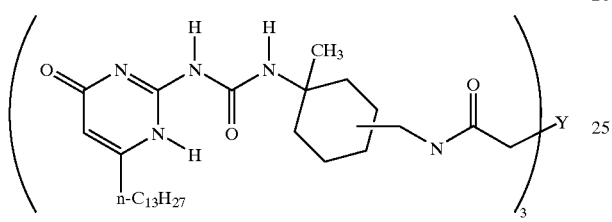

wherein Y is a trivalent group formed by removing three hydroxy groups from a compound of the formula

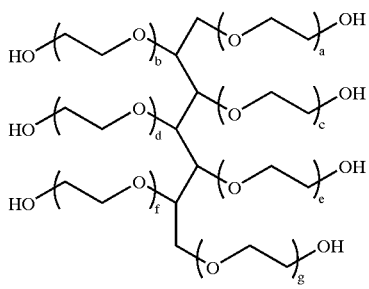

wherein a, b, c, d, e, f, and g are each integers representing the number of ethylene oxide repeat units, and wherein the molecular weight of the compound of the formula

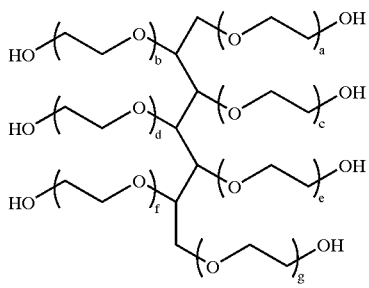

is about 1,040.

57. An ink composition according to claim 27 wherein the ink vehicle comprises a compound of the formula

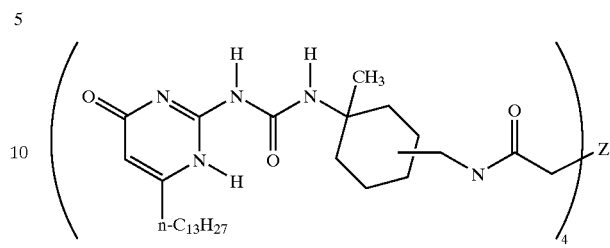

wherein Z is a tetravalent group formed by removing four hydroxy groups from a compound of the formula

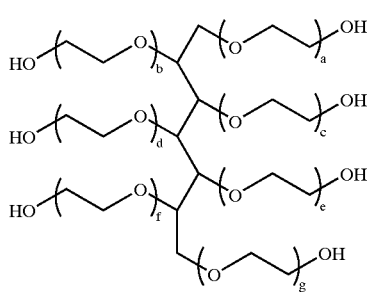

wherein a, b, a, d, e, f, and g are each integers representing the number of ethylene oxide repeat units, and wherein the molecular weight of the compound of the formula

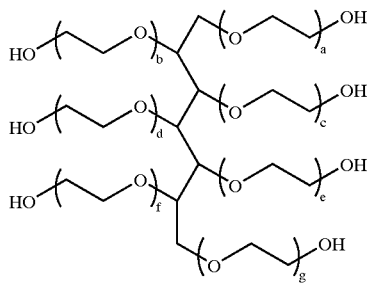

is about 1,040.

58. An ink composition according to claim 27 wherein the ink vehicle comprises a compound of the formula

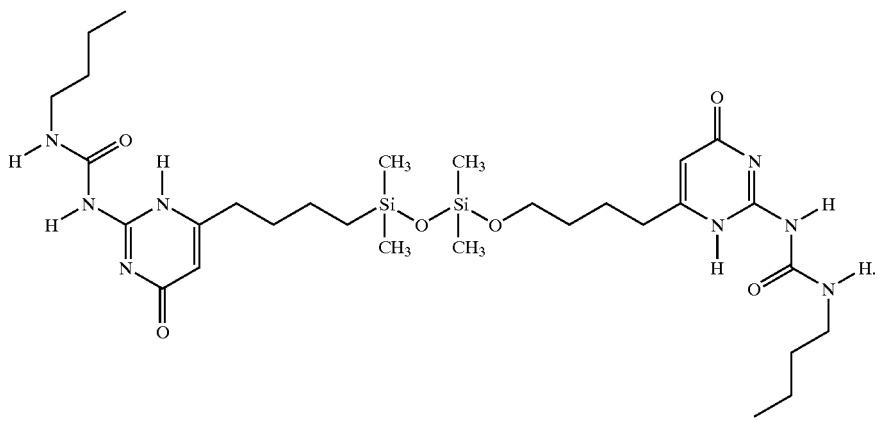

59. An ink composition according to claim 27 wherein the ink vehicle comprises a compound of the formula

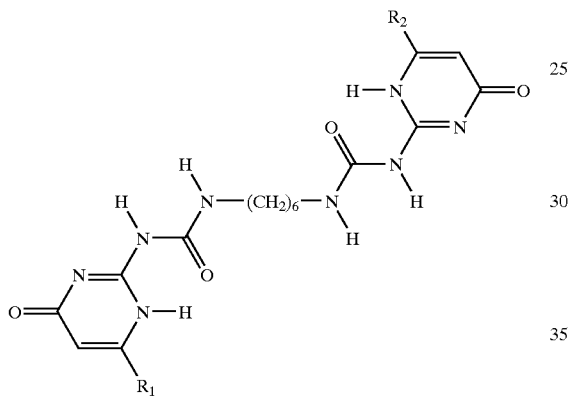

wherein $R_1$ and $R_2$ each, independently of the other, is an alkyl group with from 1 to about 18 carbon atoms.

60. An ink composition according to claim 27 wherein the ink vehicle comprises a compound of the formula

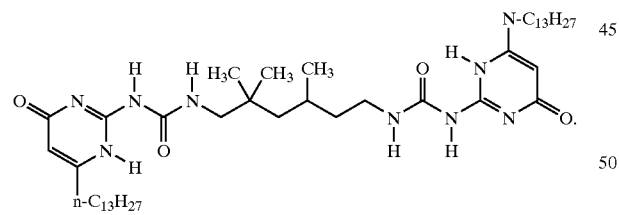

61. An ink composition according to claim 27 wherein the ink vehicle comprises a compound of the formula

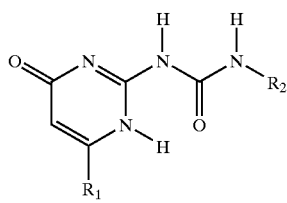

wherein $R_1$ and $R_2$ each, independently of the other, is an alkyl group with from 1 to about 18 carbon atoms.

62. An ink composition according to claim 27 wherein the ink vehicle comprises a compound of the formula

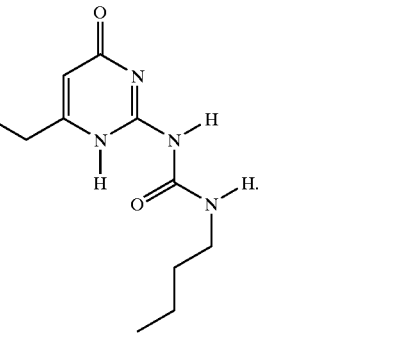

63. An ink composition according to claim 27 wherein the ink vehicle comprises a compound of the formula

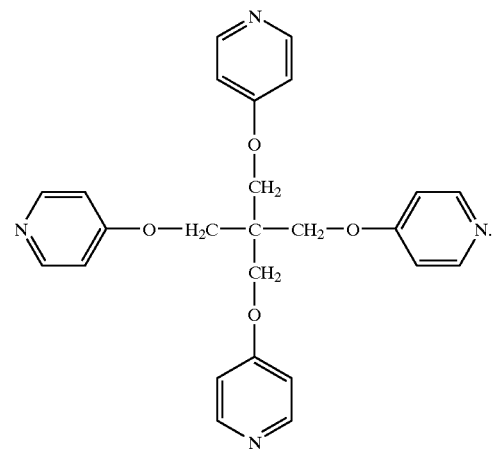

64. An ink composition according to claim 27 wherein the ink vehicle comprises a compound of the formula

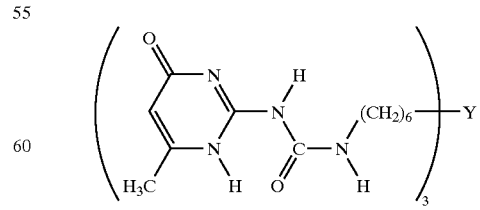

wherein Y is a trivalent group formed by removing three hydroxy groups from a compound of the formula

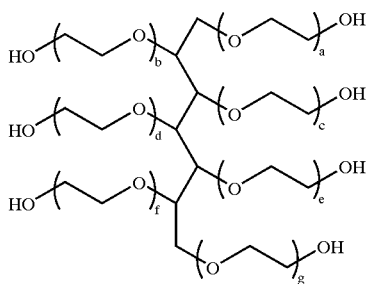

wherein a, b, c, d, e, f, and g are each integers representing the number of ethylene oxide repeat units, and wherein the molecular weight of the compound at the formula

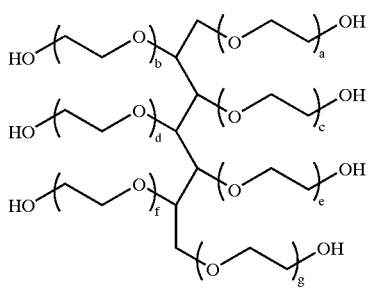

is about 1,040.

65. An ink composition according to claim 27 wherein the ink vehicle comprises a compound of the formula

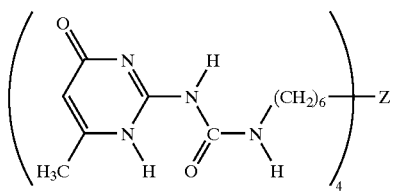

wherein Z is a tetravalent group formed by removing four hydroxy groups from a compound of the formula

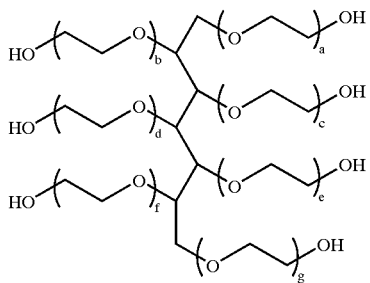

wherein a, b, c, d, e, f, and g are each integers representing the number of ethylene oxide repeat units, and wherein the molecular weight of the compound of the formula

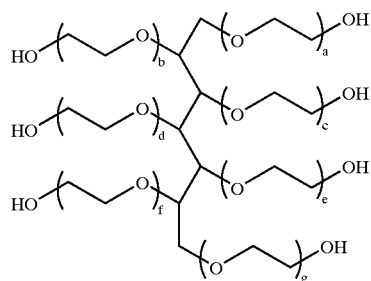

is about 1,040.

66. An ink composition according to claim 27 wherein the ink vehicle comprises a compound of the formula

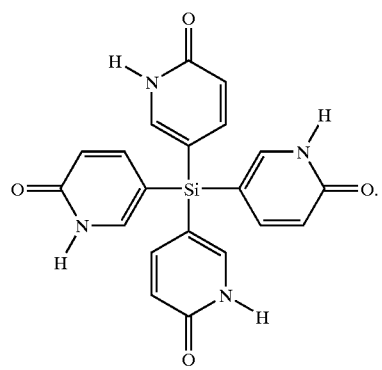

67. An ink composition according to claim 27 wherein the ink vehicle comprises a compound of the formula

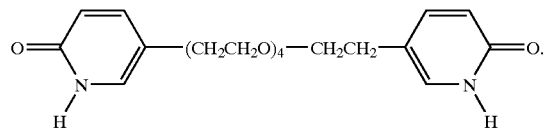

68. An ink composition according to claim 27 wherein the ink vehicle comprises a mixture of

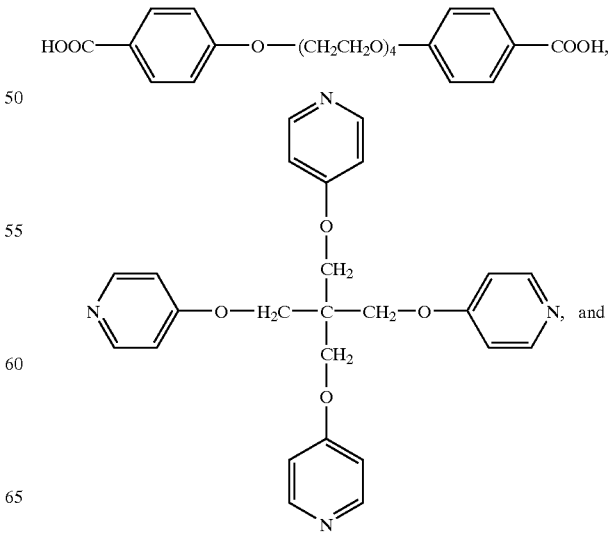

-continued

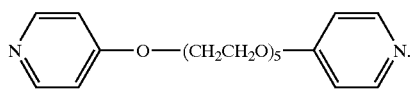

69. An ink composition according to claim 27 wherein the ink vehicle comprises a mixture of

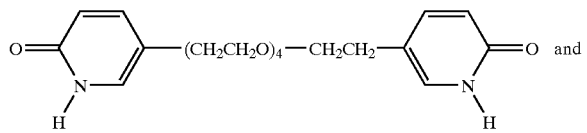

and

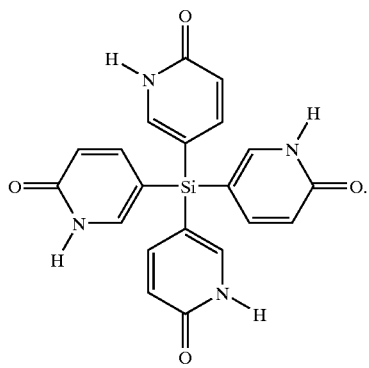

70. An ink composition according to claim 27 wherein the ink vehicle comprises a material of the formula

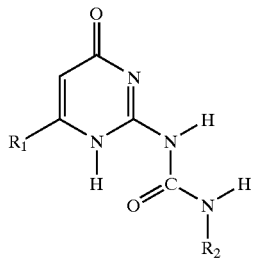

wherein $R_1$ is methyl, propyl, or nonyl and $R_2$ is butyl, heplyl, or octadecyl.

71. An ink composition according to claim 70 wherein $R_1$ is methyl and $R_2$ is octadecyl.

72. An ink composition according to claim 70 wherein $R_1$ is methyl and $R_2$ is butyl.

73. An ink composition according to claim 70 wherein $R_1$ is propyl and $R_2$ is heptyl.

74. An ink composition according to claim 70 wherein $R_1$ is propyl and $R_2$ is octadecyl.

75. An ink composition according to claim 70 wherein $R_1$ is nonyl and $R_2$ is butyl.

76. An ink composition according to claim 27 wherein the ink vehicle comprises a material of the formula

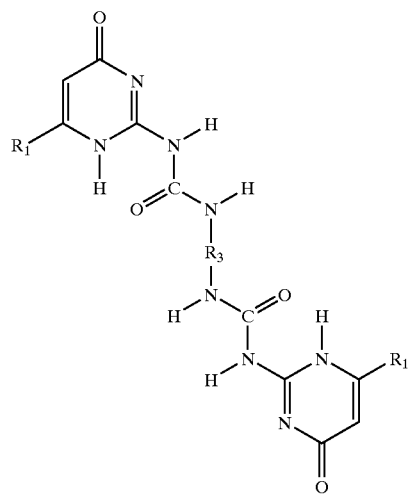

wherein $R_3$ is 1,6-hexamethylene and $R_1$ is methyl.

77. An ink composition according to claim 27 wherein the ink vehicle comprises a material of the formula

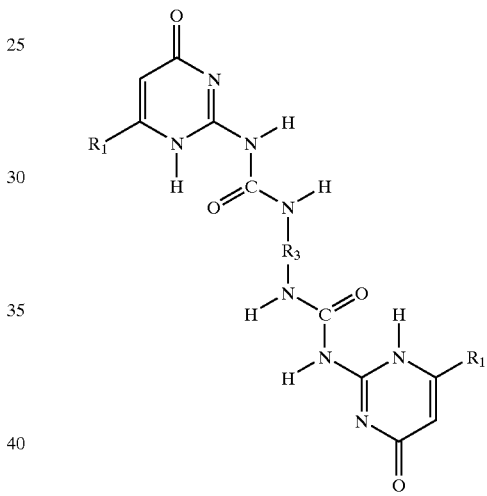

wherein $R_3$ is 1,6-hexamethylene and $R_1$ is nonyl.

78. An ink composition according to claim 27 wherein the ink vehicle comprises a material of the formula

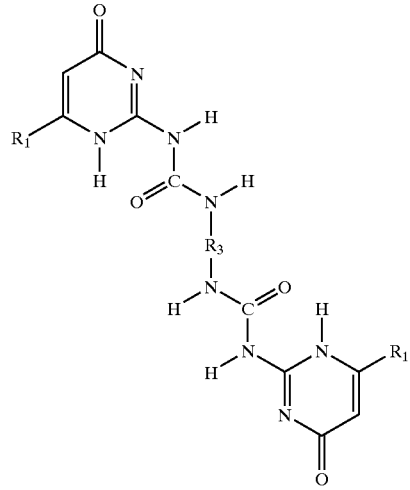

wherein $R_3$ is 1,6-hexamethylene and $R_1$ is pentadecyl.

* * * * *